(12) United States Patent
Lamensdorf et al.

(10) Patent No.: US 12,453,750 B2
(45) Date of Patent: Oct. 28, 2025

(54) FIXED DOSE COMBINATION OF CANNABINOIDS AND MEDICAL MUSHROOMS FOR PREVENTION AND TREATMENT OF CANCER, INFLAMMATORY OR IMMUNE-MEDIATED INFLAMMATORY DISEASES

(71) Applicant: ALVIT LCS PHARMA LTD., Tel Aviv (IL)

(72) Inventors: Itschak Lamensdorf, Ness Ziona (IL); Yona Levy, Jerusalem (IL)

(73) Assignee: ALVIT LCS PHARMA LTD., Tel Aviv (IL)

( * ) Notice: Subject to any disclaimer, the term of this patent is extended or adjusted under 35 U.S.C. 154(b) by 792 days.

(21) Appl. No.: 17/440,981

(22) PCT Filed: Mar. 20, 2020

(86) PCT No.: PCT/IL2020/050337
§ 371 (c)(1),
(2) Date: Sep. 20, 2021

(87) PCT Pub. No.: WO2020/188577
PCT Pub. Date: Sep. 24, 2020

(65) Prior Publication Data
US 2022/0160801 A1   May 26, 2022

Related U.S. Application Data

(60) Provisional application No. 62/821,461, filed on Mar. 21, 2019.

(51) Int. Cl.
| | | |
|---|---|---|
| *A61K 36/07* | (2006.01) | |
| *A61K 31/05* | (2006.01) | |
| *A61K 31/352* | (2006.01) | |
| *A61K 36/062* | (2006.01) | |
| *A61K 36/074* | (2006.01) | |
| *A61K 36/185* | (2006.01) | |
| *A61P 35/00* | (2006.01) | |
| *A61P 37/06* | (2006.01) | |

(52) U.S. Cl.
CPC .............. *A61K 36/07* (2013.01); *A61K 31/05* (2013.01); *A61K 31/352* (2013.01); *A61K 36/062* (2013.01); *A61K 36/074* (2013.01); *A61K 36/185* (2013.01); *A61P 35/00* (2018.01); *A61P 37/06* (2018.01)

(58) Field of Classification Search
None
See application file for complete search history.

(56) References Cited

U.S. PATENT DOCUMENTS

| 7,597,910 B2 | 10/2009 | McDowell, Jr. |
| 2012/0295968 A1 | 11/2012 | Kelly |
| 2014/0302086 A1 | 10/2014 | Kelly |
| 2018/0193403 A1 | 7/2018 | George et al. |

FOREIGN PATENT DOCUMENTS

| CN | 102579510 A | 7/2012 |
| EP | 3229789 A2 | 10/2017 |
| WO | 2016123475 A1 | 8/2016 |
| WO | 2017218846 A1 | 12/2017 |
| WO | 2020188577 A1 | 9/2020 |

OTHER PUBLICATIONS

Li et al. Anti-inflammatory effect of tetrahydrocoptisine from Corydalis impatiens is a function of possible inhibition of TNF-α, IL-6 and NO production in lipopolysaccharide-stimulated peritoneal macrophages through inhibiting NF-κB activation and MAPK pathway. Eur J Pharmacol. Sep. 5, 2013;715(1-3):62-71. doi: 10.1016/j.ejphar.2013. 06.017. Epub Jun. 25, 2013. PMID: 23810685.
Jo et al. (2010). The Anti-inflammatory Effects of Water Extract from Cordyceps militaris in Murine Macrophage. Mycobiology. Mar. 2010;38(1):46-51. doi: 10.4489/MYCO.2010.38.1.046. Epub Mar. 31, 2010. PMID: 23956624; PMCID: PMC3741594.
Dadhgaonkar et al. (2000). Suppression of the inflammatory response by triterpenes isolated from the mushroom *Ganoderma lucidum*. Int Immunopharmacol. Oct. 2009;9(11):1272-80. doi: 10.1016/j.intimp. 2009.07.011. Epub Aug. 3, 2009. PMID: 19651243.
Chang et al. Effects of cannabinoids on LPS-stimulated inflammatory mediator release from macrophages: involvement of eicosanoids. J Cell Biochem. 2001;81(4):715-23. doi: 10.1002/jcb.1103. PMID: 11329626.
He, Li (2013). The inhibition effects of Ophiocordyceps sinensis extracts on LPS-induced inflammation, He, Li, China Master's Theses Full-text Database, Medicine and Health Technology, pp. E057-E161 (no translation available).
Liu et al. (2015). Ganoderic acid C1 isolated from the anti-asthma formula, ASHMI™ suppresses TNF-α production by mouse macrophages and peripheral blood mononuclear cells from asthma patients. Int Immunopharmacol. Aug. 2015;27(2):224-31. doi: 10.1016/ j.intimp.2015.05.018. Epub May 21, 2015. PMID: 26004313; PMCID: PMC4635663.
State Intellectual Property Office of the People's Republic of China, Notification of the First Office Action for Chinese Patent Application No. 202080038025.4, Issued Apr. 27, 2023, 16pp.
Japanese Patent Office, Notice of Reasons for Refusal for Japanese Patent Application No. 2021-559480, dated Mar. 28, 2023, 8pp.
Extended European Search Report for European Application No. 20774111.7, dated Apr. 28, 2022, 11pp.
Chiou, Ya-Ling and Lin, Ching-Yuang (2012). The extract of Cordyceps sinensis inhibited airway inflammation by blocking NF-kB activity. Inflammation, vol. 35 (3), 985-993; DOI: 10.1007/ s10753-011-9402-9.

(Continued)

*Primary Examiner* — Susan Hoffman
(74) *Attorney, Agent, or Firm* — The Roy Gross Law Firm, LLC; Roy D. Gross

(57) ABSTRACT

A composition useful for treating immune-mediated inflammatory diseases or cancer in mammalian subjects is disclosed. The composition comprises a synergistic combination of a cannabis derived compound, and a medicinal mushroom.

7 Claims, 28 Drawing Sheets

(56) References Cited

OTHER PUBLICATIONS

Batra, P., Sharma, A.K., & Khajuria, R. (2013). Probing Lingzhi or Reishi Medicinal Mushroom *Ganoderma lucidum* (Higher Basidiomycetes): A Bitter Mushroom with Amazing Health Benefits; Int J Med Mushrooms. 2013; 15(2):127-43. doi: 10.1615/intjmedmushr.v15.12.20. PMID: 23557365.

Zhang et al (2018). Cordycepin induces apoptosis in human pancreatic cancer cells via the mitochondrial-mediated intrinsic pathway and suppresses tumor growth in vivo. Onco Targets Ther. Aug. 1, 2018;11:4479-4490. doi: 10.2147/OTT.S164670. PMID: 30122940; PMCID: PMC6078188.

Sharafi, G; He, H. &, Nikfarjam, M. Potential Use of Cannabinoids for the Treatment of Pancreatic Cancer. J Pancreat Cancer. Jan. 25, 2019;5(1):1-7. doi: 10.1089/pancan.2018.0019. PMID: 30706048; PMCID: PMC6352507.

Chen, P.X., Wang, S., & Nie, S. & Marcone, M. (2013). Properties of Cordyceps Sinensis: A review. J Funct Foods. Apr. 2013;5(2):550-569. doi: 10.1016/j.jff.2013.01.034. Epub Mar. 21, 2013. PMID: 32288794; PMCID: PMC7104941.

Zhu, J S., Halpern, G.M. & Jones, K. The scientific rediscovery of an ancient Chinese herbal medicine: Cordyceps sinensis: part I. J Altern Complement Med. 1998 Fall; 4(3):289-303. doi: 10.1089/acm.1998.4.3-289. PMID: 9764768.

Tuli, H.S. & Sandlhu, S.S. (2014). Pharmacological and therapeutic potential of Cordyceps with special reference to Cordycepin. 3 Biotech (2014) 4:1-12. DOI: 10.1007/s13205-013-0121-9.

Shashidhar, M.G. et al. (2013). Bioactive principles from Cordyceps sinensis: A potent food supplement—A review; Journal of Functional Foods 5 (2013) 1013-1030; doi: 10.1016/j.jff.2013.04.018.

Wu, J.-Y.; Siu, K.-C.; Geng, P. Bioactive Ingredients and Medicinal Values of *Grifola frondosa* (Maitake). Foods 2021, 10, 95. https://doi.org/10.3390/foods10010095.

Fang, Nianbai et al. (2006). Inhibition of Growth and Induction of Apoptosis in Human Cancer Cell Lines by an Ethyl Acetate Fraction from Shiitake Mushrooms. The Journal of Alternative and Complementary Medicine, vol. 12(2), 125-132. DOI: 10.1089/acm.2006.12.125.

Vasiljevic, Jovana et al. (2016). Cordyceps sinensis: Genotoxic Potential in Human Peripheral Blood Cells and Antigenotoxic Properties Against Hydrogen Peroxide by Comet Assay. Altern Ther Health Med. Jun. 2016;22 Suppl 2:24-31. PMID: 27433838.

He, Xirui et al. (2017). Polysaccharides in *Grifola frondosa* mushroom and their health promoting properties: A review. International Journal of Biological Macromolecules, vol. 101, 910-921.

Ayeka, Peter Amwoga (2018). Potential of Mushroom Compounds as Immunomodulators in Cancer Immunotherapy: A Review, Evidence-Based Complementary and Alternative Medicine, vol. 2018, Article ID 7271509, 9pp. Retrieved Nov. 22, 2021 from: https://doi.org/10.1155/2018/7271509.

PCT International Search Report for International Application No. PCT/IL2020/050337, mailed Jul. 6, 2020, 5pp.

PCT Written Opinion for International Application No. PCT/IL2020/050337, mailed Jul. 6, 2020, 8pp.

PCT International Preliminary Report on Patentability for International Application No. PCT/IL2020/050337, completed Apr. 22, 2021, 4pp.

Liu et al. (2015). Ganoderic acid C1 isolated from the anti-asthma formula, ASHMI™ suppresses TNF-60 production by mouse macrophages and peripheral blood mononuclear cells from asthma patients. Int Immunopharmacol. Aug. 2015;27(2):224-31. doi: 10.1016/j.intimp.2015.05.018. Epub May 21, 2015. PMID: 26004313; PMCID: PMC4635663.

He, Li (2013). Inhibitory effect of Cordyceps sinensis mycelium extract on LPS-induced inflammatory response, He, Li, China Master's Theses Full-text Database, Medicine and Health Technology, pp. E057-E161 (translation google generated).

State Intellectual Property Office of the People's Republic of China, Notification of the Second Office Action for Chinese Patent Application No. 202080038025.4, Issued Nov. 30, 2023, 13pp.

Japanese Patent Office, Decision of Refusal for Japanese Patent Application No. 2021-559480, dated Nov. 27, 2023, 3pp.

FIXED DOSE COMBINATION OF CANNABINOIDS AND MEDICAL MUSHROOMS FOR PREVENTION AND TREATMENT OF CANCER, INFLAMMATORY OR IMMUNE-MEDIATED INFLAMMATORY DISEASES

CROSS-REFERENCE TO RELATED APPLICATIONS

This application is a U.S. National Phase filing under 35 U.S.C. 371 of International (PCT) Patent Application No. PCT/IL2020/050337 having International filing date of Mar. 20, 2020, which claims the benefit of priority of U.S. Provisional Patent Application No. 62/821,461 filed Mar. 21, 2019, the contents of which are all incorporated herein by reference in their entirety.

FIELD OF THE INVENTION

The invention generally pertains to means and methods for novel treatments of cancer, inflammatory or immune-mediated inflammatory diseases.

More specifically, the invention relates to the synergistic interaction and fixed dose combination of cannabinoids and medical mushrooms for prevention and treatment of cancer, inflammatory or immune-mediated inflammatory diseases.

BACKGROUND OF THE INVENTION

While it is known the cannabinoids (CBD, THC and few others) are potent anti-inflammatory agents with a known anti-cancer activity it was also found that these compounds can attenuate suppress or diminished immune mediate processes. Diminishing immune mediated processes might have positive impact in some clinical indications but may negatively affect processes where immune stimulation and anti-inflammatory affect (such as cancer) are required.

Furthermore, most chemotherapeutic agents used for the treatment of cancer can destroy tumors and arrest cancer progress as well as damaging healthy cells and tissues during the course of treatment, furthermore, negative effect on cancer immunity might diminish some of their beneficial anti-tumor effect.

Thus, there is an unmet need for new more effective and safer agents serving as anticancer treatments, and treatments for other Immune-mediated inflammatory diseases (IMID)

SUMMARY OF THE INVENTION

There is an unmet need for new more effective and safer agents serving as anticancer treatments, and treatments for other Immune-mediated inflammatory diseases (IMID) where combination of anti-inflammatory and pro-immunity mainly pro Th1 type or relevant cellular effect (NK cell stimulation) could be considered as beneficial.

While cannabinoids possess anti-inflammatory effect and suppressing immunity medical mushrooms are known to stimulate immunity while having some anti-inflammatory effect, hence under certain conditions in certain ratio their combination will have a unique and unexpected spectrum of synergistic anti-inflammatory activities as well as selective pro-immune properties.

It is one object of the invention to disclose a composition useful for treating immune-mediated inflammatory diseases or cancer and any combination thereof, in a mammalian subject, wherein said composition comprises a synergistic combination of a, a cannabis-derived compound and b, a medicinal mushroom.

It is another object of the invention to disclose the composition as defined in any of the above, It is one object of the invention to disclose a synergistic composition useful for synergistically treating immune-mediated inflammatory diseases or cancer and any combination thereof, said composition comprises:
a. a cannabis-derived compound agonistic to CB1 or CBD receptors and any combination thereof;
b. a medicinal mushroom agonistic to pattern-recognition receptors (PRR);
    wherein said cannabis-derived compound and is therapeutically anti-inflammatory and said medicinal mushroom is immune-stimulatory in a mammalian subject.

It is another object of the invention to disclose the composition as defined in any of the above, wherein said immune-mediated inflammatory diseases are selected from a group consisting Asthma, Chronic obstructive pulmonary disease (COPD); Psoriasis, Rheumatoid Arthritis, Inflammatory bowel disease (IBD), ulcerative colitis, Multiple sclerosis, autoimmune haemolytic anaemia, chronic inflammatory demyelinating polyneuropathy; giant cell arteritis; GN, glomerulonephritis; juvenile idiopathic arthritis, polymyalgia rheumatica; SAPHO, synovitis, acne, pustulosis, hyperostosis, osteitis, systemic lupus erythematosus; thrombotic/idiopathic thrombocytopaenic purpura, Sjogren's, Crohn's disease, Polymyositis/dermatomyositis, Wegener's granulomatosis, Wegener's vasculitis, Psoriasis, Behcet's, Polyarteritis nodosa, Takayasu's arteritis, Graft versus host disease, Polyarteritis nodosa, Sarcoidosis, Adult onset Still's disease, Hydradenitis supprativa, Cryoglobulinaemic vasculitis, Pyoderma gangrenosum, Kawasaki disease, Relapsing polychondritis, Anti-phospholipid syndrome, Cryoglobulinaemic vasculitis, Hydradenitis supprativa, Idiopathic membranous, Relapsing polychondritis, Coeliac disease, Chronic hepatitis C, Myasthenia gravis, Myelodysplastic syndrome Pemphigus, Refractory asthma, Grave's disease, Pyoderma gangrenosum, Erythema nodosum, SAPHO syndrome, Multicentric reticulohistiocytosis, Chronic hepatitis B, Amyloidosis, and any combination thereof.

It is another object of the invention to disclose the composition as defined in any of the above, where said pattern-recognition receptors (PRR) are selected from the group consisting of Toll-like receptors (TLR), mannose receptors, dectin1 and any combination thereof.

It is another object of the invention to disclose the composition as defined in any of the above, wherein said medicinal mushrooms are selected from a group consisting of *Cordyceps*, Maitake (*Grifola frondosa*), Turkey Tail (*Trametes versicolor, Coriolus versicolor*), Reishi (*Ganoderma lucidum*), Chaga (*Inonotus obliquus*), Shiitake (*Lentinus edodes*), *Agaricus blazei* Murill, and any combination thereof.

It is another object of the invention to disclose the composition as defined in any of the above, wherein said cannabis-derived compound is selected from a group consisting from a group consisting of cannabinoids, terpenes, phenolic compounds and any combination thereof.

It is another object of the invention to disclose the composition as defined in any of the above, wherein cannabinoids are at least one of Tetra-hydro-cannabinoids (d9-THC), Tetra-hydro-cannabinoids (d8-THC), Tetra-hydro-cannabinolic acid (THCA-d9), Tetra-hydro-cannabivarin (THCV/THC-C3), Cannabidiol (CBD), Cannabidiolic acid (CBDA), Cannabidivarin (CBDV), Cannabigerol (CBG), Cannabigerolic acid (CBGA), Cannabinol (CBN), Cannabidiolic acid (CBNA), Cannabichromene (CBC), Cannabichromenic acid (CBCA), and any combination thereof.

It is another object of the invention to disclose the composition as defined in any of the above, wherein terpenes are mono-terpenes or sesqui-terpenes.

It is another object of the invention to disclose the composition as defined in any of the above, wherein phenolic compounds are at least one of O-glycoside Cannaflavin A, Cannaflavin B, Canabisin D, and any combination thereof.

It is another object of the invention to disclose the composition as defined in any of the above, wherein said composition is configured to be administrable in a manner selected from a group consisting of an inhaler, a cigarette, tablet, a capsule, a pill, lyophilized, powder, emulsion, granulated powder, cream, ointment, paste, lotion gel, liquid, a solution, a patch and any combination thereof.

It is another object of the invention to disclose the composition as defined in any of the above, wherein said composition is configured to be administrable in a manner selected from a group consisting of fast release, slow release, sustained release, controlled release and any combination thereof.

It is another object of the invention to disclose the composition as defined in any of the above, wherein said composition additionally comprising ingredients selected from a group consisting solubilizers, stabilizers, buffers, tonicity modifiers, bulking agents, viscosity enhancers/reducers, surfactants, chelating agents, adjuvants and any combination thereof.

It is one object of the invention to disclose a method of treating immune-mediated inflammatory diseases or cancer and any combination thereof, comprising the steps of:
a. providing a composition wherein said composition comprises a synergistic combination of a. cannabis-derived compound and b, a medicinal mushroom; and
b. administering said composition to a mammalian subject.

It is one object of the invention to disclose a method of treating immune-mediated inflammatory diseases or cancer and any combination thereof, comprising the steps of:
a. providing a composition comprising: a cannabis-derived compound agonistic to CB1 or CBD receptors and any combination thereof, and a medicinal mushroom agonistic to pattern-recognition receptors (PRR); and,
b. administering said composition to a mammalian subject;
wherein said cannabis-derived compound is therapeutically anti-inflammatory and said medicinal mushroom is immune-stimulatory in said mammalian subject.

It is one object of the invention to disclose a composition useful for treating immune-mediated inflammatory diseases or cancer and any combination thereof in a mammalian subject, said composition comprises
a. at least one medicinal mushroom agonistic to pattern-recognition receptors (PRR); and
b. at least second medicinal mushroom.

It is another object of the invention to disclose the composition as defined in any of the above, wherein said composition useful for treating immune-mediated inflammatory diseases comprises *Cordyceps* M mushroom extract and THC.

It is another object of the invention to disclose the composition as defined in any of the above, wherein said treating immune-mediated inflammatory diseases comprises inhibition of Nitric Oxide secretion.

It is another object of the invention to disclose the composition as defined in any of the above, wherein said wherein said composition useful for treating immune-mediated inflammatory diseases comprises Reishi mushroom extract and THC.

It is another object of the invention to disclose the composition as defined in any of the above, wherein said treating immune-mediated inflammatory diseases consists of decreasing IL-6 secretion.

It is another object of the invention to disclose the composition as defined in any of the above, wherein said wherein said composition useful for treating immune-mediated inflammatory diseases comprises *Cordyceps* Cs-4 mushroom extract THC.

It is another object of the invention to disclose the composition as defined in any of the above, wherein said treating immune-mediated inflammatory diseases consists of decreasing TNFα secretion.

It is another object of the invention to disclose the composition as defined in any of the above, wherein said treating immune-mediated cancer is provided by a composition comprising CBD and a mushroom extract selected from the group consisting of: *Cordyceps* (M) mushroom extract and Reishi mushroom extract.

DETAILED DESCRIPTION OF THE PREFERRED EMBODIMENTS

Figure 1:
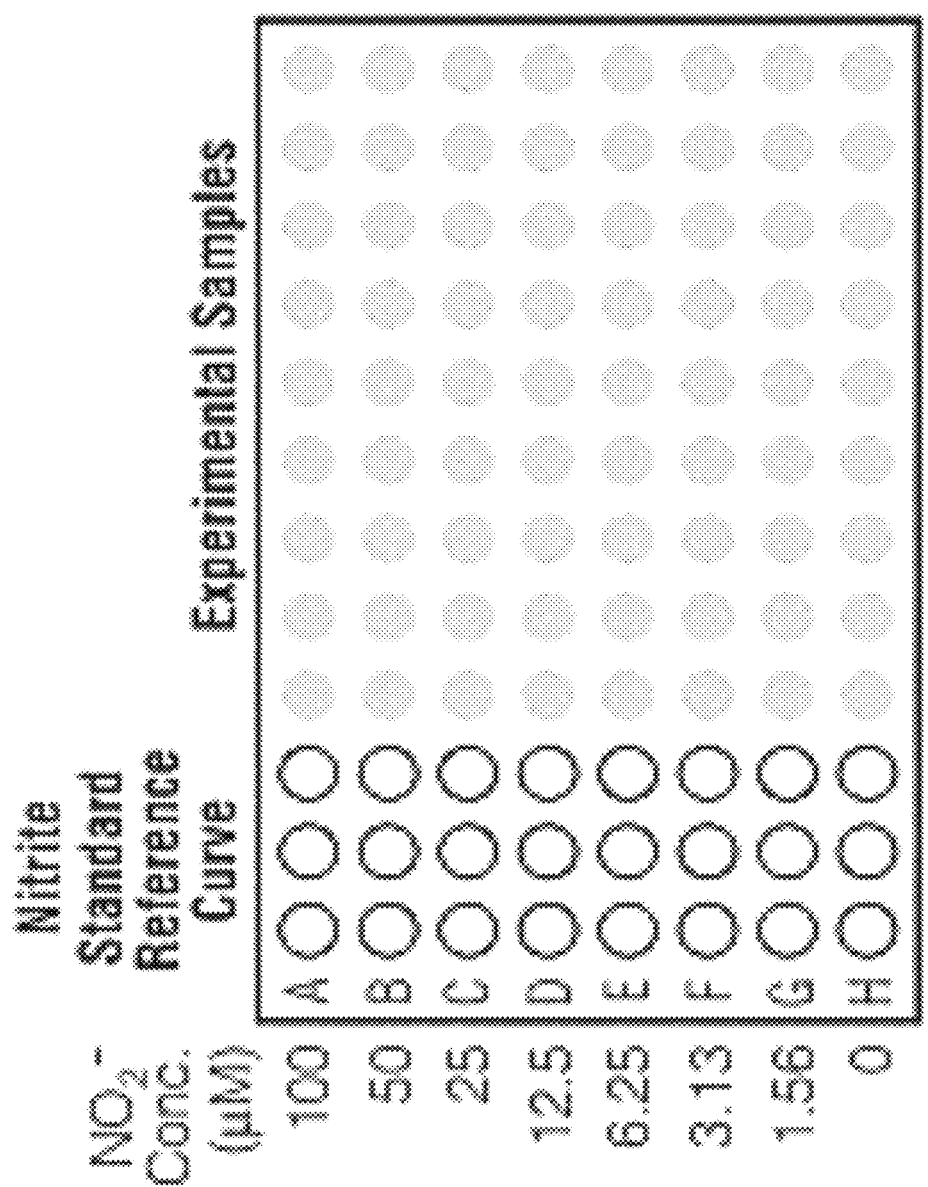
FIG. 1: Suggested plate formate for the Nitric oxide standard reference curve.

The following description is provided, alongside all chapters of the present invention, so as to enable any person skilled in the art to make use of said invention and sets forth the best modes contemplated by the inventor of carrying out this invention. Various modifications, however, is adapted to remain apparent to those skilled in the art, since the generic principles of the present invention have been defined specifically to provide means and methods for novel treatments of cancer, inflammatory or immune-mediated inflammatory diseases and medical conditions, by interaction and fixed dose combination of cannabinoids and medical mushrooms for prevention and treatment of these medical conditions.

The present invention discloses means and methods for treatment of cancer, inflammatory or immune-mediated inflammatory diseases by compositions which synergistically combine cannabinoids with therapeutic mushrooms.

The present invention discloses compositions which exert the combined effect of an anti-inflammatory effect as well as immune-stimulatory effect, thereby acting as anti-inflammatory or anticancer drugs without suppressing or diminishing immune-mediated processes. Furthermore, the compositions disclosed by the present invention are derived of natural products, therefore can play an important role in the development of more effective and safer agents to inhibit the development and onset of cancer, inflammatory or immune-mediated inflammatory diseases Specifically, the present invention discloses the synergistic combination of cannabinoids and therapeutic mushrooms. The cannabinoids (CBD, THC and few others) are potent anti-inflammatory agents with a known anti-cancer activity which also attenuate suppress or diminished immune mediate processes. Diminishing immune mediated processes might negatively affect processes where immune stimulation and anti-inflammatory affect (such as cancer) are required.

Therapeutic mushrooms are known as immunostimulators mainly affecting TH1, NK and macrophages polarization. These properties might be attributed to their known and claimed anti-cancer and modulatory effect in some immune-inflammatory process.

Immunostimulation by medicinal mushrooms generally occurs via innate immunity, and is typically mediated by phagocytic cells. These cells ingest invading pathogens or interact with pathogen components, which in either case further stimulate innate and adaptive immunity through secretion of cytokines and chemokines. Pattern-recognition receptors (PRR) on the cell surface—such as Toll-like receptors (TLR), mannose receptors and dectin1—trigger the response by recognizing conserved molecular patterns in the micro-organisms. There has been increasing interest in immunomodulating substances from mushrooms. Lentinan, for example, has been used extensively in the treatment of patients with cancer in Japan.

Fungal bioactive polysaccharides deriving mainly from the Basidiomycetes family (and some from the Ascomycetes) and medicinal mushrooms have been well known and widely used in far Asia as part of traditional diet and medicine, and in the last decades have been the core of intense research for the understanding and the utilization of their medicinal properties in naturally produced pharmaceuticals. In fact, some of these biopolymers (mainly b-glucans or heteropolysaccharides) have already made their way to the market as antitumor, immunostimulating or prophylactic drugs. The fact that many of these biopolymers are produced by edible mushrooms makes them also very good candidates for the formulation of novel functional foods and nutraceuticals without any serious safety concerns, in order to make use of their immunomodulating, anticancer, antimicrobial, hypocholesterolemic, hypoglycemic and health-promoting properties Combining cannabinoids with therapeutic mushrooms reveals a novel spectrum compositions which have unique and potent effects on clinical conditions such as Immune-mediated inflammatory disease (IMID) and medical conditions and cancer.

Therapeutic mushrooms are also combined to reveal compositions which have therapeutic effects on clinical conditions such as Immune-mediated inflammatory disease (IMID) and medical conditions and cancer.

As used herein after, the term Immune-mediated inflammatory disease (IMID) is a concept used to collectively describe a group of ostensibly unrelated conditions that share common inflammatory pathways.

Immune-mediated inflammatory diseases (IMIDs) comprise, but not limited to: Asthma, Chronic obstructive pulmonary disease (COPD); Psoriasis, Rheumatoid Arthritis, Inflammatory bowel disease (IBD), ulcerative colitis, Multiple sclerosis, autoimmune haemolytic anaemia, chronic inflammatory demyelinating polyneuropathy; giant cell arteritis; GN, glomerulonephritis; juvenile idiopathic arthritis, polymyalgia rheumatica; SAPHO, synovitis, acne, pustulosis, hyperostosis, osteitis, systemic lupus erythematosus; thrombotic/idiopathic thrombocytopaenic purpura, Sjogren's, Crohn's disease, Polymyositis/dermatomyositis, Wegener's granulomatosis, Wegener's vasculitis, Psoriasis, Behcet's, Polyarteritis nodosa, Takayasu's arteritis, Graft versus host disease, Polyarteritis nodosa, Sarcoidosis, Adult onset Still's disease, Hydradenitis supprativa, Cryoglobulinaemic vasculitis, Pyoderma gangrenosum, Kawasaki disease, Relapsing polychondritis, Anti-phospholipid syndrome, Cryoglobulinaemic vasculitis, Hydradenitis supprativa, Idiopathic membranous. Relapsing polychondritis, Coeliac disease, Chronic hepatitis C, Myasthenia gravis, Myelodysplastic syndrome Pemphigus, Refractory asthma, Grave's disease. Pyoderma gangrenosum, Erythema nodosum, SAPHO syndrome, Multicentric reticulohistiocytosis, Chronic hepatitis B, Amyloidosis, and any combination thereof.

As used herein after, the term "cannabis-derived compounds" refers hereinafter to compounds found in cannabis plant, comprising cannabinoids, terpenes and phenolic compounds. As used herein after, the term "cannabinoids" refers hereinafter to a class of diverse chemical compounds which are ligands for cannabinoid receptors in cells that alter neurotransmitter release in the brain. Cannabinoids were primarily discovered in marijuana (cannabis flower) and hashish (compressed cannabis resin) from the plant of *Cannabis sativa*. This plant contains more than 80 phytocannabinoids. The main active constituent of marijuana is the psychoactive Δ9-tetrahydrocannabinol (Δ9-THC), which acts at cannabinoid 1 (CB1) and cannabinoid 2 (CB2) receptors as a partial agonist. Other important natural cannabinoids present in marijuana are the non-psychoactive cannabidiol (CBD), Δ9-tetrahydro-cannabivarin (Δ9-THCV) and cannabichromene (CBC) [1-3]. Among them CBD has attracted the greatest attention thus far. It was shown to antagonize the effects of CB1/CB2 receptor agonists, to counteract the psychotropic and other negative effects of Δ9-THC and several data suggest that it behaves as an inverse agonist of CB1 and CB2 receptors. Some of these plant-derived cannabinoids are used in the medical practice, such as Δ9-THC (dronabinol) and its synthetic analogue, nabilone against chemotherapy-induced nausea and emesis, and as appetite stimulants (e.g. in AIDS patients). CBD combined with Δ9-THC (nabiximols) is used to relief neuropathic pain and spasticity in multiple sclerosis, and as an adjunctive analgesic treatment in advanced cancer pain.

As used herein after, the term "terpenes", refers hereinafter to a large and diverse class of organic compounds, produced by a variety of plants. Terpenes are derived biosynthetically from units of isoprene, which has the molecular formula $C_5H_8$. The basic molecular formula of terpenes are multiples of that, $(C_5H_8)n$ where n is the number of linked isoprene units. Terpenes are fragrant oils that give cannabis its aromatic diversity.

As used herein after, the term Cannabidiol (CBD), refers to *Cannabis sativa* constituent, which is a pharmacologically broad-spectrum drug that in recent years has drawn increasing interest as a treatment for a range of disorders.

The cannabis derived compounds comprise:
Cannabinoids: Tetra-hydro-cannabinoids (d9-THC), Tetra-hydro-cannabinoids (d8-THC), Tetra-hydro-cannabinolic acid (THCA-d9), Tetra-hydro-cannabivarin (THCV/THC-C3), Cannabidiol (CBD), Cannabidiolic acid (CBDA), Cannabidivarin (CBDV), Cannabigerol (CBG), Cannabigerolic acid (CBGA), Cannabinol (CBN), Cannabidiolic acid (CBNA), Cannabichromene (CBC), Cannabichromenic acid (CBCA);
Terpenes: Mono-terpenes and Sesqui-terpenes; and
Phenolic Compounds: O-glycoside Cannaflavin A Cannaflavin B Canabisin D.

As used herein the term "about" denotes ±25% of the defined amount or measure or value.

As used herein the term "therapeutic mushrooms" or "medicinal mushrooms" comprise, but not limited to mushrooms selected of: *Cordyceps*, Maitake (*Grifola frondosa*), Turkey Tail (*Trametes versicolor, Coriolus versicolor*), Chaga (*Inonotus obliquus*), Reishi (*Ganoderma lucidum*), Shiitake (*Lentinus edodes*), *Agaricus blazei* Murill and any combination thereof.

*Cordyceps*

Background: *Cordyceps* are the most diverse genus of the Clavicipitaceae family in the Order Hypocreales. Out of over 400 species which have been reported, the most documented species is the *Cordyceps sinensis*.

*Cordyceps sinensis* (*C. sinensis*), is a Chinese medical medicinal mushroom. It is naturally found on the Himalayan mounts at altitudes above 3600 m. In addition, *C. sinensis* can be produced from cultivated mycelia extract for commercial growth. *C. sinensis* is classified as a drug in the Chinese Pharmacopoeia since 1964.

Use in traditional medicine: In traditional Chinese medicine, *C. sinensis* has been used fatigue, poor appetite, kidney asthenia, tuberculosis, chronic bronchitis, male impotence, and hyposexuality, (Chen P X, et. al, 2017), treating health conditions related to the cardiovascular, immune, endocrinal, and nervous systems (Zhu J S, et. al, 1998).

In addition *C. sinensis* has been reported to have immunomodulatory, anticancer, antiaging, antioxidant, and anti-inflammatory activity (Tuli H S et. al, 2014; Shashidhar M G et. al, 2013; Nie S et. al, 2013).

Extraction methods: Different compounds of the *C. sinensis* can be extracted by using different mediums as water, methanol, ethanol, trypsin, MeOH and EtOAc (Chen P X et. al, 2013).

Biologically Active Compounds

*C. sinensis* active compounds include but not limited to the following groups: Nucleosides (Cordycepin & Adenosine), Polysaccharides (Water-soluble polysaccharides isolated from *C. sinensis* (CPS1), Water-soluble polysaccharides isolated from *C. sinensis* (CPS2), and Acid polysaccharides isolated from cultivated *C. sinensis* (APC), Peptides (Cyclodipeptides & Cordymin) and Sterols (Ergosterol & Sitosterol).

Pre-clinical studies: *C. sinensis* extracts were used in different pre-clinical studies for several indications include antioxidant (Vasiljevic J D et. al, 2016: Wang J1 e, al, 2012; Ji, D.-B et. al, 2009), reduced the formation of transplant arteriosclerosis (Zhang, Y et. al, 2011) and anti-tumor (Chen, Y et. al, 2009).

Pharmacological activity—inflammation & cancer: Numerous studies show that *C. sinensis* active compounds have anti-inflammatory and anti-cancer properties. The main pharmacological activities are mediated via attenuation of pro-inflammatory cytokines such as TNF-α and ICAM-1 as well as reduction of PCNA expression (Zhang et. al, 2011), inhibition of IL-2 and TGF-β secretion and enhancement of IL-4 secretion (Jeong et. al, 2002). Also, inhibition of COX-2 and NFκB was shown (Wang J1 et. al, 2012b).

Pre-Clinical and Clinical Doses

| Species | Strain | Method, ROA | Dose | Duration | Indication | Ref. |
| --- | --- | --- | --- | --- | --- | --- |
| Human | | Test on blood samples | 1.0 mg/ml | | DNA-damaged following oxidative stress | 00Vasiljevic JD et. al, 2016 |
| Rat | Wistar | PO | 2.0, 4.0 | 30 Days | decreased level of antioxidant enzymes following cerebral ischemia | Wang J1 et. al, 2012a |
| Rat | Brown-Norway | PO | 0.5, 1.0, 2.0, 5.0 | 60 Days | reduced the formation of transplant arteriosclerosis | Zhang, Y et al, 2011 |
| Rat | SD | PO | 1.0, 2.0, 4.0 | 6 Weeks | antioxidant enzyme function and slow the overall aging progress | Ji, D.-B. et. al, 2009 |
| Mouse | ICR | PO | 0.5, 1.0, 2.0 | 21 Days | | |
| Mouse | C57BL/6J | IP | 0.1, 0.5 | 21 Days | inhibitory effect on cell population growth of melanoma | Chen, Y., Guo, et. al, 2009 |
| Mouse | C3H/He | *C. militaris* enriched food and water | NA | 30 days | FM3A murine breast cancer | Jeong et. al, 2002 |

Maitake (*Grifola frondosa*)

Background: *Grifola frondosa* is a dark grayish brown fungus, found mostly on the ground at or near the base of stumps of tree trunks of dead, dying, or aging hardwoods, such as oaks, elms, maples, black gums, beech, and chestnut. *G. frondosa* is mainly distributed in Northern temperate regions in Japan, European countries and the northeastern states of America (Global Biodiversity Information Facility, www.gbif.or, 2017), and also can be found at high elevations with temperate climate in subtropics (S. H. Han et, at, 1995). It is well known all over the world by different names include Maitake/kumotake (Japan), gray tree flower (China), signorina mushroom (Italy) and "hen of the woods" (North America).

Use in traditional medicine: *G. frondosa* is prized in traditional Chinese and Japanese "herbology" as a medicinal mushroom. It use in different indications as protect the spleen (Chinese Herbalism Editorial Board, Zhonghua Bencao, Shanghai Science and Technology Press, Shanghai, 1999, pp. 548-549.), stomach, and liver (C. Zhou et. al, 2013), and may also use to calming nerves and mind (T. Mizuno, 1995).

Extraction methods: Polysaccharides: Hot Water→3% $NH_4$ Oxalate (100° C.)→5% NaOH solution (30° C.) (Mizuno T et. al, 1995). Grifulan (GRN): *G. frondosa* was grown in 100 ml of medium containing 2% glucose, 0.6% polypeptone, 2% cane sugar and 0.1% soybean oil at pH 4.5, 25° C., 14 days. The mycelium was separated by filtration and incubated in 0.5% citrate buffer (pH 4.0 containing 5% glucose at 25° C., 6 days. After 6 days incubation the mixture was centrifuged and the supernatant solution was diluted with one volume of ethanol, and the precipitate was dissolved in 8M urea. The solution was further purified by DEADE-Sephadex A-25 to remove contaminating proteins. The non-adsorbed fraction was dialyzed against water and precipitated with ethanol followed by drying in vacuo (Adachi Yoshiyuki et. al, 1994)

Biologically active compounds: *G. frondosa* extracts contain a wide range of active compounds such as Glucans (e.g. NMF-5N, Grifolan LE, GFP2, GFPBW1) and Heteropolymer (e.g. FII-3, FIII-1a, GFP1). *G. frondosa* is also rich sources of trehalose (S. J. Huang, S. Y et. al, 2011), which has been extensively used as food preservative, sweetener and vaccine stabilizer.

Among the various Maitake fractions prepared, the D-fraction was found to be very promising for enhancing the immune system whether oral administration or injection. Other than many antitumor mushroom polysaccharides which are mainly composed of ˇ-1,3-glucan as a main chain with ˇ-1,6 branches, the polysaccharide moiety of D-fraction is (1→3)-branched (1-6)-ˇ-glucan. Further purification of the D-fraction yielded the MD-fraction (He. Xirui, et al, 2017).

Pre-clinical studies: Bioactivities of polysaccharides isolated from *G. frondosa* were reported in many pre-clinical studies (He, Xirui, et al, 2017), for different indications such as anti-tumor, treatment of skin disease, immunomodulatory activity and Antioxidant activity.

Pharmacological activity—inflammation & cancer: Several studies have shown that many antitumor polysaccharides work through a host-mediated mechanism rather than directly action tumor cells. *G. frondosa* polysaccharides not only as biological response modifiers assist the host to endure adverse biological stresses and to increase immunity against the development of tumor cells, but also directly induce tumor cell apoptosis (He, Xirui, et al, 2017). Another study has shown that maitake D-Fraction induces the onset of immunity dominated by Th-1 cells converted from Th-0 cells, and consequently stimulates cellular immunity, and expresses anti-tumor effects (Inoue, Atsuyuki et. al, 2002). Numerous studies have confirmed that maitake has prominent beneficial effects on immune function. It promotes the action of not only macrophages, but also a variety of other immune-related cells, such as natural killer (NK) cells and cytotoxic T-cells (Tc) that can attack tumor cells. Maitake also increases the immune-related efficiency of these cells by increasing interleukin-1, interleukin-2, and lymphokines. Maitake fractions in particular seem to have a specific antitumor action, potentially slowing the growth of tumors in the colon, lungs, stomach, liver, prostate, brain, and other organs. (It should be noted that any research references to the D-fraction also apply to the MD-fraction, as they are the same beta 1,6/1,3 glucan derived from *Grifola frondosa*. (Mayell, Mark, 2001). Pre-clinical and clinical doses

| Species | Strain | Method | Dose | Duration | Indication | Ref. |
|---|---|---|---|---|---|---|
| Human | Postmenopausal breast cancer patients | PO | Maitake extracts 0.1, 0.5, 1.5, 3, or 5 mg/kg twice daily | 3 weeks | Augmentation of immunologic function | Deng, Gary, et. al., 2009 |
| | cancer patients in stages II-IV, from 33 to 68 years old | PO | 50-150 mg/day MD-fraction 4-6 gr/day whole powdered maitake | 2-5 years | Adjunctive therapy to chemotherapy or treatment for patients that discontinued chemotherapy due to side effects | Kodama, Noriko et. al, 2002 |
| Mouse | Male C3H/HeN (4 weeks old) | IP | D Fraction 5 mg/kg/day | 19 days, 24 hrs after tumor implantation | MM-46 carcinoma cells ($2 \times 10^6$) | Inoue, Atsuyuki et. al, 2002 |
| | ICR | PO | Various polysaccharide fractions 0.5 ml, 3 mg/ml, 10 times | 12 days | Sarcoma 180 ($1 \times 10^6$) | Hishida Ikuko et. al, 1988 |

| Species | Strain | Method | Dose | Duration | Indication | Ref. |
|---|---|---|---|---|---|---|
| | ICR female (7 weeks old) | IP | Polysaccharides 1~100 mg/kg (once) | 45 days | Sarcoma 180 cells ($2 \times 10^6$) | Mizuno T. et. al, 1995 |
| | | PO | Polysaccharides 1~100 mg/kg (once or 10 times) | 45 days | | |
| In Vitro | Mouse Peritoneal Macrophages RAW 264.7 cells | In-vitro LPS stimulation | GRS 100/500 μg/ml | 24-48 hrs | Pro-inflammatory cytokines production | Adachi, Yoshiyuki et. al, 1994 |
| | Human gastric cancer cell lines (TMK-1, MKN28, MKN45 and MKN74) | In-vitro | Water-soluble Maitake extract 10% | 0, 24, 48 or 72 h | Pro-apoptotic activity | Shomori, K et. al, 2009 |

Turkey Tail (*Trametes versicolor, Coriolus versicolor*)

Background: Turkey tail is a type of mushroom that grows on dead logs worldwide. It's named turkey tail because its rings of brown and tan look like the tail feathers of a turkey. Its scientific name is *Trametes versicolor* or *Coriolus versicolor*.

Turkey tail has been used in traditional Chinese medicine to treat lung diseases for many years. In Japan, turkey tail has been used to strengthen the immune system when given with standard cancer treatment.

Use in Traditional Medicine: Boosting of Immune System: Extraction Methods

The aqueous extracts obtained from *T. versicolor* have a wide array of biological activities, including modulatory and stimulatory effects on different immune cells, as well as the inhibition of cancer cell growth, has recently been demonstrated. Among the different bioactive components that are derived from hot water and standardized ethanol-water extracts of *T. versicolor*, protein-bound polysaccharides (PSK, also known as Krestin) and polysaccharopeptides (PSPs) had vigorous biological activities (Habibi, Emran, et al., 2015).

Biologically active compounds: The polysaccharopeptide obtained from this mushroom possesses immunomodulatory, antitumor, and hepatoprotective4 activities, and has been used as an immunomodulatory and antitumor drug for cancer patients. A closely related polysaccharide, PSK (Krestin), has been isolated from *C. versicolor* by Japanese investigators and demonstrated to have immunostimulatory activity.

Polysaccharide K (PSK) is the best known active compound in turkey tail mushrooms. In Japan, PSK is an approved mushroom product used to treat cancer (Hobbs C., 2004; Jeong, Sang-Chul, et al, 2015).

Pre-clinical studies: PSK and PSP have demonstrated a wide range of immunological effects in vitro and in vivo, particularly reticuloendothelial system activation, cytokine modulation (IFN-γ production, IL-2 production), enhancement of dendritic cell viability, T-cell maturation, natural killer cell activity, antibody production, and antitumor and anticancer effects. The extracts can inhibit carcinogenesis and tumor cell growth by activating cancer cell apoptosis (Hobbs C., 2005).

Pre-Clinical and Clinical Doses

| Species | Strain | Method | Dose | Duration | Indication | Ref. |
|---|---|---|---|---|---|---|
| Mice | BALB/c C5-7BL/6N | IP | 5/10 50/100 mg/kg | 3 times a week (Days 1 till 28) | Meth A sarcoma model (combination therapy of PSK and UFT/LV) | Katoh R et. al, 2007 |
| | BALB/c | IP | 10 mg/kg | single dose or 7/10 times | colon adenocarcinoma 26 (C26 tumor) | Matsunaga K e. al, 2009 |
| | C57BL/6 | IP | 10 mg/kg | every other day | Lewis lung carcinoma or B16 melanoma | |
| | C57BL/6N | IP | 50 mg/kg | 21 days every second day | Lewis lung carcinoma | Ishihara Y et. al, 1999 |
| | BDFI (C57BL/6 females × DBA/2N males) | PO | 1000 mg/kg | 10 × daily dose | B-16-Melanoma | Ueno Y et. al, 1994 |
| Human | Women with breast cancer that completed radiotherapy | PO | 3, 6, 9 gr/day | 6 weeks | Improvement of immunological function | Torkelson, Carolyn J., et al. 2012 |

-continued

| Species | Strain | Method | Dose | Duration | Indication | Ref. |
|---|---|---|---|---|---|---|
| | Adjunctive therapy with 5-FU in colon cancer | PO | PSK, 300 mg/day | 4 weeks × 10 (alternate treatment with 5-FU) | Adjunctive therapy with 5-FU, survival, cancer-free period | Takahashi Yutaka et. al, 2005 |
| | Gastric or Colorectal cancer | PO | PSK 3 gr/day | 3 months | Adjunctive therapy with tegafur/uracil Effects on T and Dendritic cells differentiation | Kanazawa Masashi et. al, 2005 |

Shiitake (*Lentinus edodes*)

Background: Since ancient times in the East, shiitake mushrooms (*Lentinus edodes*) have been—and still are—one of the most edible mushrooms shown to have medicinal properties. The glucan component, especially lentinan, a purified b-1,3-D-glucan with b-1,6 branches and a triple helical structure has been proven to have marked antitumor activity. Lentinan is also shown to be an immunopotentiator and appears to stimulate macrophage and T-cell proliferation with no direct cytotoxic effect against tumor cells (Ng, Mah-Lee, 2002).

Use in traditional medicine: *L. edodes* is one of the well-known macrofungus used in several therapeutic applications. It is the source of several well-studied preparations with proven pharmacological properties. The medicinal properties of *L. edodes* have been studied since Ming Dynasty (1369-1644). The elders from Japanese Empire considered shiitake as the "elixir of the life" increasing vigor and energy. Antibiotic, anti-carcinogenic, anticancer, antifungal, antibacterial and antiviral, antidiabetic, hypolipidemic compounds have been isolated intracellularly (fruiting body and mycelia) and extracellularly (culture media) from *L. edodes*. Some of these substances were lentinan, lectin and eritadenine. The shiitake mushroom is used medicinally for diseases involving depressed immune function (including AIDS), cancer, diabetes, environmental allergies, fungal infection, frequent flu and colds, bronchial inflammation, and regulating urinary incontinence (Bisen, P. S., et al, 2010).

Extraction methods: Ethyl Acetate—Frozen shiitake mushrooms (2000 g) were extracted with 80% aqueous methanol (3000 mL) and 50% aqueous methanol (3000 mL) at 5° C. The extracts were combined and concentrated on a rotary evaporator under reduced pressure at room temperature until the methanol was removed. The aqueous extract (200 mL) was partitioned with ethyl acetate two times (300 mL×2). The combined ethyl acetate fraction was evaporated under reduced pressure at room temperature followed by drying in a freeze-dryer. The ethyl acetate fraction represented 2.12% of frozen weight of the shiitake mushrooms (Fang, Nianbai, et al, 2006).

Ethanol precipitation and freeze drying in liquid nitrogen—the β-D-glucan isolated through this method was found to be lentinan. Purity tests carried out using a carbohydrate analysis column, a chromatographic method, has shown a significant lentinan purity of 87.50% (Yap, Ann-Teck, and Mah-Lee Ng, 2001).

The powdered shiitake fruit bodies (A) were extracted for 8 h at 42° C. with a 1:1 mixture of EtOEt and EtOH. The extraction was repeated 3 times. The extracts obtained were combined and evaporated under N2 gas. The extractable material (lipid) was taken as B fraction. The residue of shiitake powder was extracted with EtOEt and EtOH mixture to provide C fraction. The insoluble residue of the extraction (lipid) was treated with hot water at 120° C. for 2 h for the extraction of glucan. The residue was taken as E fraction. The shiitake powder (A) which had been treated with hot water was filtered to exclude soluble glucan and the residue was taken as fraction D (Nanba Hiroaki, et al., 1987).

Biologically active compounds: Scientific investigations have led to isolation of many compounds from *L. edodes* having health promotion activities Fruit bodies of *L. eddoes* contains 88-92% water, protein, lipids, carbohydrates as well as vitamins and minerals. The mushroom is a good source of vitamins, especially provitamin D2 (ergosterol which under ultraviolet (UV) light and heat yields calciferol (vitamin D2). It also contains B vitamins, including B1 (thiamine), B2 (riboflavin) and B12 (niacin). The fatty acids account for 3.38% of the total lipids with an appreciable amount of amino acids. In addition to glycogen-like polysaccharides, (1-4)-, (1-6)-D-glucans and antitumor polysaccharides, lentinan, (1-3)-, (1-6)-bonded heteroglucans, heterogalactans, heteromannans, xyloglucans, etc., have been identified. Among the free sugars present are trehalose, glycerol, mannitol, arabitol, mannose, and arabinose. In shiitake mushrooms, dietary fiber consists of water-soluble materials such as -glucan and protein and water-insoluble substances extractable only with salts, acids, and alkalies such as polyuronide (acidic polysaccharide), hemicellulose, -glucan with heterosaccharide chains, lignin, and chitin present as cell wall constituents (Bisen, P. S., et al., 2010). With regard to identification of anticancer constituents in shiitake mushrooms, an antitumor polysaccharide was isolated from fruiting bodies and named lentinan. Its structure was confirmed as β-(1→3)-glucans $(C_6H_{10}O_5)_n$, with the mean molecular weight of $5\times10^5$ kDa. Lentinan has been established to be a major antitumor-active component in shiitake mushrooms. However, mammals lack the enzyme, β-1→3-glucanase, required to digest lentinan and purified lentinan has been reported to possess no antitumor activity when administered orally (Fang, Nianbai, et. al, 2006).

Pre-clinical studies: Orally administered shiitake mushroom fruiting bodies have been reported to have anticarcinogenic effects against some tumor types and that these effects appear to be strain specific. Diets containing shiitake mushrooms significantly reduced the growth of Sarcoma-180 cells in female ICR mice and MM-46 carcinoma in C3H mice, but had little effect on growth of other tumor types such as B-16 melanoma, Lewis lung carcinoma, or meth-A fibrosarcoma. Moreover, the anti-cancer effects of the shiitake diets were found to be accompanied by activation of macrophages and increased cytotoxic effects of both NK and killer T cells, suggesting that one possible mechanism of this tumor-inhibiting activity may involve boosting immune surveillance (Fang, Nianbai, et al, 2006).

Pharmacological activity—inflammation & cancer: Shiitake mushrooms (*Lentinus edodes*) have been described as having antiviral, antibiotic, anti-inflammatory, antihypertensive, and anticancer properties, and have been popular as a health food for thousands of years in the East and more recently in the West (Fang, Nianbai, et al, 2006).

*Lentinus edodes* has attracted a lot of attention owing to its immunomodulatory effects. Lentinan is well known as a type of biological response modifier (BRM). Augmentations of NK (Natural Killer), CTL (Cytotoxic T Lymphocyte), LAK (Lymphokine Activated Killer) activities and DTH (Delayed Type Hypersensitivity) responses against tumor antigen were observed after administration of Lentinan. These activities are responsible for the antitumor effects of lentinan (Bisen, P. S., et al., 2010).

Pre-Clinical and Clinical Doses

*Ganoderma lucidum* is a natural medicine that is widely used and recommended by Asian physicians and naturopaths for its supporting effects on immune system. Laboratory research and a handful of preclinical trials have suggested that *G. lucidum* carries promising anticancer and immunomodulatory properties. The popularity of taking *G. lucidum* as an alternative medicine has been increasing in cancer patients (Jin, Xingzhong, et al., 2012).

Use in traditional medicine: *Ganoderma lucidum*, has been used as a medical remedy in China, Korea, and Japan for centuries. This edible mushroom was considered to preserve the human vitality and to promote longevity. In addition, *Ganoderma lucidum* has been used to treat various human diseases such as allergy, arthritis, bronchitis, gastric ulcer, hyperglycemia, hypertension, chronic hepatitis,

| Species | Strain | Method | Dose | Duration | Indication | Ref. |
|---|---|---|---|---|---|---|
| In-Vitro | human breast carcinoma cell lines (MDA-MB-453 and MCF-7), one human nonmalignant breast epithelial cell line (MCF-10F), and two myeloma cell lines (RPMI-8226 and IM-9 | MTT, apoptosis bioassay, cell cycle analysis, and Western blot analysis | Ethyl Acetate fraction 12.5, 50, 200, and 800 mg/L | 24, 48, 72 hrs | Proliferation, apoptosis | Fang, Nianbai, et al |
| Mouse | AKR (male, 7 weeks) | PO | Lentinan, 3 mg/mouse/day | 7 days | K36 murine lymphoma | Ng, Mah-Lee, 2007 |
|  | Nude mice (5 weeks) | PO | Shiitake Mushroom extract 10%, 10 mL/kg | 19 days | PC-3 cells | deVere White et, al, 2002 |
|  | ICR (4-5 weeks, male) CH3/He (6 weeks, male) Balb/C (7 weeks, male) C57BL/6 (6 weeks, male) CDF₁ (5-6 weeks) | PO | Powdered Shiitake fruit bodies added to food chow at 10, 20 and 30% | 25 days | Sarcoma 180 ascites MM-46 carcinoma Meth-A fibrosarcoma B-16 melanoma and Lewis Lung Carcinoma Syngeneic IMC carcinoma cells | Nanba Hiroaki, et al., 1987 |
| Human | 53.6-85.5 years old men with prostate cancer, PSA positive | PO | Shiitake Mushroom extract capsules, 8.5-10 gr/day | 6 months | PSA levels reduction[1] | deVere White et, al, 2002 |
|  | Meta-analysis of 650 patients with advanced gastric cancer | IV | 2 mg/week | 2-5 years | Adjunctive therapy of Lentian with fluorinated pyrimidines chemotherapy (Meta-analysis) | Oba, Koji, et al., 2009 |

[1]Primary endpoint as not achieved

Reishi (*Ganoderma lucidum*)

Background: Reishi is a basidiomycete, lamnellaless fungus belonging to the family of polyporaceae. In nature, it grows in densely wooded mountains of high humidity and dim lighting. It is rarely found since it flourishes mainly on the dried trunks of dead plum, guercus serrata or pasonia trees. Out of 10,000 such aged trees, perhaps 2 or 3 will have Reishi growth, therefore it is very scarce indeed. The status of Reishi in the health food industry is unparalleled. It is the culmination of the knowledge and wisdom of the East and West for 5,000 years. Its effectiveness as a health food and as a highly potent medicine have been demonstrated by over 30 years of modern scientific research in all over the, Reishi can safely claim to be totally free from side-effects.

hepatopathy, insomnia, nephritis, neurasthenia, scleroderma, inflammation, and cancer (Daniel Sliva, 2003).

Extraction methods: Chipped fruiting bodies of *Ganoderma lucidum* (1 kg) were extracted with ethanol (95%, 1l) for 24 hr at room temperature to give 35 g of solid extract. The ethanol extract was suspended in chloroform and extracted with a saturated $NaHCO_3$ solution. The $NaHCO_3$ phase was then collected and adjusted to pH 3 with cold HCl solution (6N). The resulting precipitates were extracted by chloroform, and 10.9 g ethanol-soluble and acidic components (ESAC) were obtained as a yellow solid (Hu, Hongbo, et al. 2002)

The active ingredients of ReishiMax GLp™ were standardized as 13.5% polysaccharides (β-1,3-glucans) and 6% triterpenes (ganoderic acids and other), which is the highest level of extractable activities, whereas the remaining 80% composed of nucleosides, fatty acids, and amino acids, according to the manufacturer's technical bulletin. The powdered extract was sonicated with 95% ethanol for 30 minutes, and the supernatant was further extracted by successive sonication using absolute ethanol. The water insoluble brown powder, i.e. GLE was retrieved from the filtrate (through 0.45 µm polypropylene filter) under reduced pressure (Yuen, John W M, et. al, 2007). The fruiting bodies of G. lucidum collected from southern China were washed, disintegrated, and extracted twice with hot water at 70° C. for 3 hours as described previously.34 All hot-water extracts were pooled, and the PS-enriched fractions were precipitated by the addition of 75% (vol/vol) 160 GAO ET AL. ethanol. The PS-enriched fraction was further purified by high-performance anion-exchange and gel filtration chromatography using a 1.6-100-cm column packed with Sephadex G-25 (Gao, Yihuai, et al, 2005).

Biologically active compounds: The effectiveness of Reishi has been attributed to either the polysaccharide fraction, which is responsible for the stimulation of the immune system, or to the triterpenes, which demonstrate cytotoxic activity against a variety of cancer (Suarez-Arroyo, Ivette J., et al., 2013).

The biologically active polysaccharides were mainly in the form of β-D-glucans, and the antitumor activity from Ganoderma lucidum was exhibited mainly by the branched (1→3)-β-D-glucans.

Major Bioactive Constituents: Over 300 reports have been published concerning the chemical constituents G. Lucidum and related species. The fruiting body, mycelia and spores of G. lucidum contain approximately 400 different bioactive compounds, which mainly include triterpeniods, the sterols, steroids, fatty acids, proteins, peptides and trace elements (Babu, P. Dinesh, and R. S. Subhasree, 2008).

Pre-clinical studies: Ganoderma lucidum, a medicinal mushroom, has been reported to have anti-tumor activity in mice. Further studies suggest that the G. lucidum polysaccharide (PS) fractions are involved in this anti-tumor action.12,13 G. lucidum PS is able to activate macrophages, T lymphocytes, and NK cells, and induce the production of cytokines such as tumor necrosis factor (TNF)-α, interleukins (ILs), and interferons (IFNs) in vitro using human immune cells and in vivo in mice.

Pharmacological activity—inflammation & cancer: Ganoderma lucidum inhibits constitutively active transcription factors nuclear factor kappa B (NF-κB) and AP-1, which resulted in the inhibition of expression of urokinase type plasminogen activator (uPA) and its receptor uPAR. Ganoderma lucidum also suppressed cell adhesion and cell migration of highly invasive breast and prostate cancer cells, suggesting its potency to reduce tumor invasiveness. Thus, Ganoderma lucidum clearly demonstrates anticancer activity in experiments with cancer cells and has possible therapeutic potential as a dietary supplement for an alternative therapy for breast and prostate cancer (Daniel Sliva, 2003). Reishi treated tumors showed reduced expression of E-cadherin, mTOR, eIF4G, and p70S6K, and activity of extracellular regulated kinase (ERK1/2). Reishi suppresses protein synthesis and tumor growth by affecting survival and proliferative signaling pathways that act on translation, suggesting that Reishi is a potential natural therapeutic for breast and other cancers (Suarez-Arroyo, Ivette J., et al., 2013).

The activity of polysaccharides from Ganoderma lucidum was suggested to be mediated through the complement receptor type 3 (CR3 receptor), which binds β-glucan polysaccharides. Polysaccharides from the mushroom were demonstrated to prevent oncogenesis and tumor metastasis indirectly, via the activation of the immune response of the host organism by the stimulation of natural killer cells, T cells, B cells, and macrophage dependent immune system responses. Polysaccharides isolated from the fresh fruiting body of Ganoderma lucidum (PS-G) stimulated production of interleukin (IL)-1β, tumor necrosis factor (TNF)-α, and IL-6 from human monocyte-macrophages and interferon (IFN)-γ from T lymphocytes. Furthermore, these PS-G-induced cytokines suppressed the proliferation and clonogenicity of human leukemic cells. PS-G also enhanced the immune responses and elicited antitumor effects from human neutrophils by inhibiting spontaneous and Fas-mediated apoptosis through the activation of the phosphatidylinositol (PI) 3-kinase/Akt pathway. In addition, PS-G enhanced phagocytic activity of neutrophils through the mitogen-activated protein kinase (MAPK) and protein kinase C (PKC) pathways. Also, polysaccharides from Ganoderma lucidum demonstrated a chemopreventive effect, which was mediated by the induction of glutathione S-transferase (GST) activity (Daniel Sliva, 2003).

In addition, more than 100 highly oxygenated and pharmacologically active lanostane-type triterpenes have been isolated from Ganoderma lucidum.

Pre-Clinical and Clinical Doses

| Species | Strain | Method | Dose | Duration | Indication | Ref. |
| --- | --- | --- | --- | --- | --- | --- |
| In-Vitro | MCF-7 cells | In-Vitro | 500 µg/ml | 12, 24, 36, 48 hrs | Cell cycle analysis, apoptosis assay | Hu, Hongbo, et al. 2002 |
| | lung tumor cell line 95-D, human liver tumor cell line SMMC7721, human epidermal cancer KB-A-1 and KB-3-1, human cervical cancer HeLa | In-Vitro | Ganoderic acid T 0, 6, 12.5, 25 and 50 mg/ml | 24 hrs | Cell proliferation assay, cytochrome-C release, mitochondrial membrane potential, caspase activity | Tang, Wen, et al., 2006 |
| Mouse | Balb/C, 4 weeks | celiac injection | GA-T at the dosage of 0, 12.5 and 25 mg/kg for 12 days | 3 weeks | Tumor size | Tang, Wen, et al., 2006 |

-continued

| Species | Strain | Method | Dose | Duration | Indication | Ref. |
|---------|--------|--------|------|----------|------------|------|
| | SCID, 21 days, female | PO | 28 mg/kg/d | 13 weeks | Human derived IBC cell line SUM-149 | Suarez-Arroyo, Ivette J., et al., 2013 |
| Human | Advanced Lung Cancer | PO | 1,800 mg, three times daily orally before meals for 12 weeks | 12 weeks | Cytotoxicity, cytokine profile, NK activity, lymphocyte subsets | (Gao, Yihuai, et al, 2005) |

*Agaricus blazei* Murill

Background: The medicinal mushroom *Agaricus blazei* Murill from the Brazilian rain forest has been used in traditional medicine and as health food for the prevention of a range of diseases, including infection, allergy, and cancer. Other scientists and we have examined whether there is scientific evidence behind such postulations. *Agaricus blazei* M is rich in the immunomodulating polysaccharides, β-glucans, and has been shown to have antitumor, anti-infection, and antiallergic/-asthmatic properties in mouse models, in addition to anti-inflammatory effects in inflammatory bowel disease patients. These effects are mediated through the mushroom's stimulation of innate immune cells, such as monocytes, NK cells, and dendritic cells, and the amelioration of a skewed Th1/Th2 balance and inflammation (Hetland, Geir, et al., 2011).

Use in Traditional Medicine

*Agaricus blazei* is a medically important mushroom widely eaten and prescribed in Japan.

*Agaricus blazei* has traditionally been used as a health food for the prevention of cancer, diabetes, hyperlipidemia, arteriosclerosis and chronic hepatitis.

According to legend, older people in this region had fewer serious diseases than those in neighbouring communities, presumably due to the use of *Agaricus blazei* as food. Besides cancer and chronic hepatitis, this mushroom has been used in folk medicine against a variety of diseases, including diabetes, arteriosclerosis and hyperlipidaemia (Hetland, Geir, et al., 2008).

Extraction methods: Repeated extraction with hot water, cold NaOH, and then hot NaOH (Ohno, Naohito, et al, 2001). *Extraction of the hot water-soluble fraction.* Mycelial fraction (100 g) was extracted 3 times with hot water (500 ml) for 3 h. The suspension was filtrated to remove the insoluble material. After evaporating the aqueous extract under reduced pressure, an equal volume of ethanol was added to the extract, and the precipitated polysaccharide was collected by centrifugation at 8,000 rpm for 20 min. The crude polysaccharide was dissolved in water, and dialyzed against distilled water. An equal volume of ethanol was added to the dialysate again and the suspension was centrifuged at 10,000 rpm for 20 rain. The polysaccharide fraction obtained was dissolved and lyophilized, and is henceforth referred to as the hot water-soluble (HWS) fraction.

Isolation of an anti-tumor polysaccharide from the HWS fraction: The HWS fraction (100 mg) was dissolved in 100 ml water. The solution was added to 100% saturated (NH4)2SO4 for salting-out, and then centrifuged for 15 rain at 120×g. The supernatant (FA) and the precipitate (FB) were dialyzed against distilled water through a cellulose tube. This dialyzates were evaporated to a small volume and then lyophilized. The aqueous solution of FA (5 mg) was submitted to an ion exchange chromatography on a DEAE-Sepharose CL-6B column (5.2×38 cm) with the stepwise elution of 2000 ml each of distilled water, containing 0.5 M and I M NaCl, and then 0.1 N NaOH. The second anion exchange chromatography was performed on the same column with a gradient elution between 0 and 2 M NaCl in distilled water. The active fraction was further separated on a Sepharose 4B column (1.6×90 cm) using distilled water as an eluent (Mizuno, Masashi, et al., 1999).

The dried fungal bodies of *A. blazei* (1 kg) were directly extracted with chloroform/methanol (1:1, v/v) (2 L 3 3) for 3 h under reflux. The chloroform/methanol extract was concentrated under reduced pressure to provide a brown extract (250 g). The chloroform/methanol extract (200 g) was divided into acetone-soluble (160 g) and -insoluble (40 g) fractions. The acetone-soluble fraction (35 g) was further divided into n-hexane-insoluble (16 g) and -soluble (14 g) fractions. The n-hexane-insoluble fraction (15 g) was chromatographed on a silica gel column, and ergosterol (2.4 g) was isolated as an active substance (Takaku Takeshi et. al, 2001).

Disrupted dried fruit bodies (3 kg) were extracted with 80% ethanol for 22 h under reflux at 70-80° C. After centrifugation and removal of the insoluble fraction, the soluble fraction (~200 g) was freeze-dried and designated Fraction 1. The insoluble material (~2.5 kg) was then extracted under reflux with water at 80-90° C. for 22 h, the water-soluble fraction (~250 g) being designated Fraction 2. The water-insoluble residue (~2 kg) was extracted three times with 5% ammonium oxalate by heating under reflux for 12 h. About 20 liters of the 5% ammonium oxalate-soluble fraction were concentrated to 4 liters. Two liters of this concentrated fraction underwent ultrafiltration on a Millipore filter (Pericon minicassette) with a molecular weight cut-off of 5 kDa and freeze-dried. This freeze-dried fraction (final product, 711 g) was designated Fraction 3. The freeze-dried insoluble residue (309 g) was designated Fraction 4 (Oshiman, Ko-ichi, et al, 2002).

Biologically Active Compounds

*Agaricus blazei*, originating from Brazil, is the source of several antitumor polysaccharides contained in its fruit body. These include a b-(1,6);b-(1,3) glucan, an acidic b-(1,6);a-(1,3) glucan, and an acidic b-(1,6);a-(1,4) glucan. By contrast to most mushroom glucans, the above glucans have a main chain of b-(1,6) glycopyranose, instead of the more common b-(1,3) linked main chain. The fruit body also contains an antitumor water-soluble proteoglucan of 380.000 Da with a a-(1,4) glucan main chain and b-(1,6) glucopyranoside branches at a ratio of 4:1, as well as two immunostimulating heteroglucans containing glucose, galactose and mannose, one consisting of glucose and ribose and a xyloglucan. In submerged cultures in bioreactors *A. blazei* can also synthesize an extracellular proteoglucan with mannose, glucose, galactose and ribose groups and a very high molecular weight (1000,000-10000,000 Da) which exhibits significant antitumor properties (Giavasis Ioannis, 2010).

Pre-clinical studies: β-glucans have known antitumour properties, so do proteoglycan and ergosterol, two other ingredients of *A. blazei*. The apparent antitumour effects of *A. blazei* are due to β-1,3-glucan. In addition, β-1,6-glucan extracted from *A. blazei* induced tumour regression in mice, and that daily supplement of β-glucan from *A. blazei* reduced spontaneous metastasis of ovarian and lung cancer cells in a mouse model. Also, a β-glucan-protein complex isolated from *A. blazei* was shown to have inhibitory action against Meth A fibrosarcoma in a mouse model (Hetland, Geir, et al., 2008).

Pharmacological activity—inflammation & cancer: *Agaricus blazei* is rich in immunomodulating substances such as highly branched β1,3-/1,6-glucans and proteoglycans. These are known ligands for CD11b/18 (complement receptor 3, CR3), dectin-1, and toll-like receptor 2 (TLR2) on monocytes, dendritic cells (DC), granulocytes, and NK cells of the innate immune system. *Agaricus blazei* is also shown to contain agaritine and ergosterol (provitamin D2) that is found to induce apoptosis in leukemic cells and inhibit tumor-induced angiogenesis, respectively, as well as isoflavonoids with potent hypoglycemic action that could be useful against diabetes mellitus. AbM is reported to have antitumor properties in mouse models of fibrosarcoma, myeloma, ovarian, lung, and prostate cancer, and in human studies against gynecological cancer (increased NK cell activity and quality of life) and leukemia (Hetland, Geir, et al., 2011).

Pre-Clinical and Clinical Doses

| Species | Strain | Method | Dose | Duration | Indication | Ref. |
| --- | --- | --- | --- | --- | --- | --- |
| In-vitro | murine Lewis lung carcinoma cell line, 3LL | In-vitro | 0.4-10 µg/mL | | | Kobayashi, Hiroshi, et al, 2005 |
| Mouse | ICR, male, 5 weeks | i.p. | Water and NaOH fractions, 100-2000 µg/mouse, 3 or 5 times every other day) | 15 days | Sarcoma-180-tumor growth | Ohno, Naohito, et al, 2001 |
| | ICR/CLC mice | i.p. | Polysaccharide fractions, | 10 days | Sarcoma 180-tumor growth | Mizuno, Masashi, et al., 1999 |
| | Male ICR strain mice (6 wk old) and female C57BL/6 strain mice (5 wk old) | PO / i.p./PO | Lipid Fractions-800 mg/kg / Ergosterol 10-200/100-800 | 20 days | Sarcoma 180 and LLC-T cell population, neovascularization, tumor volume | Takaku Takeshi et. al, 2001 |
| | NA | i.p./PO | Polysaccharide-protein complex 10-100 mg/kg/day | 10 days | Sarcoma 180, Ehrlich ascites, carcinoma, Shionogi carcinoma 42 and Meth A fibrosarcoma | Ito, Hitoshi, et al, 1997 |
| | Balb/C | Intra-tumoral injection / PO | 1 mg Days 3, 4 and 5 / 0.5 mg × 9 times: (i) on days −4, −3, −2, −1, 0, 14, 17, 18, and 19 ("pre-adm"), (ii) on days 0, 3, 5, 7, 10, 12, 14, 17, and 19 ("simultaneous adm"), (iii) on days 7, 10, 11, 12, 13, 14, 17, 18, and 19 ("post-adm"). | 21 days | Syngenetic Meth-A tumor cells-tumor growth | Oshiman, Ko-ichi, et al, 2002 |
| | Female C57BL/6 mice | Drinking water | Aqueous solutions of β-glucan, 20, 100, and 500 µg/ml | 21 days | murine Lewis lung carcinoma cell line, 3LL-tumor growth, metastasis | Kobayashi, Hiroshi, et al, 2005 |
| | Female inbred nude (BALB/c nu/nu) mice 5 weeks old (16-19 g) | Drinking water / i.p | Aqueous solutions of β-glucan, 20, 100, and 500 µg/ml / Aqueous solutions of β-glucan 0, 20, 100, or 500 µg/mouse on days 0, 1, 3, 5 and 7 | 9 days | HRA cells-intraperitoneal tumor nodules | |

Chaga (*Inonotus obliquus*)

Background: The Chaga mushroom (*Inonotus obliquus*) is a white rot fungus that belongs to the Hymenochaetaceae family of Basidiomycetes. Chaga mushrooms have been used in folk medicine for treating cancer in Russia, Western Siberia, Asia, and North America. It has been shown that Chaga mushrooms contain many polyphenolic compounds and show various biological activities, including anti-bacterial, hepato-protective and anti-tumor properties (Ham, Seung-Shi, et al., 2009).

Use in traditional medicine: Chaga mushroom has been used as a folk medicine in Russia and western Siberia for the prophylaxis and treatment of gastric disorders and even cancer. Chaga is claimed to have multiple natural beneficial properties for human health such as anti-bacterial, antiallergic, anti-inflammatory, and anti-oxidant based on its bioactive compounds (Kang, Ju-Hee, et al., 2015). It has also been used to prevent and treat heart, liver, and stomach diseases as well as tuberculosis. Moreover, it has been traditionally used for the treatment of gastrointestinal cancer, cardiovascular disease, and diabetes since the 16th century in Russia, Poland, and many Baltic countries (Kim, Yu Jin, et al., 2011).

Extraction methods: The *Inonotus obliquus* specimen was dried, powdered, and stored at −20° C. The powdered specimen (500 g) was extracted twice with 3 L of methanol (99.8%) at 45-50° C. for 3 h. The methanol fraction (45 g) was then rotary evaporated, emulsified, dissolved in water, and extracted three times with ethyl acetate (H2O:EtOAc, 5:7, v/v). The ethyl acetate fraction (12 g) was obtained after rotary evaporation and the dried extract was reconstituted in methanol. This stock solution was subjected to vacuum chromatography (N-2N, Eyela, Tokyo, Japan) with silica gel (60 g, 230-400 mesh) mixed with dichloromethane. The mobile phases used were, dichloromethane and methanol with a gradient of increasing methanol (0-100%) in dichloromethane and re-equilibration of the column with 100% dichloromethane for 3 min prior to the next run. The success of the fractionation was confirmed by TLC. Of the three ethyl acetate extract fractions, the most bioactive fraction, namely, VCHG-fraction 1, was selected and subjected to reversed phase (ODS-C18) column chromatography using a reversed phase column (ODS-C18) containing LiChroprep RP-18 (25-40 m) mixed with H2O:MeOH (1:30, v/v) in a gradient program ranging from 30% methanol to 100% methanol (mobile phase A: methanol; mobile phase B: ultra pure water). Four fractions were isolated, of which fraction 2 contained the most bioactivity. Fraction 2 was further fractionated by chromatography with a normal phase silica gel column (2.4 cm×15 cm) containing silica gel (200 g, 70-230 mesh; Merck Co.) mixed with dichloromethane eluted by a mobile phase gradient ranging from 100% dichloromethane to 50% methanol. The flow rate was 1.0 mL/min. This resulted into two subfractions designated as subfractions 1 and 2, both of which showed bioactivity. The compounds in subfractions 1 and 2 were crystallized and analyzed by determining their MS (JEOL), 1H NMR and 13C NMR (Bruker DRX 500 MHz) spectra (Ham, Seung-Shi, et al., 2009).

The sclerotia (1.3 kg) of *I. obliquus* was extracted six times with methanol (MeOH) to give extracts (67.5 g), which were successively partitioned with n-hexane, $CH_2Cl_2$, and ethyl acetate (EtOAc). The $CH_2Cl_2$ fraction (24 g) was subjected to silica gel column chromatography and eluted with CHCl3/EtOAc gradient system (50:1→1:1) to afford thirteen fractions (Fr. MC1~13). Compound 1 (105.2 mg) was recrystallized from fraction MC3 under $CHCl_3$ and MeOH solvents. Fraction MC5 was subjected to repeated column chromatography with a gradient elution of n-hexane/EtOAc (10:1→1:1), resulting in 10 subfractions (Fr. MC5-1~MC5-10). Compound 2 (9.1 mg) was recrystallized from fraction MC5-5 under CHCl3 and MeOH solvents to yield white crystals. Fraction MC5-6 (58 mg) was subjected to MPLC with n-hexane/EtOAc gradient (EtOAc in n-hexane 5-100% over 70 min, 100% over 10 min) to afford compound 3 (7.1 mg), and fraction MC5-10 (13 mg) was subjected to semi-preparative HPLC with 0.1% aq trifluoroacetic acid/MeOH gradient (MeOH in water 50-80% over 5 min, 80-100% over 15 min, 100% over 25 min) to afford compound 4 (2.2 mg). Compounds 5 (301.5 mg) and 6 (8.7 mg) were recrystallized from fractions MC7 and MC10, respectively, under CHCl3 and MeOH solvents. Fraction MC9 was subjected to silica gel column chromatography with a gradient elution of n-hexane/EtOAc (15:1→1:1), resulting in 17 subfractions (Fr. MC9-1→MC9-17). Fraction MC9-14 was subjected to semi-preparative High Performance Liquid Chromatography (HPLC) with 0.1% aq trifluoroacetic acid/MeOH gradient (MeOH in water 50-80% over 5 min, 80-100% over 15 min, 100% over 25 min) to afford compounds 7 (2.7 mg) and 8 (3.2 mg). The EtOAc fraction (12.4 g) was subjected to Sephadex LH-20 column chromatography and eluted with 100% MeOH to afford ten fractions (Fr. E1~10). Fraction E4 (750 mg) was subjected to silica gel column chromatography with a gradient elution of n-hexane/EtOAc (8:5→1:2), resulting in 10 subfractions (Fr. E4-1~E4-10). Compound 9 (2.4 mg) was isolated from fraction E4-3, and fraction E4-5 was subjected to semi-preparative HPLC with a water/MeOH gradient (MeOH in water 20-80% over 30 min, 80-100% over 5 min, 100% over 5 min) to afford compound 10 (1.2 mg) (Kim, Yu Jin, et al., 2011). The dried Chaga mushrooms (8 kg) were extracted with 95% ethanol three times under reflux for 4 h. The extract was filtered and evaporated in vacuo to yield the ethanol extract (212.95 g). This ethanol extract was then suspended in distilled water and sequentially partitioned with n-hexane, ethyl acetate, and n-butanol. The n-hexane fraction (28 g) was chromatographed on a silica gel column using Hexane-EtOAc gradient system (30:1-15:1-8:1-4:1-1:1, v/v, 2 L) to give 11 fractions (fraction 1-11). Fractions 1-10 were obtained by eluting with 1 L of solvent. Fraction 11 was eluted with Hexane-EtOAc (0:100, v/v, 2 L). Fraction 15 (360 mg, white crystals) was finally purified by re-crystallization of fraction 10 (650 mg). Identification of Fraction 15 was carried out by NMR analysis. Chemical structure of fraction 15 was confirmed by 1H NMR (Kang, Ju-Hee, et al, 2015). The aqueous extract from *Inonotus obliquus* (IOAE) was prepared by extracting powdered fruiting bodies (10 gm) in 200 ml of warm water (40° C.) (Mishra, S. K., et al., 2013). Biologically active compounds: In previous investigations on the chemical constituents of this mushroom, lanostane-type triterpenoids, such as inotodiol, trametenolic acid, and inonotsuoxides were reported to have antitumor and antifungal activities. Some phenolic compounds were also found in this mushroom (Kim, Yu Jin, et al., 2011).

*I. obliquus* contains excellent bioactive compounds. 3β-Hydroxy-lanosta-8,24-dien-21-al has been identified from *I. obliquus*, and a high-molecular weight, water-soluble, lignin-like substance from edible mushrooms of *I. obliquus* has been reported to inhibit the protease of type-1 human immunodeficiency virus. Inotodiol isolated from the sclerotia of *I. obliquus* has been reported to have an inhibitory effect in a two-stage carcinogenesis test on mouse skin using 7,12-dimethyl-benz[α]anthracene Hot-water extract of *I. obliquus* exerts inhibitory activity against the proliferation of human colon cancer cells (HT-29). Subfractions 1 and 2 as 3β-hydroxyl-lanosta8,24-dien-21-al and inotodial, respectively and these compounds have antimutagenic and antioxidative activities. Also, subfraction 3 has antimutagenic and antioxidative activities (Chung, Mi Ja, et al, 2010).

Pre-clinical studies: Chaga aqueous extract suppressed the proliferation of colorectal cancer cells in-vitro an in-vivo. It activated the mitochondrial intrinsic pathway of apoptosis, induced autophagy, and S phase cell cycle arrest. Chaga aqueous extract inhibited the expressions of iNOS and Cox-2 and proinflammatory cytokines, and ameliorated intestinal epithelial cell inflammation. Also, it downregulated the β-catenin and NF-κB signaling, which exerted anti-proliferative and anti-inflammatory activities in colorectal cancer cells (Mishra, S. K., et al., 2013).

Pharmacological activity—inflammation & cancer: Ergosterol peroxide inhibited not only cell proliferation but also suppressed clonogenic colony formation in HCT116, HT-29, SW620 and DLD-1 CRC cell lines with different susceptibility. The growth inhibition observed in these CRC cell lines was the result of apoptosis. Ergosterol peroxide inhibited the nuclear levels of β-catenin, which ultimately resulted in reduced transcription of c-Myc, cyclin D1, and CDK-8, c-Myc, cyclin D1, and CDK-8 are important downstream targets of β-catenin that regulate malignancies including cell cycle and apoptosis in cancer (Kang, Ju-Hee, et al, 2015). IOAE activated caspase-9 in human cancer cell lines, as observed by reduced levels of pro-caspase-9 and increased accumulation of cleaved caspase-9, in a dose-dependent manner. IOAE subsequently activated caspase-3 and cleaved its nuclear substrate Poly (ADP-ribose) polymerase (pARP) (Mishra, S. K., et al., 2013).

Pre-Clinical and Clinical Doses

| Species | Strain | Method | Dose | Duration | Indication | Ref. |
|---|---|---|---|---|---|---|
| In-Vitro | Human colorectal cancer cell lines: HCT116, DLD-1, HT-29 and SW620 | In-Vitro | Fraction 15 (Ergosterol Peroxide) 5-20 µg/ml | 48 hrs | Apoptosis, Cell cycle, colony formation, cell proliferation | Kang, Ju-Hee, et al, 2015 |
| | Human colorectal cancer cell lines (HCT116, DLDI, HT29, SW620 and CoL0205) | In-Vitro | IOAE 0.01-0.5 mg/ml | 48 hrs | Cell cycle, proliferation, apoptosis, DNA damage, inflammatory mediators | Mishra S. K., et al 2013 |
| | lung carcinoma A-549 cells, breast adenocarcinoma MCF-7 cells, stomach adenocarcinoma AGS cells, Sarcoma-180 cells, and cervical adenocarcinoma HeLa cells | In-Vitro | 62.5-250 µg/mL | 48 hrs | Proliferation, cytotoxicity | Chung, Mi Ja, et al, 2010 |
| Mouse | Female 6-week-old C57BL/6 | PO | Fraction 15 (Ergsterol Peroxide) 15 mg/kg twice daily | 14 weeks (prevention, group) or 8 weeks (therapy, group) | Colitis-induced colon adenocarcinoma induced by single-dose, intraperitoneal (i.p.) injection of AOM (10 mg/kg) followed by 2% DSS in drinking water | Kang, Ju-Hee, et al, 2015 |
| | C57BL16J-Apc$^{Min/J}$ Female 5-week-old[2] | PO | IOAE 100 or 300 mg/kg twice a day | | Colorectal adenoma-polyp development | Mishra, S. K., et al., 2013 |
| | C57BL16 Female 5-week-old | PO | IOAE 100 or 300 mg/kg twice a day | 14 weeks | AOM/DSS induced colorectal cancer- | |
| | Balb/C (6-7 weeks) | PO | Food supplemented with fractions 1-3, 01-02 mg/mouse/day | 20d days | Sarcoma-180 cell line-tumor growth | Chung, Mi Ja, et al, 2010 |

[2]Colorectal adenoma model

CBD

Background: Cannabis is the unique source of a set of at least 66 compounds known collectively as cannabinoids. Of these, most is known about the pharmacology of Δ$^9$-tetrahydrocannabinol (Δ$^9$-THC), the main psychoactive constituent of cannabis, and about cannabidiol (CBD), which lacks psychoactivity. Endogenous agonists for cannabinoid receptors have also been discovered. CB1 receptors are present at the terminals of central and peripheral neurones, where they modulate transmitter release. They also exist in some non-neuronal cells. CB2 receptors are expressed mainly by immune cells, one of their roles being to alter cytokine release. CBD has much less affinity for CB1 and CB2 receptors than Δ$^9$-THC and its pharmacological actions have been less well characterized.

CB1 and CB2 receptors are both coupled through Gi/o proteins, negatively to adenylate cyclase and positively to mitogen-activated protein kinase. CB1 receptors are also coupled through Gi/o proteins to certain ion channels, positively to A-type and inwardly rectifying potassium channels and negatively to N-type and P/Q type calcium channels and to D-type potassium channels. CB1 receptors can also act through Gs proteins to activate adenylate cyclase. Additional signalling mechanisms for cannabinoid CB1 and CB2 receptors have been proposed and descriptions of these can be found elsewhere (Pertwee, Roger G, 2004). Compelling evidence suggests that the use of cannabinoids, or manipulation of the cannabinoid receptors and endocannabinoid system, could be of benefit in many diseases, including pain, spasticity and tremor in multiple sclerosis, atherosclerosis, inflammatory bowel disorders, and cancer. Potential clinical applications of CBD and CBD-rich cannabis extracts include the production of anti-inflammatory and neuroprotective effects, the management of epilepsy, anxiety disorders, glaucoma and nausea, and the modulation of some effects of $\Delta^9$-THC.

CBD is demonstrated to antagonize some undesirable effects of THC including intoxication, sedation and tachycardia, while contributing analgesic, anti-emetic, and anti-carcinogenic properties in its own right. In modern clinical trials, this has permitted the administration of higher doses of THC, providing evidence for clinical efficacy and safety for cannabis based extracts in treatment of spasticity, central pain and lower urinary tract symptoms in multiple sclerosis, as well as sleep disturbances, peripheral neuropathic pain, brachial plexus avulsion symptoms, rheumatoid arthritis and intractable cancer pain. Prospects for future application of whole cannabis extracts in neuroprotection, drug dependency, and neoplastic disorders are further examined. The hypothesis that the combination of THC and CBD increases clinical efficacy while reducing adverse events is supported (Russo, Ethan, and Geoffrey W. Guy, 2006).

Use in traditional medicine: *Cannabis sativa* L. (Cannabaceae) has a long history of utilization as a fiber and seed crop in China, and its achenes ("seeds") as well as other plant parts have been recorded in Chinese medical texts for nearly 2000 years. While the primary applications of cannabis in Chinese medicine center around the use of the achenes, ancient indications for the female inflorescence, and other plant parts include conditions such as pain and mental illness that are the subject of current research into cannabinoids such as cannabidiol (CBD) and Δ9-tetrahydrocannabinol (THC) (Brand, E. Joseph, and Zhongzhen Zhao, 2017).

Extraction methods: *Cannabis* dry flowers and leaves were extracted at room temperature with CO2 to give an extract which, evaporated to dryness, was a brownish solid. A portion of the extract was dissolved in methanol for HPLC analysis (Agilent 1100) using a C18 column (150 mm×4.6 mm, 1 ml/min flow rate) (Zhu J S, et. al, 1998)

Pre-clinical studies: CBD is considered an antineoplastic agent on the basis of its in vitro and in vivo activity against tumor cells. However, the exact molecular mechanism through which CBD mediates this activity is yet to be elucidated. CBD induced cell death of breast cancer cells, independent of cannabinoid and vallinoid receptor activation. Electron microscopy revealed morphologies consistent with the coexistence of autophagy and apoptosis. Western blot analysis confirmed these findings. CBD induces endoplasmic reticulum stress and, subsequently, inhibits AKT and mTOR signaling as shown by decreased levels of phosphorylated mTOR and 4EBP1, and cyclin D1. Analyzing further the cross-talk between the autophagic and apoptotic signaling pathways, we found that beclin1 plays a central role in the induction of CBD-mediated apoptosis in MDA-MB231 breast cancer cells. Although CBD enhances the interaction between beclin1 and Vps34, it inhibits the association between beclin1 and Bcl-2. In addition, CBD reduces mitochondrial membrane potential, triggers the translocation of BID to the mitochondria, the release of cytochrome c to the cytosol, and, ultimately, the activation of the intrinsic apoptotic pathway in breast cancer cells. CBD increased the generation of reactive oxygen species (ROS), and ROS inhibition blocked the induction of apoptosis and autophagy. Our study revealed an intricate interplay between apoptosis and autophagy in CBD-treated breast cancer cells and highlighted the value of continued investigation into the potential use of CBD as an antineoplastic agent.

Pharmacological activity—inflammation & cancer: Cannabidiol (CBD), a major nonpsychoactive constituent of cannabis, is considered an antineoplastic agent on the basis of its in vitro and in vivo activity against tumor cells. Cannabinoids can modulate signaling pathways central to the growth and spread of cancer. They inhibit cell-cycle progression and chemotaxis, and block angiogenesis. CBD is cytotoxic to gliomas and inhibits tumor cell migration in vitro. In addition, CBD induces apoptosis in human leukemia cell lines by activating classical caspase pathways, and enhancing NOX4 and p22 (PHOX) function. A recent study reports that CBD inhibits breast cancer growth and down-regulates ID1, a regulator of metastasis in breast cancer cell lines. Furthermore, CBD, in conjunction with THC, induces programmed cell death (PCD) in glioma cells (Shrivastava, Ashutosh, et al, 2011). Also, cannabinoids induce the inhibition of adenylate cyclases, influence ionic channels, and stimulate extracellular-signal-regulated kinase (ERK), c-Jun N-terminal kinase, and p38 mitogen-activated protein kinase, indicating that they may play a general role in the cell survival or death decision (Vaccani, Angelo, et al., 2005)

Pre-Clinical and Clinical Doses

| Species | Strain | Method | Dose | Duration | Indication | Ref. |
| --- | --- | --- | --- | --- | --- | --- |
| In-Vitro | Human cell lines MDA-MB-731, MCF-7, SK-BR-3, ZR75-1, and MCF-10A | In-Vitro | 2.5-10 µM | 12-24 hrs | Cell viability, apoptosis, ROS production, autophagy | Shrivastava, Ashutosh, et al, 2011 |
| | U87 Human glioma cells | In-Vitro | 0.01-9 µM | 30 min | Cell migration (Boiden chamber) | Vaccani, Angelo, et al., 2005 |
| | The murine lymphoma, EL-4 and the human leukemia cell | In-Vitro | 1.25, 2.5, 5 and 10 µM | 24 hrs | Apoptosis, cytochrome levels | McKallip, Robert J., et al., 2006 |

-continued

| Species | Strain | Method | Dose | Duration | Indication | Ref. |
|---|---|---|---|---|---|---|
| | lines, Jurkat, and MOLT4 | | | | | |
| | U87 and U373 human glioma cell lines | In-Vitro | 5-40 µM | 24 hrs-4 days | Cell viability, proliferation | Massi, Paola, et al, 2004 |
| Mouse | Athymic nude CD 1 mice female, 8 weeks) | peritumoral injection | NA | 23 days | U87 cells-tumor size, | |
| | C57BL/6 (female, 6-8 weeks of age) | i.p. | 12.5, or 25 mg/kg | Once, on day 10 | EL-4 tumor cells | McKallip, Robert J., et al., 2006 |
| | 6-week-old male athymic mice | Intra-tumoral injection | 5 mg/kg | 20/16 days | KiMol/MBA-MD-231 cells-metastasis, tumor size | Ligresti, Alessia, et al, 2006 |
| | Male ICR mice 25-30 g | i.p. | 5 mg/kg, 3 times a week | 3 months | Azoxyrnethane (AOM)-induced tumours (colon cancer)-polyp and tumor formation | Romano, Barbara, et al., 2014 |

THC

Background: In recent years there has been intense interest in cannabinoids (the active components of marijuana, *Cannabis sativa*) and their derivatives as novel therapeutic agents for a range of common diseases. The identification of the major active component of marijuana, $\Delta^9$-tetrahydrocannabinol (THC), led to the discovery that cannabinoids function by activating specific cell surface G-protein coupled cannabinoid receptors: CB1 and CB2. CB1 receptors are particularly abundant in the brain, and CB2 receptors are highly expressed in cells of the immune system. Many of the effects of $\Delta^9$-THC are mediated by cannabinoid receptors of which at least two types. CB1 and CB2, are present in mammalian tissues.

Cannabinoids have been proposed as novel cancer therapeutics, primarily due to their ability to induce apoptosis in a number of different tumour cell types. THC is the psychoactive constituent of marihuana. In addition. THC exerts a wide variety of biological effects by mimicking endogenous compounds, the endocannabinoids anandamide and 2-arachidonoylglycerol, which activate specific cannabinoid receptors.

Cannabinoids have been successfully used in the treatment of some of the side effects, such as nausea and vomiting, weight loss, lack of appetite and pain that often accompany cancer. $\Delta^9$-THC (dronabinol) and LY109514 (nabilone) are approved to treat nausea and vomiting associated with cancer chemotherapy. Although cannabinoids are used in the palliative treatment of cancer, they are not yet used as a treatment for tumor progression itself.

The main limitation of the possible future use of THC in oncology might be represented by adverse effects principally at the level of the central nervous system, consisting mostly of perceptual abnormalities, occasionally hallucinations, dysphoria, abnormal thinking, depersonalization and somnolence (Ligresti, Alessia, et al., 2006).

Use in traditional medicine: Extracts from *Cannabis Sativa* have been used for centuries for both medicinal and recreational purposes.

Extraction methods: Harvesting *Cannabis* composed of Seed and chaff; Separating the chaff from the Seed; extracting the chaff with a solvent, thereby producing an extract, passing the extract, if desired, over a chromatographic column arranged to fractionate $\Delta^9$-THC out of the extract (Webster, GR Barrie, 2002).

$\Delta^9$-THC was obtained from hashish by countercurrent distribution: Automatic assembly—200 cells, 10 ml upper and lower phase either, solvent system: petroleum-ether/methanol/dimethylformamide/water, 10:8:2:1. After evaporation and extraction of the residue with petroleum-ether the $\Delta^9$-THC is isolated as a mobile colorless oil $[\alpha]^{25}_D$-141° (EtOH; c=3.16 w/w). It is a mixture of $\Delta^9$-THC with 7.90/o w/w dimethylformamide, which is held by hydrogen-bonding of the phenolic group. The content of dimethylformamide was measured by integration of SMR-signals and titration of the THC with lithium isopropylate in dimethylformamide. To remove the amide the mixture is dissolved in the 50-100 fold amount of $CCl_4$ and shaken twice with water. The organic layer is separated and the solvent removed under reduced pressure in the cold. The resulting viscous oil darkens soon on exposure to air and light (Silva, M. Teresa A., et al., 1968).

Pre-clinical studies: Growth and survival of tumor cells is often dependent on the increased signaling through pathways that regulate cell survival and proliferation. Two of these include the MAPK signaling pathway (Ras/Raf—MAPK, extracellular signal regulated kinase (ERK1/2)) and the PI3K/Akt pathway. Both CB1 and CB2 cannabinoid receptors are coupled to these pathways via heterotrimeric Gi/o-proteins. In Chinese hamster ovary (CHO) cells transfected with human CB1, CP 55940 (a highly potent non-selective CB1 and CB2 agonist) increased p42/p44 MAPK activity in a time- and concentration-dependent manner and this was reversed by the CB1 antagonist/inverse agonist SR141716A [26]. Furthermore, the activation of MAPK was blocked by pertussis toxin, thus suggesting that signal transduction between CB1 and MAPK involves GTP-binding proteins. Similar results were seen when CHO cells were transfected with CB2, as CP 55940 increased p42/p44 MAPK activity and the effects were blocked by both SR144528 (a CB2 selective antagonist) and pertussis toxin. The results from these studies indicate that activation of either CB1 or CB2 receptors results in an increase in signaling through the MAPK pathway (Alexander Amy et. al, 2009).

Pharmacological activity—inflammation & cancer: THC has been shown to induce apoptosis in several tumour cell types. There is growing evidence that cannabinoids may be able to selectively target tumour cells, at least in part through differential regulation of signaling pathways that control cell survival and apoptosis. However, the mechanisms underlying the antitumoral effects of cannabinoids are incompletely understood, and evidence suggests these effects may be cell-type specific. Two signaling pathways that have been reported to be either positively or negatively regulated by cannabinoids (depending on the cell type and cannabinoid studied) are the RAS-MAPK/ERK pathway and the PI3K-AKT pathway (Greenhough, Alexander, et al, 2007).

Although the general consensus in the current literature indicates that cannabinoids have anti-cancer effects, there are a few studies that have shown that D9-THC has a biphasic effect in cancer cells, where lower concentrations result in an increase in proliferation of cancer cells and higher concentrations cause a decrease in cell proliferation. For example, D9-THC at 100-300 nM elicited a 1.2 and 2-fold increase in the proliferation rate of NCl-H292 (lung cancer) and U373-MG (glioblastoma) cells, respectively. In contrast, higher concentrations of D9-THC (4-10 lM) were cytotoxic and increased the number of apoptotic cells (30-80%). It is well known that cannabinoids may cause suppression of the immune system via CB32 activation (Alexander Amy et. al, 2009).

Pre-Clinical and Clinical Doses

| Species | Strain | Method | Dose | Duration | Indication | Ref. |
|---|---|---|---|---|---|---|
| In-Vitro | The colorectal carcinoma cell lines SW480, HCT-15, HT29, Caco-2, HCT116, LS174T and SW620 cells; The colorectal adenoma AA/C1, AN/C1, BH/C1, RG/C2; carcinoma JV2; and transformed adenoma AAC1/SB/10C (SB10C) cell lines; HCA7 colony 29 (HCA7) cells; C6.9 rat glioma cells; | In-vitro | 100 nm-12.5 μM | 72 hrs | Cell proliferation and apoptosis assays, pro-apoptotic signaling pathway activity, caspase-3 cleavage | Greenhough, Alexander, et al, 2007 |
| | EVSA-T, MDA-MB-231, MDA-MB-468, and SKBr3 cells | In-vitro | 1-12 μM | 72 hrs | Cell cycle analysis, CBI and CB2 expression, Caspase-3 activity | Caffarel, María M., et al., 2006 |
| | Primary cultures from mouse gliomas | In-vitro | 5 μM | 24 hrs | Autophagy, apoptosis | Salazar, María M, et al, 2009 |
| Mouse | Nude mice | Peri-tumoral injection | 5 mg/kg/day | 10 days | Tumor growth, apoptosis | |
| | Nude mice | Peri-tumoral injection | 15 mg/kg | 14 days | U87 cells or T98 cells | Torres, Sofía, et al., 2011 |
| | 6-week-old male athymic mice | Intra-tumoral injection | 5 mg/kg | 20/16 days | KiMol/MBA-MD-231 cells | Ligresti, Alessia, et al, 2006 |
| Human | Cancer Pattients with cancer pain | a pump action oromucosal spray | Each 100-mL actuation of the pump containing the THC:CBD extract delivered a dose containing 2.7 mg THC and 2.5 mg CBD. Each 100-mL actuation of the pump containing the THC extract delivered a dose containing 2.7 mg THC. The maximum permitted dose of all study medication was eight actuations in any three-hour | 2 weeks | Pain reduction | Johnson, Jeremy R., et al., 2010 |

| Species | Strain | Method | Dose | Duration | Indication | Ref. |
|---|---|---|---|---|---|---|
| | | | period and 48 actuations in any 24-hour period. | | | |
| | 18 patients (aged 52-81 yrs) with anorexia due to advanced cancer | PO | THC 2.5 mg orally 1 hr before meal | 4 weeks | Appetite Stimulation | Nelson, Kristine, et al, 1994 |
| | Cancer patients suffering from nausea caused by chemotherapy | PO | 7.5-12.5 mg (depending on body surface area) 1 hour before chemotherapy and every 4 hours thereafter | NA | Antiemetic action | Ungerleider, J. THOMAS, et al., 1982 |
| | Glioblastoma multiforme (grade IV astrocytoma) patients that failed standard therapy | Intracranial infusion | 0.80-3.29 mg | 11-64 days | Tumor biopsy, tumor volume, survival, MRI | Guzman, M., et al., 2006 |

The compositions of the current invention, comprising mushroom extracts and cannabinoids were tested for both their anti-inflammatory and anti-cancer effects in-vitro.

The objective of this study was to evaluate the:
a. Anti-inflammatory properties of different Mushrooms extracts, THC and CBD on RAW 264.7 cells.
b. Anti-cancer properties of different Mushrooms extracts, THC and CBD on PANC-1 and EGL-1 cells.

The cell-lines mentioned hereinabove are:
a. Raw 264.7 (ATCC® TIB-71™), Murine macrophage (American Type Culture Collection, Rockville, MD, USA).
b. PANC-1 (ATCC® CRL-1469™), Human pancreas carcinoma.
c. EGL-1 human extra hepatic cholangio carcinoma.

The mushroom extracts tested in the assays described hereinbelow are:
a. *Cordyceps* Cs-4 (Mushroom Science, lot #W0001576, exp November 2020). Hot water/alcohol extract.
b. *Cordyceps*-M (Real Mushrooms, lot #18274, exp October 2020). Hot water extract.
c. Turkey Tail Colorius PSP (Mushroom Science, lot #1820004, exp July 2020). Hot water/alcohol extract.
d. Turkey Tail extracts (Real Mushrooms, lot #18305, exp November 2020). Hot water extract.
e. Shiitake (Mushroom Science, lot #1800401, exp January 2020). Hot water/alcohol extract.
f. Reishi extract 415 (Real Mushrooms, lot #18270, exp September 2020). Hot water/alcohol extract.
g. *Agaricus blazei*-full spectrum extracts (Mushroom Science, lot #W0000008, exp August 2020). Hot water/alcohol extract.
h. Chaga (Mushroom Science, lot #W0001580, exp November 2020). Hot water/alcohol extract.
i. Maitake (Mushroom Science, lot #1802502, exp November 2020). Hot water/alcohol extract.
j. CBD (cannabidiol), BOL Pharma, lot #LG18086-36-2. CoA
k. Dexamethasone (West-ward Pharmaceuticals Corp, cat #0641-0367-25, lot #108381, exp. October 2020)

The mushroom extracts, cannabinoid solutions and growth media used in the assays described hereinbelow were prepared as following:

Mushrooms Extracts:
a. ⅔ of total final volume of warm water for injection (42° C.) was added to the dry mushroom powder.
b. The suspension was vortexed and centrifuged (4100 rpm, RT, 5 min).
c. The supernatant containing the water-soluble fraction was separated into a clean tube.
d. 5% of total final volume of EtOH was added to the pellet and vortexed to extract ethanol-soluble fractions. Water was added q.s. ad. final volume.
e. The suspension was vortexed and centrifuged. The resulting supernatant was combined and centrifuged again to remove debris, yielding a final concentration of 50 mg/ml.
f. The resulting solution was passed through a cell strainer (40-70 micron).
g. Two additional stocks were prepared in vehicle (5% EtOH in WFI): 10 mg/ml and 2 mg/ml.
h. All Test items/Vehicle were added to the cells at 4 µL into 96 µL medium, yielding final working concentrations of: 2 mg/ml, 0.4 mg/ml, and 0.08 (in 0.2% EtOH, 4% WFI).

Cannabinoid Solutions
a. THC—THC was diluted with Vehicle (WFI containing 5% DMSO) to concentrations of: 1875 µM, 500 µM, 100 µM, 25 µM and 2.5 µM. All test THC stocks/Vehicle were diluted with the cells 1:15-1:5 depending on the assay.
b. CBD (314.46 g/mol)—was dissolved in EtOH to a concentration of 10 mg/ml (31.8 mM). 500 µM stock solution was prepared by combining 31.8 mM ethanolic solution with 5% DMSO and diluting to final concentration of 500 µM with WFI. The resulting solution was further diluted with Vehicle (WFI containing 5% DMSO) to concentrations of: 500 µM, 375 µM, 125 µM, 25 µM and 2.5 µM. All test CBD stocks/Vehicle were diluted with the cells 1:15-1:5 depending on the assay.

c. Dexamethasone (392.46 g/mol) stock solution 10 mg/ml (25.47 mM). The stock solution was further diluted with Vehicle (WFI containing 5% EtOH) to concentrations of: 2.5 µM, 0.25 µM, and 0.025 µM. All dexamethasone stocks were added to the cells at 4 µL into 96 µL medium, yielding final working concentrations of: 100 nM, 10 nM, and 1 nM (in 0.2% EtOH and 4% WFI).

Cell Medium Formulations:

RAW Growth medium: Dulbecco's Modified Eagle Medium (DMEM) high glucose supplemented with 10% Fetal Bovine Serum (FBS), 4 mM L-Glutamine, 1 mM Sodium Pyruvate, and 1% Penicillin-Streptomycin solution (PS).

Cell Incubation with LPS and Test Items:
a. Cells were harvested at 80% confluence, counted and re-suspend to final concentration of 1×106/ml in growth medium.
b. Cell suspension was seeded in 96-well microtiter plate (1×105 cells/100 µl/well). —Each plate was designed as indicated in Table 1, Table 2 and Table 3.
c. Cells were incubated (37±10 C, 5% CO2) for 18-24 hrs.
d. Growth medium was removed; 94 µL medium and 4 µL Vehicle, Test Item, and Controls were added.
e. The content of all wells was mixed by pipetting up and down three times.
f. Plates were incubated for 2 h (37±1° C., 5% CO2).
g. LPS (10 µl, final concentration of 100 ng/ml LPS) was added to all wells.
h. The content of all wells was mixed by pipetting up and down three times.
i. Plates were incubated for 24±2 h (37±1° C., 5% CO2).
j. Medium was collected from the 96-microtiter plate: 50 µl for NO secretion assay and the rest was stored in −20° C. for cytokine secretion assay.

Example 1

In order to evaluate the anti-inflammatory properties of the compositions of the current invention, assays for Nitric Oxide (NO) and Cytokine secretion from RAW cells following incubation with mushrooms extracts and cannabinoids were carried out, as well as viability assays.

TABLE 1

*Suggested Assay Design

| Group No. | Test Item/control | Concentrations | Samples |
|---|---|---|---|
| 1 | Assay background Assay medium only (no cells) | NA | 6 |
| 2 | Assay negative control Cells with assay medium | NA | 5 |
| **3 | Assay negative control 2 Cells with assay medium + DMSO Vehicle | 0.2% DMSO in 4% WFI | 5 |
| 4 | Assay negative control 3 Cells with assay medium + EtOH Vehicle | 0.2% EtOH in 4% Vehicle | 5 |
| 5 | Positive control Dexamethasone | 1, 10, and 100 nM | 3 × 3 |
| 6-7 | Cordyseps (from RM and from MS) | 2, 0.4, and 0.08 mg/ml | 3 × 4 + 3 × 4 |
| 8-9 | Turkey Tail (from RM and from MS) | | 3 × 4 + 3 × 4 |
| 10 | Shiitake | | 3 × 4 |
| 11 | Agaricus Blazei | | 3 × 4 |
| 12 | Reishi | | 3 × 4 |
| 13 | Chaga | | 3 × 4 |
| 14 | Maitake | | 3 × 4 |
| 15 | THC | 75, 20, 4, 1 and 0.1 µM | 5 × 4 |
| 16 | CBD | 20, 15, 8, 1, and 0.1 µM | 5 × 4 |

*Rows marked in red were every plate set up
**Only in CBD/THC plates

TABLE 2

Plate set-up of mushrooms extracts (4 mushrooms/plate)

| | 1 | 2 | 3 | 4 | 5 | 6 | 7 | 8 | 9 | 10 | 11 | 12 |
|---|---|---|---|---|---|---|---|---|---|---|---|---|
| A | | | | | | | | | | | | |
| B | | medium | TI1 0.4 mg/ml | TI3 0.08 mg/ml | TI1 0.08 mg/ml | TI3 0.08 mg/ml | TI4 0.4 mg/ml | TI1 0.4 mg/ml | TI4 0.08 mg/ml | TI2 0.08 mg/ml | TI3 2 mg/ml | TI4 0.08 mg/ml |
| C | | medium | TI3 0.4 mg/ml | TI4 0.4 mg/ml | TI3 2 mg/ml | T12 0.4 mg/ml | dexa 100 nM | TI4 2 mg/ml | dexa 100 nM | UT | TI2 2 mg/ml | Vehicle |
| D | | medium | T12 2 mg/ml | Vehicle | TI2 0.08 mg/ml | TI4 0.4 mg/ml | TI1 0.08 mg/ml | T12 0.4 mg/ml | TI4 0.4 mg/ml | Vehicle | TI3 0.08 mg/ml | TI4 0.4 mg/ml |
| E | | medium | TI4 2 mg/ml | TI1 0.08 mg/ml | UT | TI2 2 mg/ml | TI1 2 mg/ml | TI3 2 mg/ml | TI2 2 mg/ml | TI2 0.08 mg/ml | TI4 2 mg/ml | TI1 2 mg/ml |
| F | | medium | UT | TI1 0.4 mg/ml | TI1 2 mg/ml | Vehicle | TI3 0.4 mg/ml | TI2 0.08 mg/ml | UT | TI3 2 mg/ml | dexa 100 nM | TI2 0.4 mg/ml |
| G | | medium | TI2 0.4 mg/ml | TI3 0.4 mg/ml | TI4 0.08 mg/ml | TI1 0.4 mg/ml | TI3 0.08 mg/ml | TI4 2 mg/ml | TI4 0.08 mg/ml | TI1 2 mg/ml | TI3 0.4 mg/ml | TI1 0.08 mg/ml |
| H | | | | | | | | | | | | |

TABLE 3

Plate set-up of cannabinoid extracts

|   | 1 | 2 | 3 | 4 | 5 | 6 | 7 | 8 | 9 | 10 | 11 | 12 |
|---|---|---|---|---|---|---|---|---|---|----|----|----|
| A |   |   |   |   |   |   |   |   |   |    |    |    |
| B | medium | CBD 1 | THC 1 | Vehicle | CBD 2 | CBD 3 | UT | Dex 100 n | MCBD 1 | THC 3 | CBD 3 |   |
| C | medium | CBD 4 | CBD 3 | CBD 5 | THC 5 | CBD 1 | CBD 5 | Dex 1 nM | THC 1 | THC 2 | THC 3 |   |
| D | medium | Vehicle | THC 2 | THC 3 | Vehicle | CBD 4 | Dex 10 nM | CBD 4 | CBD 2 | THC 5 | CBD 2 |   |
| E | medium | CBD 5 | THC 4 | Dex 1 nM | THC 1 | THC 2 | Vehicle | Dex 10 nM | THC 3 | THC 4 | CBD 5 |   |
| F | medium | Vehicle | UT | THC 5 | UT | CBD 1 | UT | Vehicle | UT | CBD 3 | THC 1 |   |
| G | medium | THC 2 | Dex 10 nM | CBD 2 | Dex 1 nM | CBD 4 | THC 4 | Dex 100 n | MVehicle | THC 4 | THC 5 |   |

Cell Proliferation and Viability (XTT Assay)
a. XTT reaction solution was prepared.
b. 50 µl of the XTT reaction solution was added into each well.
c. Plates were incubated in a humidified atmosphere (e.g. 37° C., 5% CO2).
d. The plates were shaken gently to evenly distribute the dye in the wells.
e. The absorbance of the samples was measure against a background control as a blank with a spectrophotometer (ELISA reader) at a wavelength of 450 nm.
f. In order to measure reference absorbance (to measure non-specific readings), a wavelength of 620 nm was used to subtract from the 450 nm measurement.
g. The idle absorbance of the cells was 0.5-1.5 in all wells.

Figure 2A:
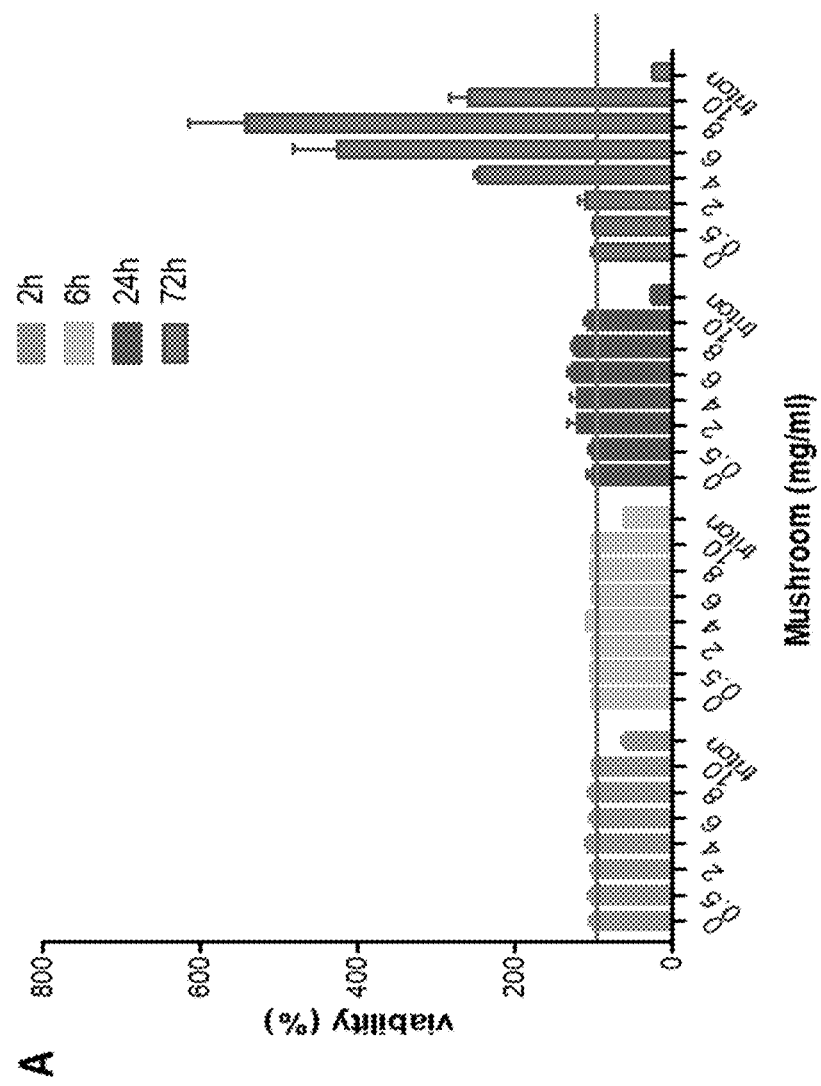
FIG. 2: *Cordyceps* Cs-4 (A) and *Agaricus* blazei (B) were incubated with 5000 PANC-1 cells for 2 h, 6 h, 24 h, and 72 h. Viability was measured using XTT reagent kit.
Figure 2B:
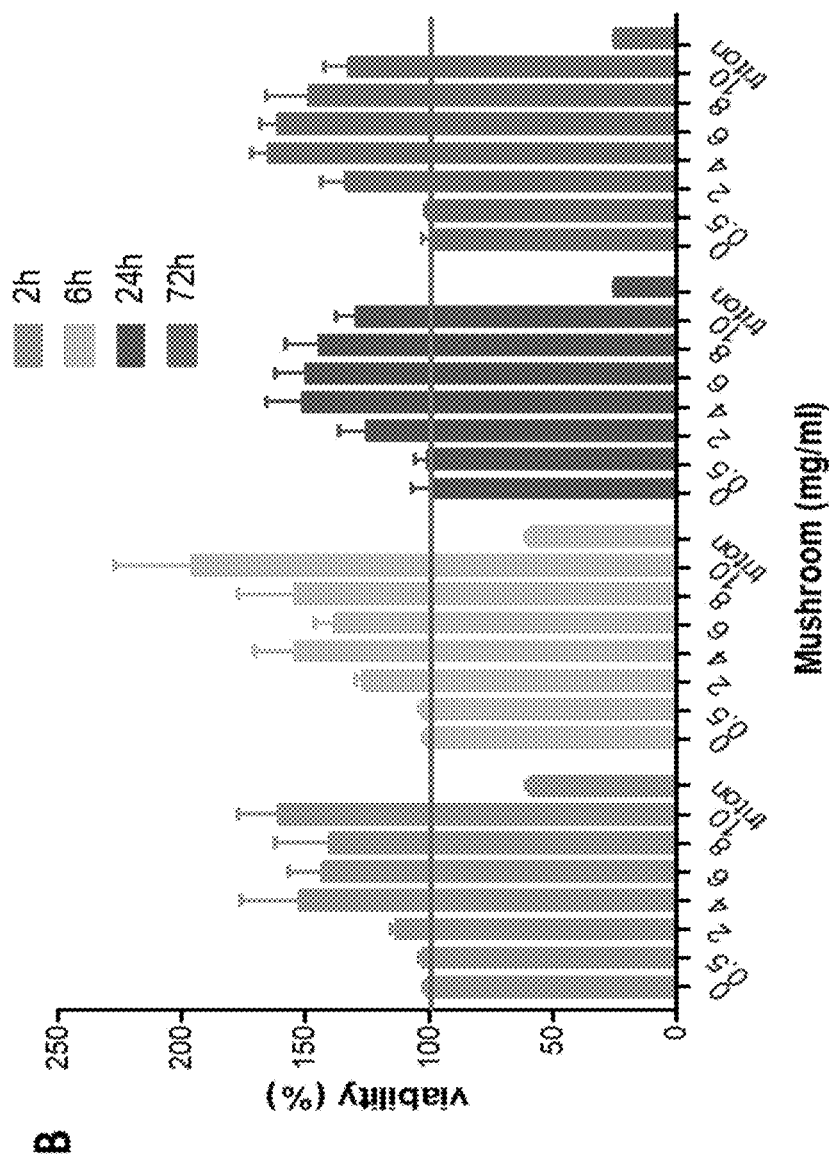
Figure 3A:
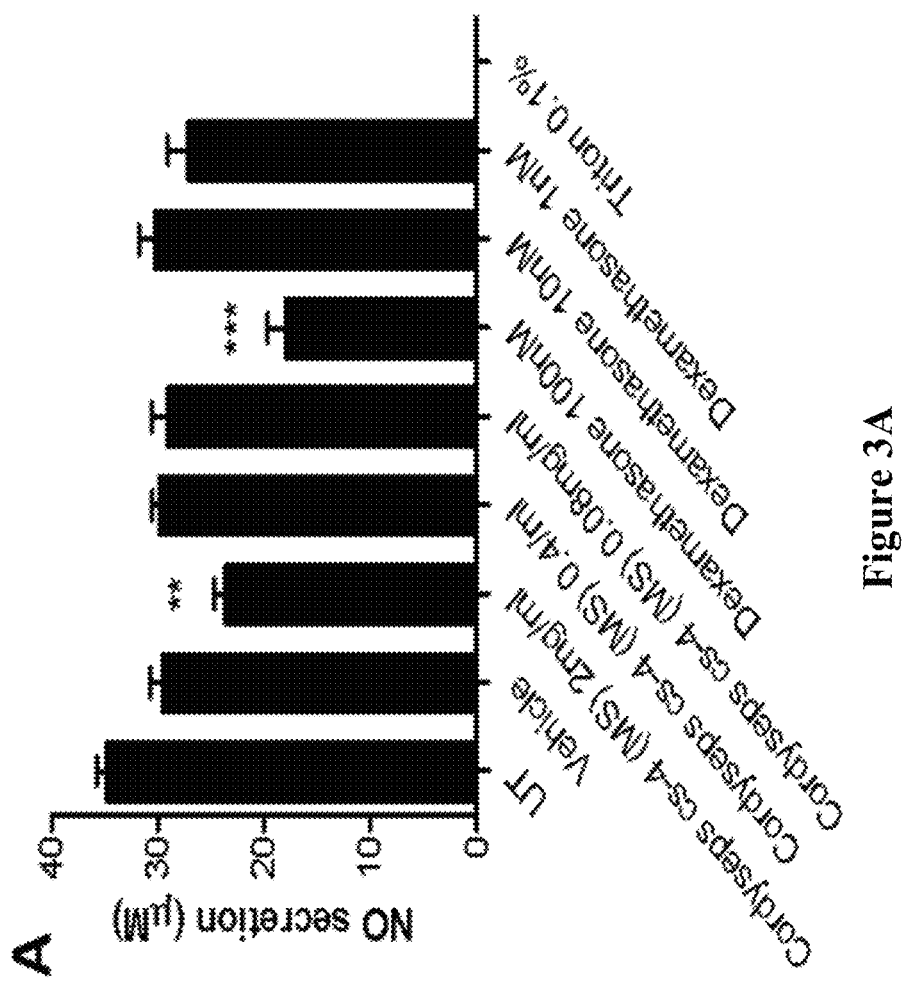
FIG. 3: *Cordyceps* Cs-4 (A), *Cordyceps* M (B), Reishi (C), and *Agaricus balzei* (D), Turkey Tail RM (E), Shiitake (F), Turkey Tail MS (G), Chaga (H), and Maitake (1) were incubated with $10^5$ RAW cells for 24 h. NO secretion in the supernatants was measured using Greiss reagent kit.
Figure 3B:
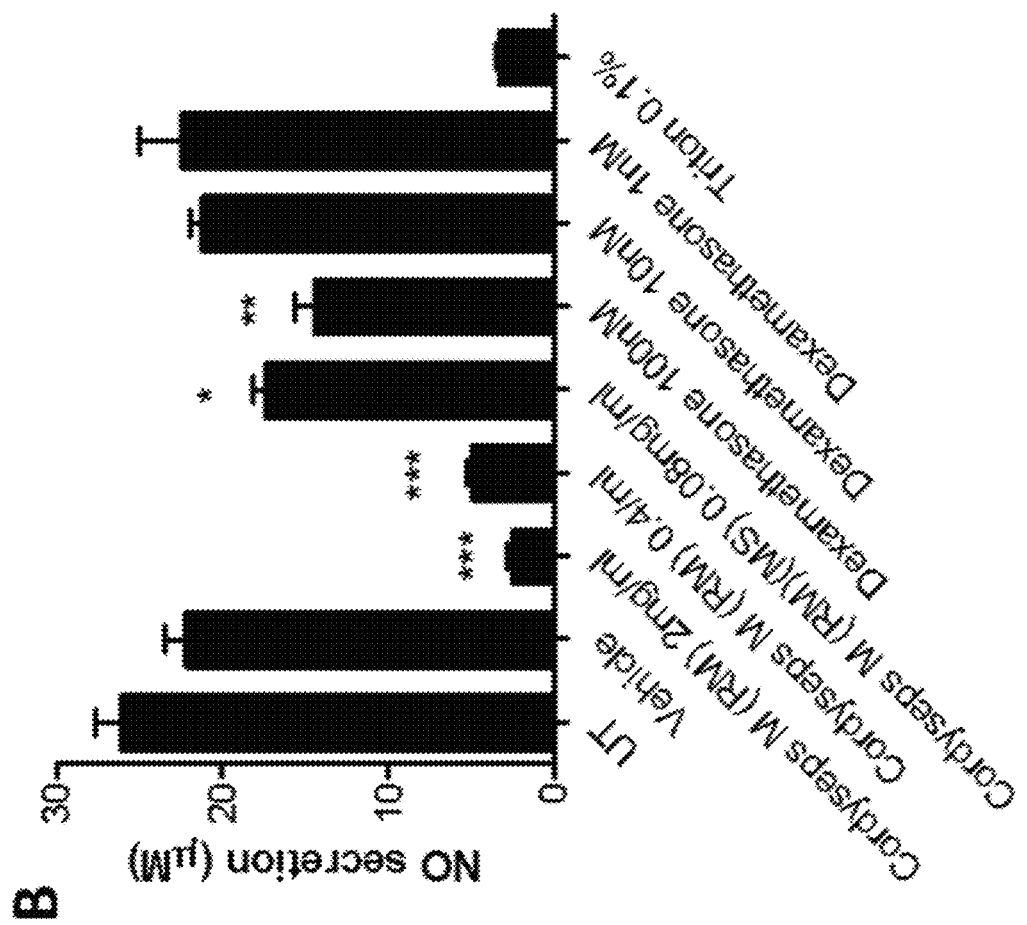
Figure 3C:
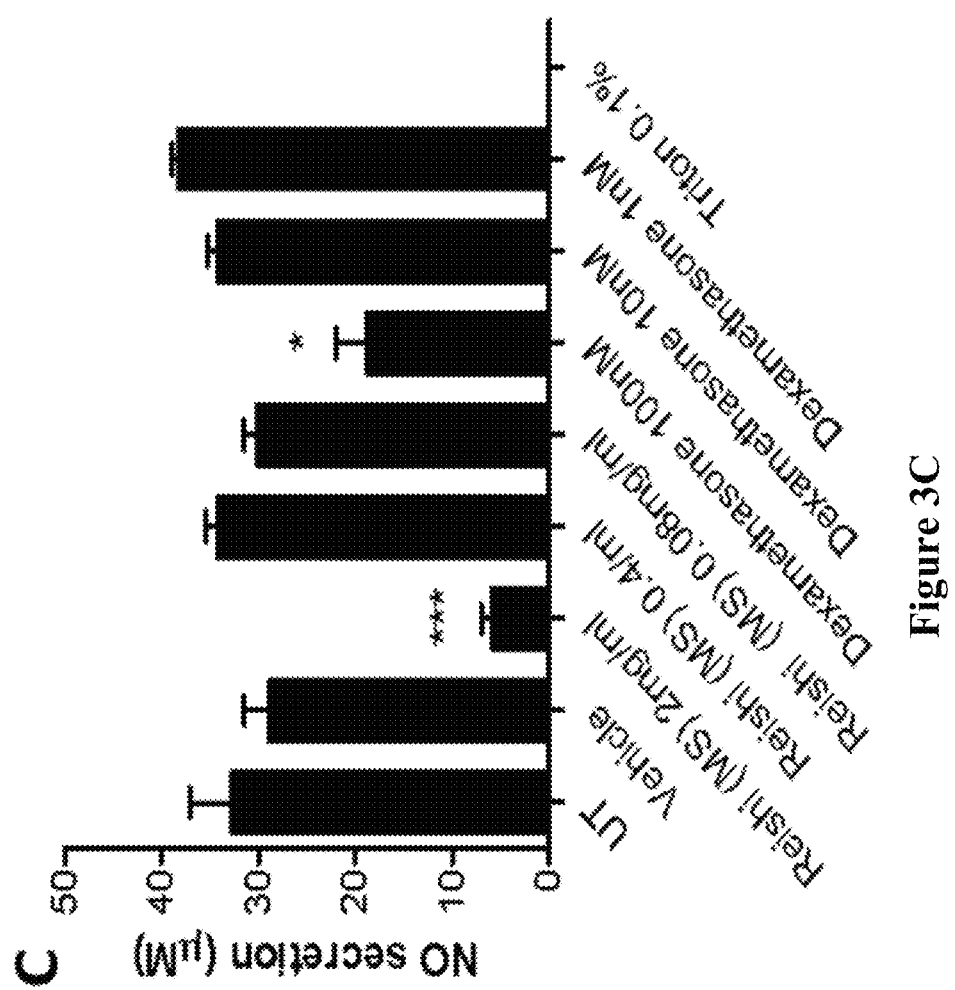
Figure 3D:
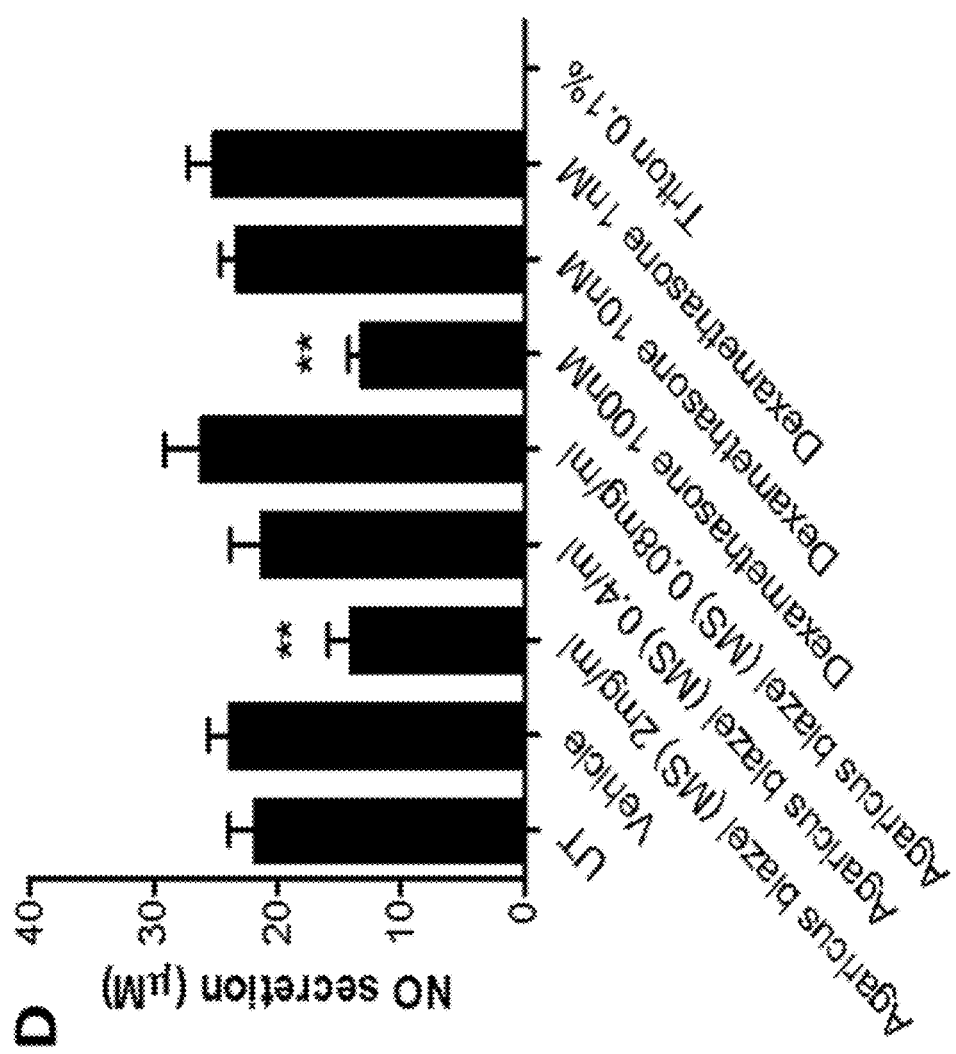
Figure 3E:
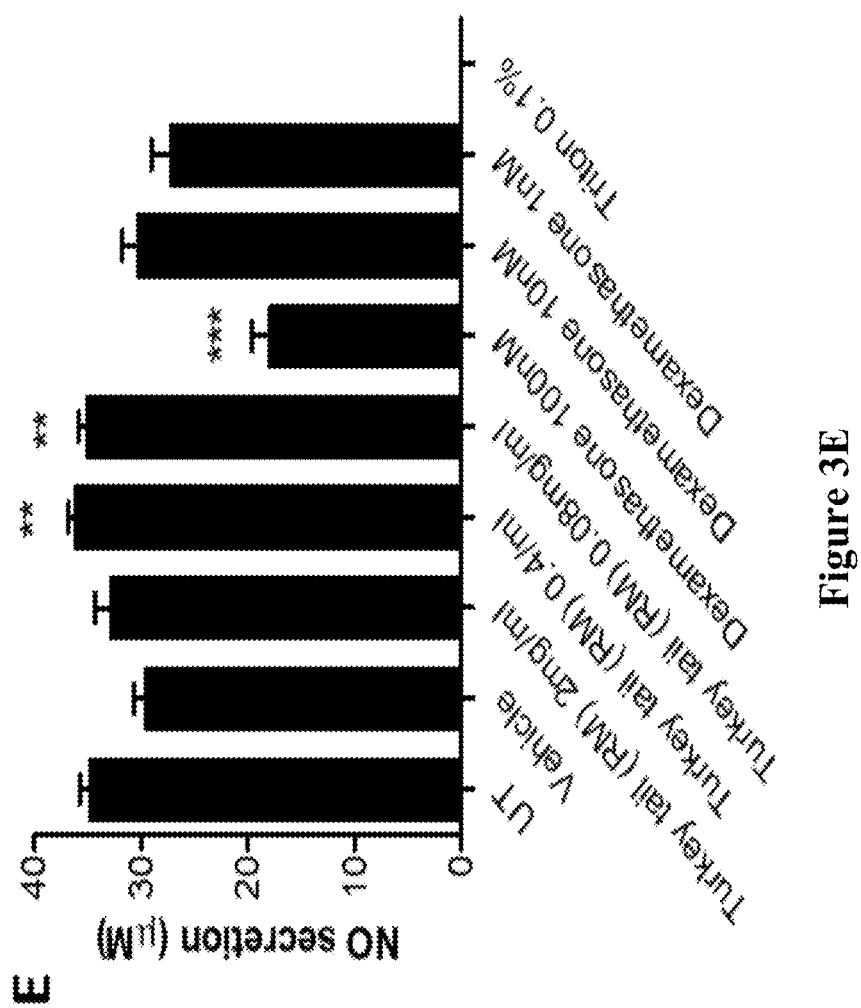
Figure 3F:
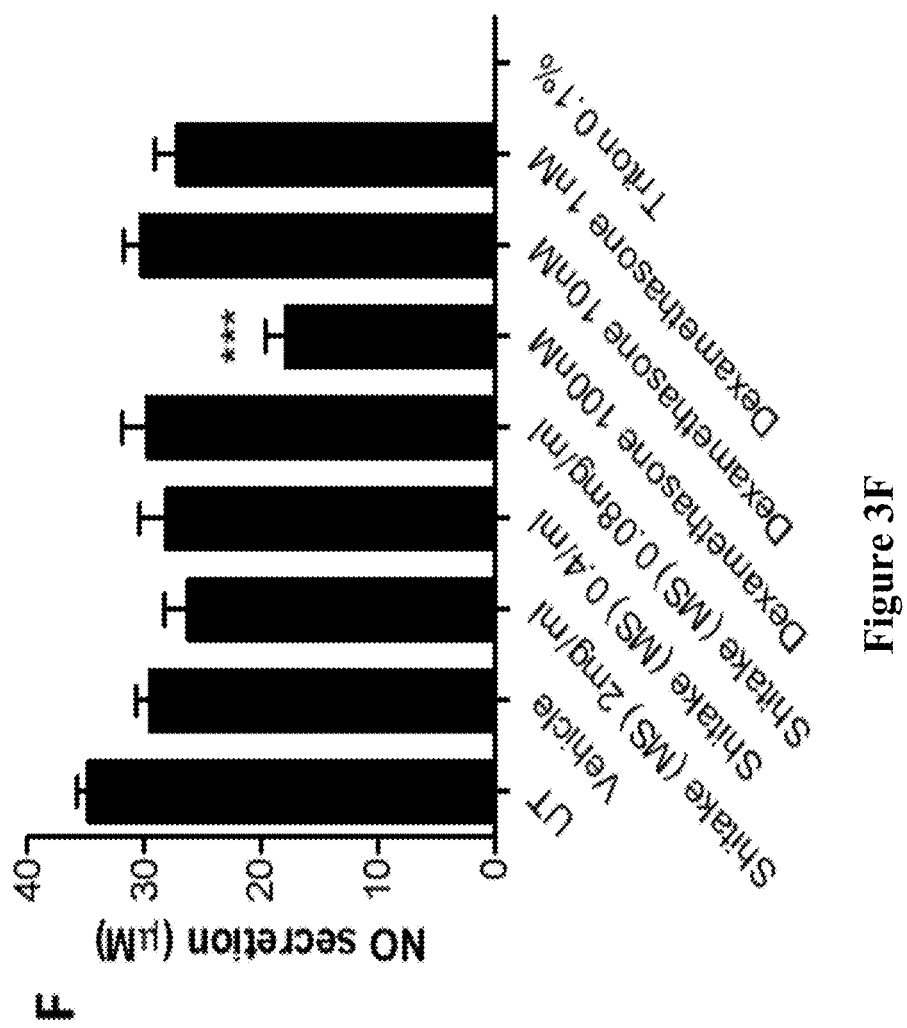
Figure 3G:
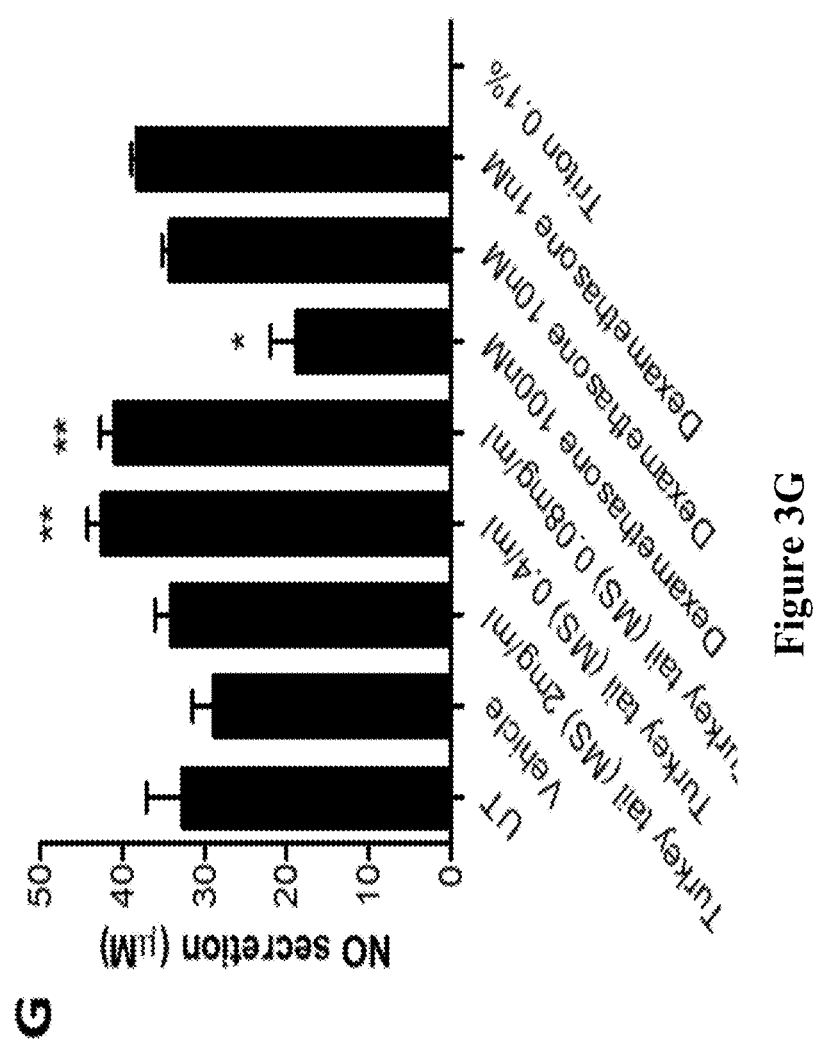
Figure 3H:
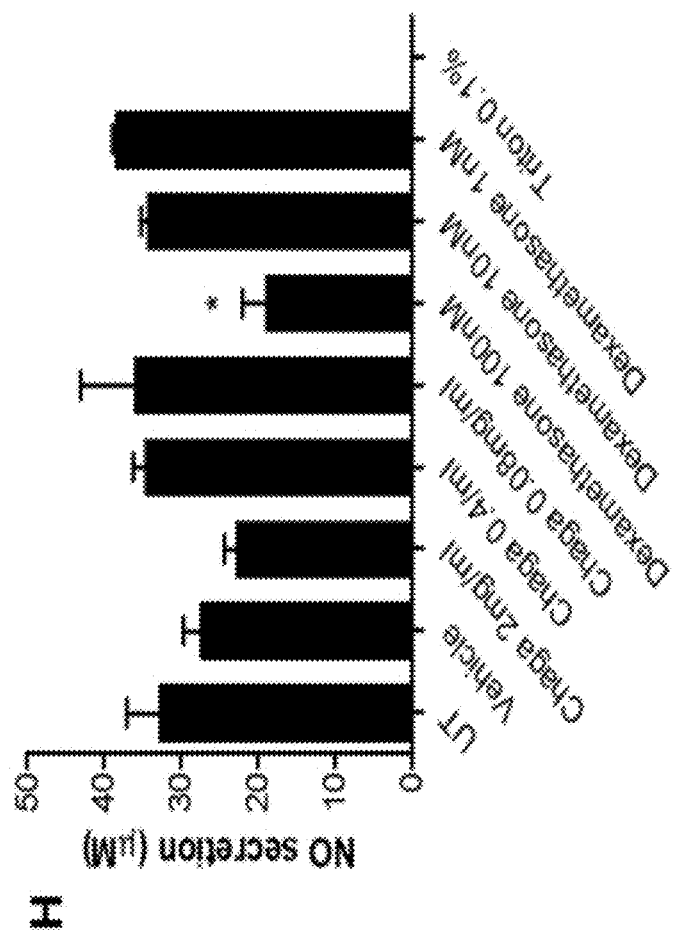
Figure 3I:
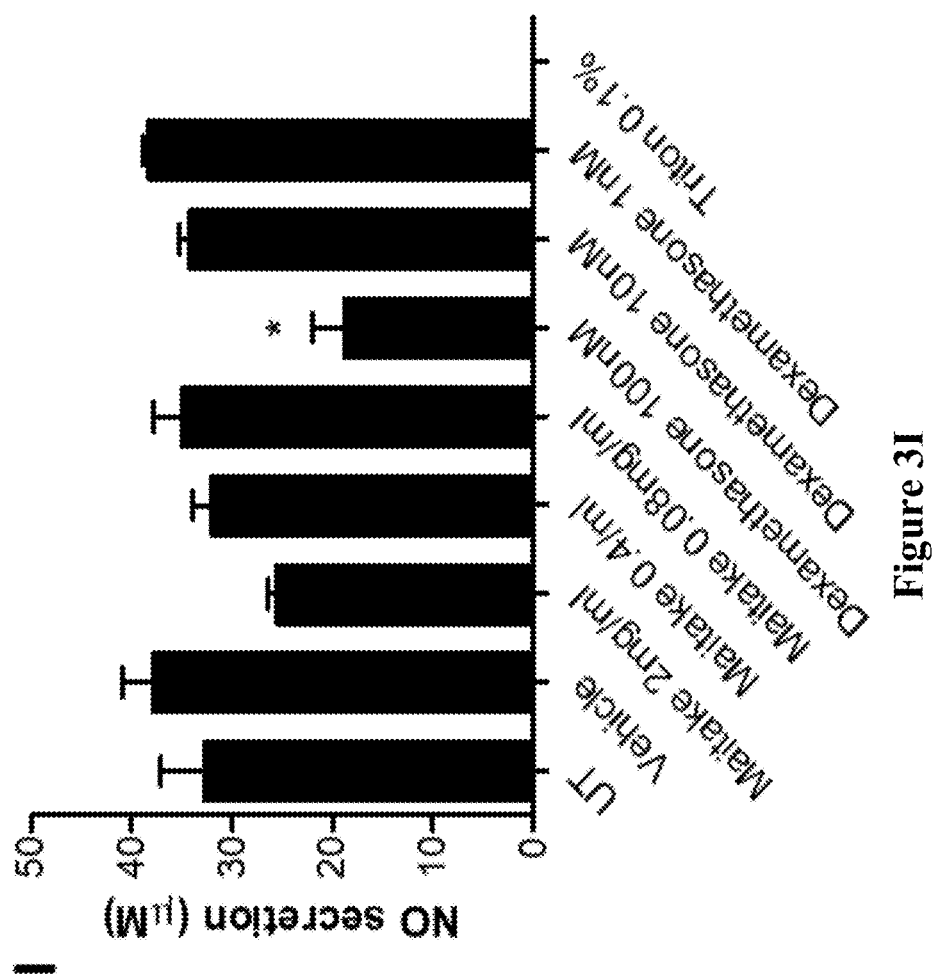

Nitric Oxide (NO) Test (Griess Test)
a. The Sulfanilamide Solution and NED Solution were allowed to equilibrate to room temperature (15-30 minutes).
b. 1 ml of a 100 µM nitrite solution was prepared by diluting the provided 0.1M Nitrite Standard 1:1,000 in culture medium.
c. 2 columns (16 wells) were designate in the non-binding 96-well plate for the Nitrite Standard reference curve. 50 µl of assay medium were dispensed into the wells in rows B-H (FIG. 1).
d. 100 µl of the 100 µM nitrite solution was added to the remaining 2 wells in row A. serial twofold dilutions (50 µl/well) were performed immediately in duplicate down the plate to generate the Nitrite Standard reference curve (100, 50, 25, 12.5, 6.25, 3.13 and 1.56 µM), discarding 50 µl from the 1.56 µM set of wells
e. 50 µl of the Sulfanilamide Solution were dispensed to all experimental samples and wells containing the dilution series for the Nitrite Standard reference curve.
f. The plate was incubated 5-10 minutes at room temperature, protected from light.
g. 50 µl of the NED Solution was dispensed to all wells.
h. The plate was incubated 5-10 minutes at room temperature, protected from light.
i. Absorbance was measured within 30 minutes in a plate reader with a filter between 520 nm and 550 nm.
j. Inhibition of NO secretion was considered relevant only in concentrations where there was no effect on cells' viability (viability over 95% compared to vehicle control). Representative results regarding viability are shown in FIG. 2.

Results: Mushroom Extracts

Nitric Oxide (NO) Secretion a. Reishi, *Agaricus blazei*, *Cordyceps* Cs-4 (2 mg/ml) and *Cordyceps* M (0.08 mg/ml) were the only effective mushrooms in inhibiting NO secretion (without any effect on cells' viability) in two-three independent experiments.
b. Table 4 describes NO secretion from RAW cells following treatment with vehicle control, mushrooms extract, and calculation of % inhibition of NO secretion (100%—NO mushrooms/NO vehicle*100%). *Cordyceps* M was found to be most effective in inhibiting NO secretion that appears to be in a dose dependent manner. Significant inhibition could also be observed following incubation with Reishi, however, inhibition could be observed only at the highest concentration (2 mg/ml).
c. It appears that, in vitro, there was a very narrow range for activity (without effecting cells' viability).
d. Turkey tail. Maitake. Shiitake and Chaga had no effect on NO secretion (see Table 4).
e. FIG. 3 shows representative results of NO secretion

TABLE 4

Summary of inhibition on NO secretion*

| Repeat | Mushroom | Vehicle NO (µM) | Fungi NO (µM) | % inhibition |
|--------|----------|-----------------|---------------|--------------|
| 1 | Reishi (2 mg/ml) | 11.16 | 4.26 | 61.8 |
| 2 |   | 22.2 | 10.21 | 54.0 |
| 3 |   | 28.9 | 5.9 | 79.6 |
| Avg |   | 20.8 | 6.8 | 65.1 |
| 1 | Cordyseps M (0.08 mg/ml) | 11.16 | 3.29 | 70.5 |
| 2 |   | 22.2 | 17.4 | 21.6 |
| Avg |   | 16.7 | 10.3 | 46.1 |
| 1 | Agaricus blazei (2 mg/ml) | 11.16 | 6.41 | 42.6 |
| 2 |   | 23.2 | 18.8 | 19.0 |
| 3 |   | 23.9 | 14 | 41.4 |
| Avg |   | 19.4 | 13.1 | 34.3 |
| 1 | Cordyseps Cs-4 (2 mg/ml) | 11.16 | 8 | 28.3 |
| 2 |   | 29.5 | 23.6 | 20.0 |
| Avg |   | 20.3 | 15.8 | 24.2 |
| 1 | Maitake | 37.0 | 25.0 | 32.4 |
| 1 | Chaga (2 mg/ml) | 27.3 | 22.7 | 16.8 |
| 1 | Shiitake (2 mg/ml) | 29.5 | 26.3 | 10.8 |
| 1 | Turkey Tail RM (2 mg/ml) | 29.5 | 32.8 | no inhibition |
| 1 | Turkey Tail RM (2 mg/ml) | 28.9 | 34.0 | no inhibition |

*Mushrooms are arranged by most effective (top) and least effective (bottom).

Figure 4A:
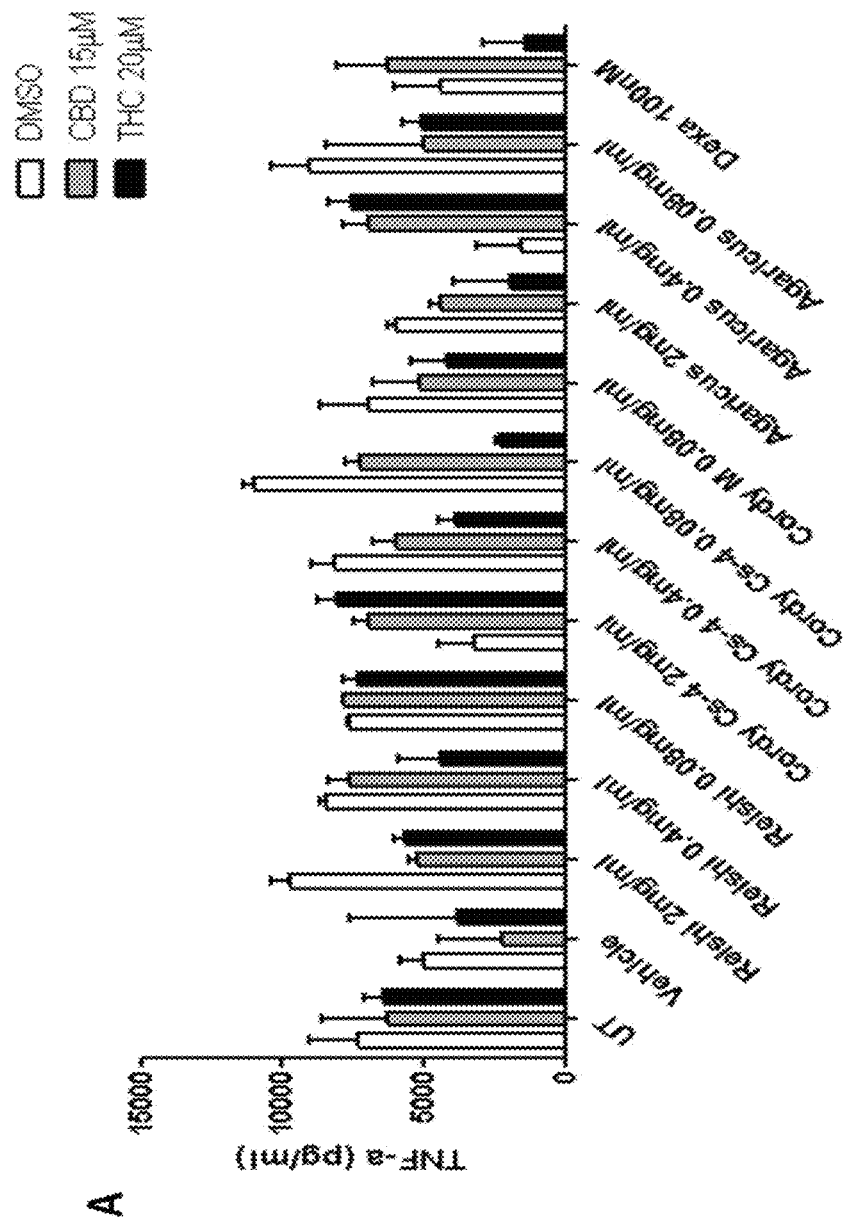
FIG. 4: *Cordyceps* Cs-4 (A), *Cordyceps* M (B), Reishi (C), and *Agaricus balzei* (D) were incubated with $10^5$ RAW cells for 24 h, with and without CBD or THC. IL-6 and TNFa in the supernatants were measured by Multiplex.
Figure 4B:
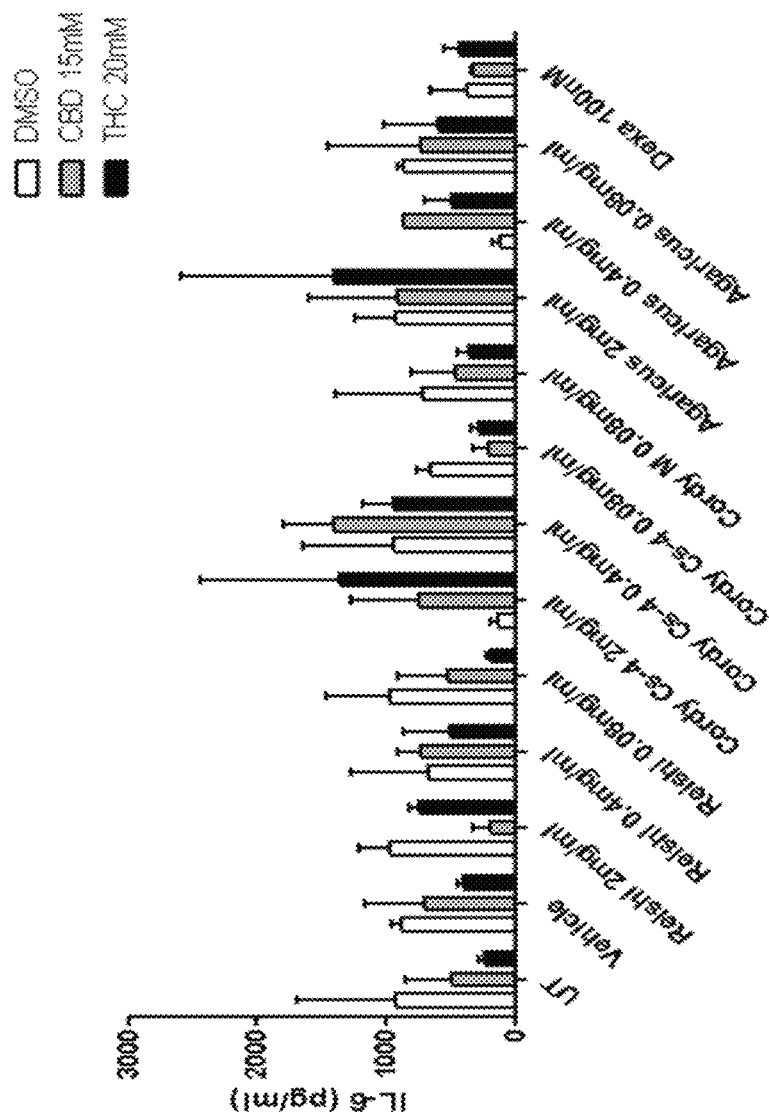

Cytokine Secretion
  a. Reishi, *Cordyceps* M, *Agaricus blazei*, and *Cordyceps* Cs-4 were incubated with 105 RAW cells/well at 0.08-2 mg/ml for 24 hours.
  b. Medium from cells was collected for Multiplex analysis (CCL3/MIP1α, IL-6, IL-1β, TNFα, IL-10 and IL-6) in duplicates.
  c. IL-4, IL-10 and IL-1β were not secreted under these conditions (under the limit of detection).
  d. CCL3/MIP-1α secretion was above limit of detection, even when samples were diluted 1:20.
  e. IL-6 secretion Table 5 describes IL-6 secretion from RAW cells following treatment with vehicle control, mushrooms extract, and calculation of % inhibition of IL-6 secretion (100%-IL-6 mushrooms/IL-6 vehicle*100%) or % elevation of IL-6 secretion (IL-6 mushrooms/IL-6 vehicle*100%-100%).
  f. TNFα secretion Table 6 describes TNFα secretion from RAW cells following treatment with vehicle control, mushrooms extract, and calculation of % secretion of TNFα secretion (TNFα mushrooms/TNFα vehicle*100%) or % elevation of TNFα secretion (TNFα mushrooms/TNFα vehicle*100%–100%).
  g. Results from assays are also shown in FIG. 4.

TABLE 5

Summary of IL-6 secretion

| Mushroom | Concentration (mg/ml) | Vehicle IL-6 (pg/ml) | Mushroom IL-6 (pg/ml) | % inhibition | % elevation |
|---|---|---|---|---|---|
| Agaricus blazei | 2 | 883 | 931 | | 5.4 |
| | 0.4 | 883 | 120 | 86.4 | |
| | 0.08 | 883 | 867 | 1.8 | |
| Reishi | 2 | 883 | 972 | | 10.1 |
| | 0.4 | 883 | 669 | 24.2 | |
| | 0.08 | 883 | 973 | | 10.2 |
| Cordyseps M | 0.08 | 883 | 717 | 18.8 | |
| Cordyseps Cs-4 | 2 | 883 | 128 | 85.5 | |
| | 0.4 | 883 | 945 | | 7.0 |
| | 0.08 | 883 | 655 | 25.8 | |

TABLE 6

Summary of TNFα secretion

| Mushroom | Concentration (mg/ml) | Vehicle TNFa (pg/ml) | Mushroom TNFa (pg/ml) | % inhibition | % elevation |
|---|---|---|---|---|---|
| Agaricus blazei | 2 | 5035 | 5995 | | 19.1 |
| | 0.4 | 5035 | 1568 | 68.9 | |
| | 0.08 | 5035 | 9059 | | 79.9 |
| Reishi | 2 | 5035 | 9756 | | 93.8 |
| | 0.4 | 5035 | 8439 | | 67.6 |
| | 0.08 | 5035 | 7639 | | 51.7 |
| Cordyseps M | 0.08 | 5035 | 6984 | | 38.7 |
| Cordyseps Cs-4 | 2 | 5035 | 3228 | 35.9 | |
| | 0.4 | 5035 | 8139 | | 61.6 |
| | 0.08 | 5035 | 10965 | | 117.8 |

Figure 5A:
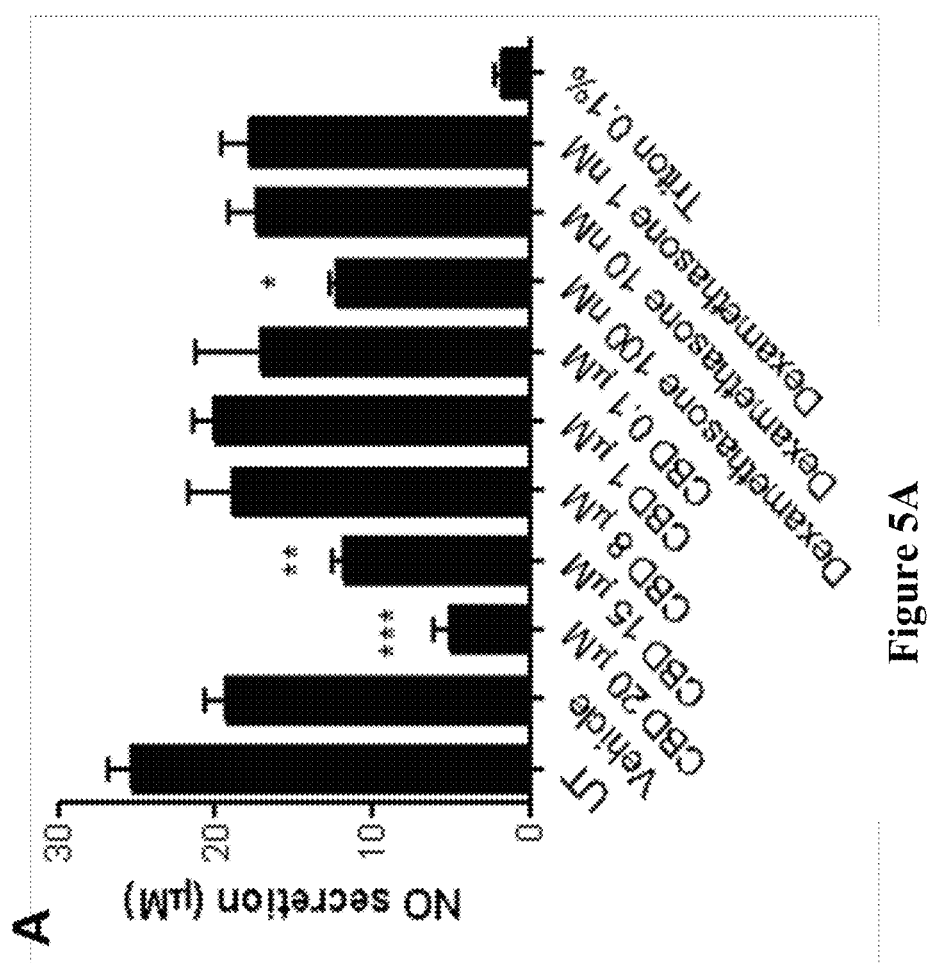
FIG. 5: CBD (A) and THC (B) were incubated with $10^5$ RAW cells for 24 h. NO secretion in the supernatants was measured using Greiss reagent kit.
Figure 5B:
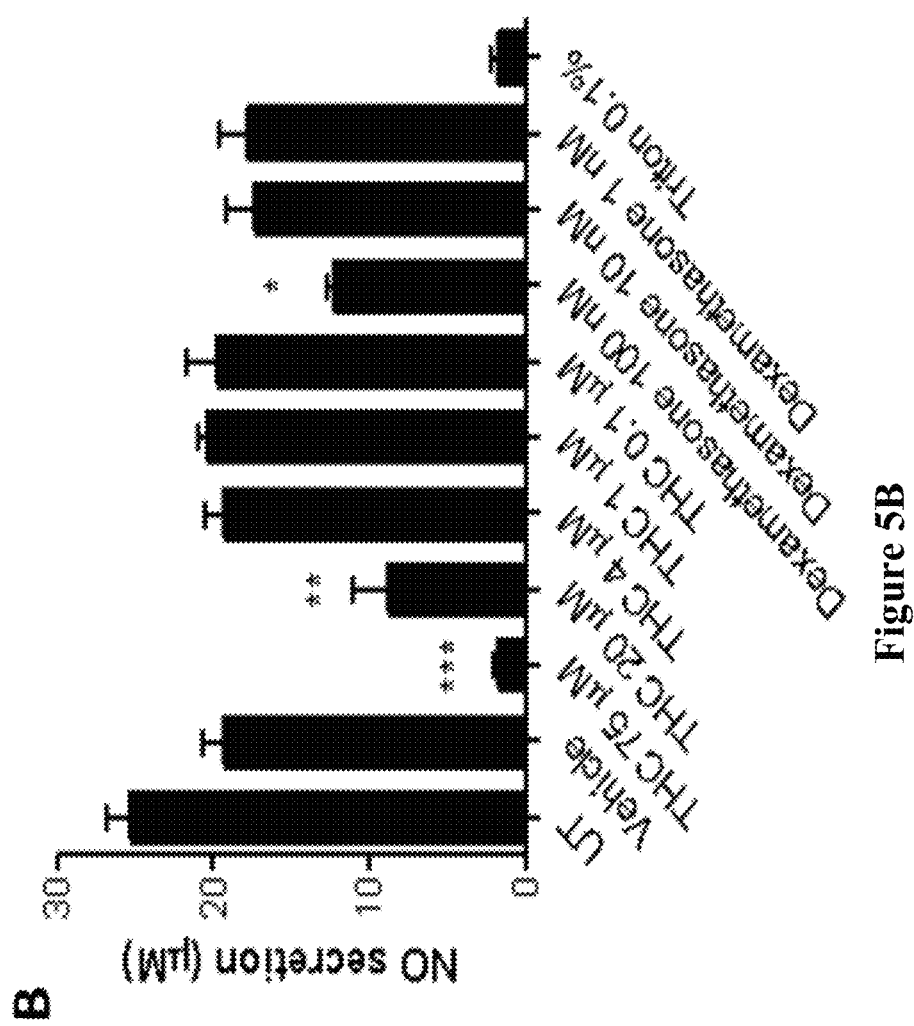
Figure 6A:
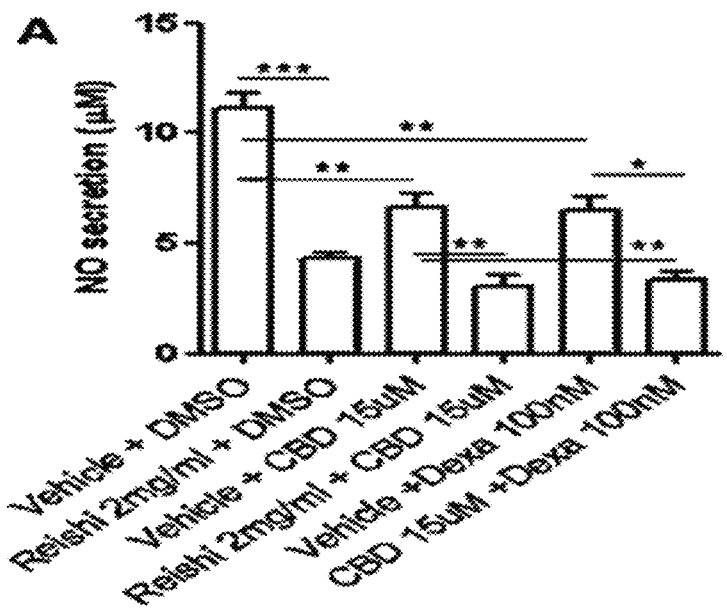
FIG. 6: Reishi (A+B), *Agaricus balzei* (C+D), *Cordyceps* Cs-4 (E+F), and *Cordyceps* M (G+H) were combined with DMSO. CBD or THC with $10^5$ RAW cells for 24 h. NO secretion in the supernatants was measured using Greiss reagent kit.
Figure 6B:
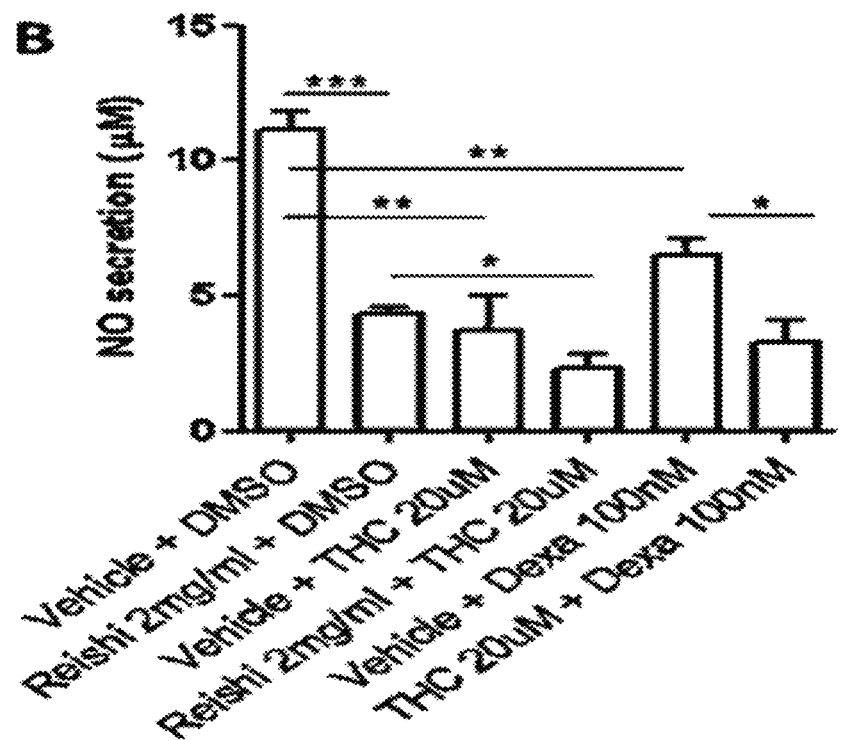
Figure 6C:
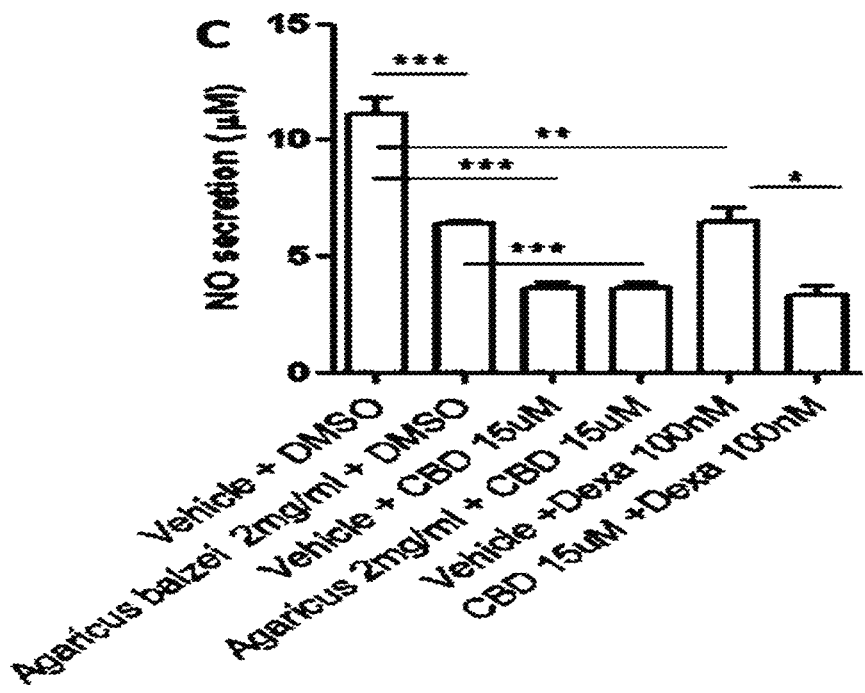
Figure 6D:
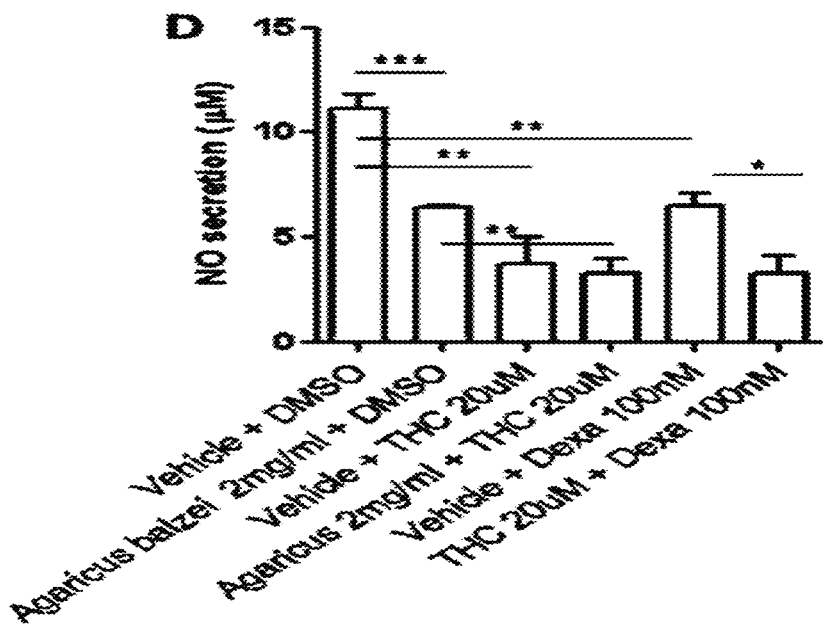
Figure 6E:
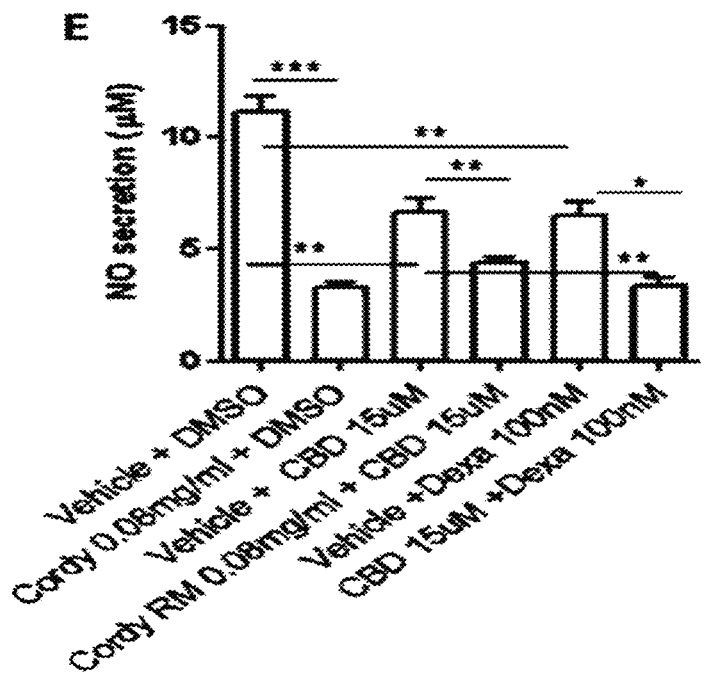
Figure 6F:
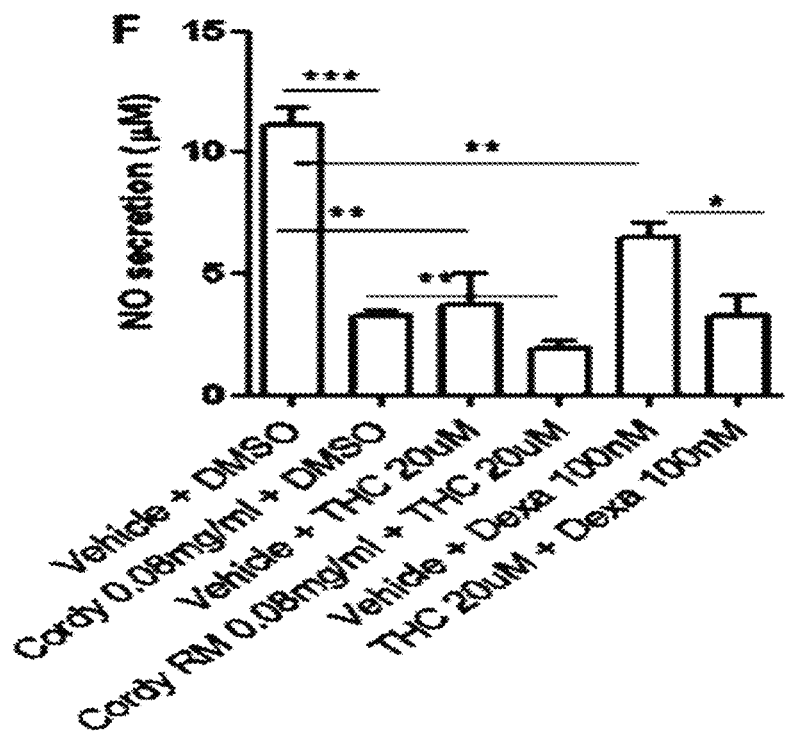
Figure 6G:
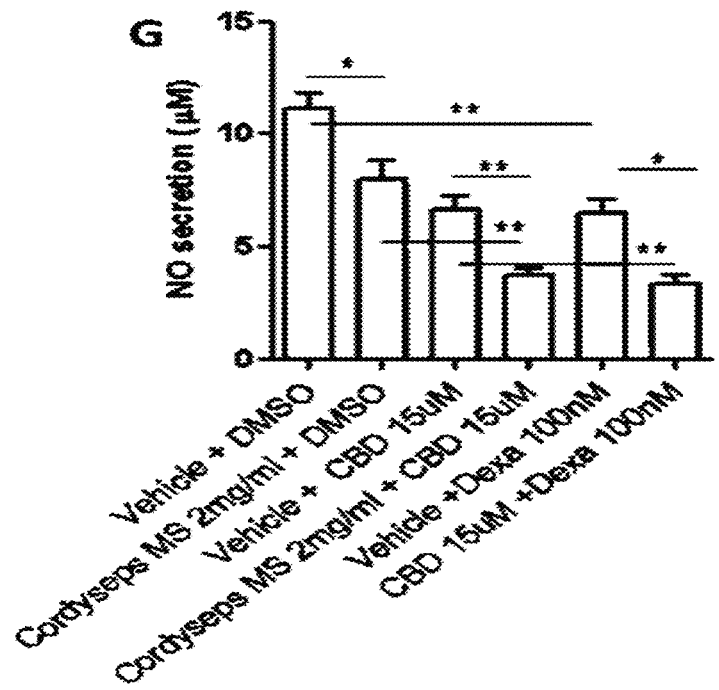
Figure 6H:
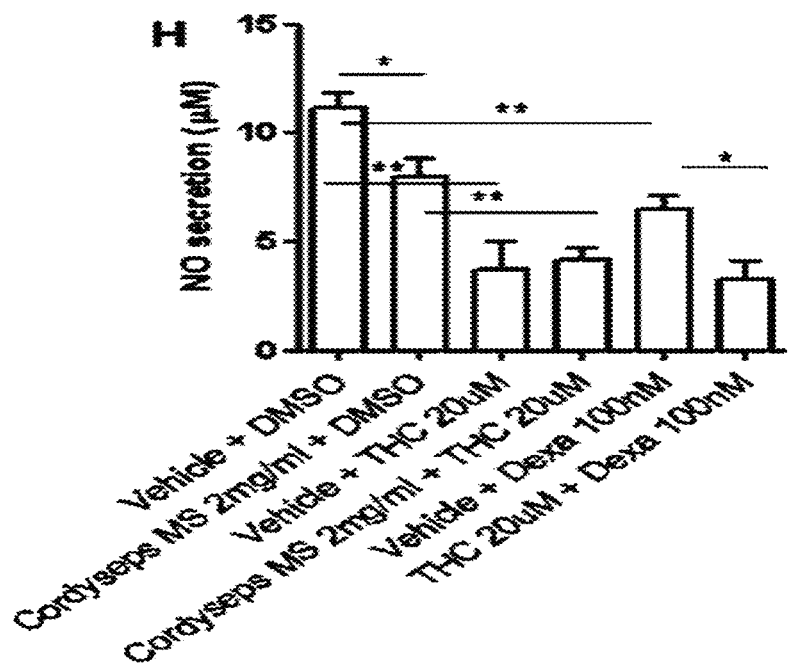

Cannabinoid Extracts
  Nitric oxide secretion: Results for NO secretion by cannabinoid extracts are shown in Table 7 below.
    a. CBD was effective in inhibiting NO secretion without affecting cells' viability at 15-20 µM, while THC was affective at 20 µM.
    b. There was almost no dose response. There is a very narrow range for activity (without effecting cells' viability).
    c. Results for effect of cannabinoid extracts on NO secretion are also shown in FIG. 5.

TABLE 7

Summary of inhibition on NO secretion*

| Cannabinoid | Vehicle NO (µM) | Cannabinoid NO (µM) | % inhibition |
|---|---|---|---|
| CBD 20 µM | 19.73 | 5.07 | 73.6 |
| CBD 15 µM | 19.23 | 11.8 | 38.6 |
| THC 20 µM | 19.23 | 8.77 | 54.4 |

*Cannabinoids are arranged by most effective top and least effective (bottom).

Cytokine Secretion
  a. CBD (15 µM) and THC (20 µM) were incubated with 105 RAW cells/well.
  b. Medium from cells was collected for Multiplex analysis (CCL3/MIP1α, IL-6, IL-1β, TNFα, IL-10 and IL-6) in duplicates.
  c. IL-4, IL-10 and IL-1β were not secreted under these conditions (under the limit of detection).
  d. CCL3/MIP-1α secretion was above limit of detection, even when samples were diluted 1:20.
  e. IL-6 secretion:
    i. CBD did not affect IL-6 secretion.
  f. TNFα secretion:
    i. CBD did not affect TNFα secretion.
    ii. THC did not affect TNFα secretion.
  Results are also shown in FIG. 4.

Mushrooms Extract in Combination with Cannabinoid Extract
  Nitric Oxide secretion: Table 8 describes NO secretion from RAW cells following treatment with vehicle control, mushrooms extract, with/without cannabinoids and calculation of % inhibition of NO secretion (100%–NO mushrooms/NO vehicle*100%).
    a. DMSO, CBD (15 µM) or THC (20 µM) were incubated in combination with Reishi, *Cordyceps* M, *Agaricus blazei*, and *Cordyceps* Cs-4 (0.08-2 mg/ml) with 105 RAW cells/well for 24 hours.
    b. Cells' medium was collected and measured for NO secretion (Greiss NO kit).
    c. Reishi: THC markedly increased Reishi's (2 mg/ml) inhibition on NO secretion. CBD had only a slight additive effect. This combination appears to be the most potent combination in terms of NO secretion inhibition.
    d. *Cordyceps* M (RM): THC enhanced *Cordyceps* M's (0.08 mg/ml) inhibition of NO secretion. CBD had no such effect.
    e. *Cordyceps* Cs-4 (CS): both THC and CBD increased *Cordyceps* Cs-4's (2 mg/ml) inhibition of NO secretion.
    f. *Agaricus blazei*: both THC and CBD increased *Agaricus blazei*'s (2 mg/ml) inhibition of NO secretion.
    g. *Cordyceps* M 0.08 mg/ml with THC 20 µM is the most potent combination for NO secretion inhibition.
  Results are also shown in FIG. 6.

TABLE 8

Summary of inhibition on NO secretion*

| Mushroom | Vehicle NO (µM) | Mushrooms NO (µM) | % inhibition |
|---|---|---|---|
| Cordyseps M 0.08 mg/ml | 11.16 | 3.29 | 70.5 |
| Cordyseps M 0.08 mg/ml + CBD 15 µM | 11.16 | 4.36 | 60.9 |

TABLE 8-continued

Summary of inhibition on NO secretion*

| Mushroom | Vehicle NO (µM) | Mushrooms NO (µM) | % inhibition |
|---|---|---|---|
| Cordyseps M 0.08 mg/ml + THC 20 µM | 11.16 | 1.94 | 82.6 |
| Reishi 2 mg/ml | 11.16 | 4.29 | 61.6 |
| Reishi 2 mg/ml + CBD 15 µM | 11.16 | 3.05 | 72.7 |
| Reishi 2 mg/ml + THC 20 µM | 11.16 | 2.28 | 79.6 |
| Agaricus 2 mg/ml | 11.16 | 6.41 | 42.6 |
| Agaricus 2 mg/ml + CBD 15 µM | 11.16 | 3.61 | 67.7 |
| Reishi 2 mg/ml + THC 20 µM | 11.16 | 3.29 | 70.5 |
| CordysepsCs-4 2 mg/ml | 11.16 | 8 | 28.3 |
| CordysepsCs-4 2 mg/ml + CBD 15 µM | 11.16 | 3.73 | 66.6 |
| CordysepsCs-4 2 mg/ml + THC 15 µM | 11.16 | 4.14 | 62.9 |
| CBD 15 µM | 11.16 | 6.67 | 40.2 |
| THC 20 µM | 11.16 | 3.72 | 66.7 |

*combinations are arranged by most effective (top) and least effective (bottom)

Cytokine Secretion
- a. DMSO, CBD (15 µM) or THC (20 µM) were incubated in combination with Reishi, Cordyceps M, *Agaricus blazei*, and *Cordyceps* Cs-4 (0.08-2 mg/ml) with 105 RAW cells/well.
- b. Medium from cells was collected for Multiplex analysis (CCL3/MIP1α, IL-6, IL-1β, TNFα, IL-10 and IL-6) in duplicates.
- c. IL-4, IL-10 and IL-1β were not secreted under these conditions (under the limit of detection).
- d. CCL3/MIP-1α secretion was above limit of detection, even when samples were diluted 1:20.
- e. IL-6 secretion (Table 9 describes IL-6 secretion from RAW cells following treatment with vehicle control, mushrooms extract, with and without cannabinoids, and calculation of % inhibition of IL-6 secretion (100%–IL-6 mushrooms/IL-6 vehicle*100%) or % elevation of IL-6 secretion (IL-6
- f. mushrooms/IL-6 vehicle*100%-100%).
- g. TNFα secretion: Table 10 describes TNFα secretion from RAW cells following treatment with vehicle control, mushrooms extract, with and without cannabinoids, and calculation of % secretion of TNFα secretion (TNFα mushrooms/TNFα vehicle*100%) or % elevation of TNFα secretion (TNFα mushrooms/TNFα vehicle*100%-100%).
    - i. CBD+Reishi (2 mg/ml) decreased IL-6 secretion as compared to both extracts alone-pro inflammatory effect.
    - ii. CBD+*Cordyceps* Cs-4 (0.08 mg/ml) decreased IL-6 secretion as compared to both extracts alone-pro inflammatory effect. o CBD+*Cordyceps* Cs-4 (2 mg/ml) diminished the inhibiting effect of *Cordyceps* Cs-4 (2 mg/ml) alone on IL-6 secretion. o CBD+*Agaricus blazei* (0.4 mg/ml) diminished the inhibiting effect of *Agaricus blazei* (0.4 mg/ml) alone on IL-6 secretion.
    - iii. THC+Reishi (0.08 mg/ml) decreased IL-6 secretion as compared to both extracts alone.
    - iv. THC+*Cordyceps* Cs-4 (2 mg/ml) increased IL-6 secretion as compared to both extracts alone. o THC+*Cordyceps* Cs-4 (0.08 mg/ml) decreased IL-6 secretion as compared to both extracts alone. o THC+*Cordyceps* M (0.08 mg/ml) decreased IL-6 secretion as compared to both extracts alone.
- h. TNFα secretion:
    - i. CBD+Reishi (2 mg/ml) decreased TNFα secretion as compared to both extracts alone. o THC+Reishi (0.4-2 mg/ml) decreased TNFα secretion as compared to both extracts alone. o CBD/THC+*Cordyceps* Cs-4 (2 mg/ml) increased TNFα secretion as compared to both extracts alone.
    - ii. THC+*Cordyceps* Cs-4 (0.08 mg/ml) decreased TNFα secretion as compared to both extracts alone.
    - iii. THC+*Agaricus blazei* (2 mg/ml) decreased TNFα secretion as compared to both extracts alone, however THC+*Agaricus blazei* (0.08 mg/ml) increased TNFα secretion as compared to both extracts alone.
    - iv. THC+Reishi (0.08 mg/ml) decreased IL-6 secretion the most. THC+*Cordyceps* Cs-4 (2 mg/ml) increased IL-6 secretion the most.
    - v. THC+*Cordyceps* Cs-4 (0.08 mg/ml) decreased TNFα secretion the most.

Results are shown in FIG. 4.

TABLE 9

Summary of IL-6 secretion

| Mushroom | Concentration (mg/ml) | Veicle IL-6 (pg/ml) | Mushroom IL-6 (pg/ml) | % inhibition | % elevation |
|---|---|---|---|---|---|
| Agaricus | 2 | 883 | 931 | | 5.4 |
|  | 0.4 | 883 | 120 | 86.4 | |
|  | 0.08 | 883 | 867 | 1.8 | |
| Agaricus + CBD | 2 | 693 | 917 | | 32.3 |
|  | 0.4 | 693 | 859 | | 24.0 |
|  | 0.08 | 693 | 734 | | 5.9 |
| Agaricus + THC | 2 | 405 | 1406 | | 247.2 |
|  | 0.4 | 405 | 491 | | 21.2 |
|  | 0.08 | 405 | 596 | | 47.2 |
| Reishi | 2 | 883 | 972 | | 10.1 |
|  | 0.4 | 883 | 669 | 24.2 | |
|  | 0.08 | 883 | 973 | | 10.2 |
| Reishi + CBD | 2 | 693 | 187 | 73.0 | |
|  | 0.4 | 693 | 728 | | 5.1 |
|  | 0.08 | 693 | 516 | 25.5 | |
| Reishi + THC | 2 | 405 | 739 | | 82.5 |
|  | 0.4 | 405 | 498 | | 23.0 |
|  | 0.08 | 405 | 191 | 52.8 | |
| Cordyseps M | 0.08 | 883 | 717 | 18.8 | |
| Cordyseps M + CBD | 0.08 | 693 | 467 | 32.6 | |
| Cordyseps M + THC | 0.08 | 405 | 393 | 3.0 | |

TABLE 9-continued

Summary of IL-6 secretion

| Mushroom | Concentration (mg/ml) | Veicle IL-6 (pg/ml) | Mushroom IL-6 (pg/ml) | % inhibition | % elevation |
|---|---|---|---|---|---|
| Cordyseps Cs-4 | 2 | 883 | 128 | 85.5 | |
| | 0.4 | 883 | 945 | | 7.0 |
| | 0.08 | 883 | 655 | 25.8 | |
| Cordyseps Cs-4 + CBD | 2 | 693 | 747 | | 7.8 |
| | 0.4 | 693 | 1409 | | 103.3 |
| | 0.08 | 693 | 207 | 70.1 | |
| Cordyseps Cs-4 + THC | 2 | 405 | 1364 | | 236.8 |
| | 0.4 | 405 | 936 | | 131.1 |
| | 0.08 | 405 | 275 | 32.1 | |

TABLE 10

Summary of TNFα secretion

| Mushroom | Concentration (mg/ml) | Veicle TNFa (pg/ml) | Mushroom TNFa (pg/ml) | % inhibition | % elevation |
|---|---|---|---|---|---|
| Agaricus | 2 | 5035 | 5995 | | 19.1 |
| | 0.4 | 5035 | 1568 | 68.9 | |
| | 0.08 | 5035 | 9059 | | 79.9 |
| Agaricus + CBD | 2 | 2232 | 4364 | | 95.5 |
| | 0.4 | 2232 | 6918 | | 209.9 |
| | 0.08 | 2232 | 4979 | | 123.1 |
| Agaricus + THC | 2 | 3802 | 1957 | 48.5 | |
| | 0.4 | 3802 | 7544 | | 98.4 |
| | 0.08 | 3802 | 5093 | | 34.0 |
| Reishi | 2 | 5035 | 9756 | | 93.8 |
| | 0.4 | 5035 | 8439 | | 67.6 |
| | 0.08 | 5035 | 7639 | | 51.7 |
| Reishi + CBD | 2 | 2232 | 5239 | | 134.7 |
| | 0.4 | 2232 | 7638 | | 242.2 |
| | 0.08 | 2232 | 7838 | | 251.2 |
| Reishi + THC | 2 | 3802 | 5639 | | 48.3 |
| | 0.4 | 3802 | 4404 | | 15.8 |
| | 0.08 | 3802 | 7362 | | 93.6 |
| Cordyseps M | 0.08 | 5035 | 6984 | | 38.7 |
| Cordyseps M + CBD | 0.08 | 2232 | 5118 | | 129.3 |
| Cordyseps M + THC | 0.08 | 3802 | 4165 | | 9.5 |
| Cordyseps Cs-4 | 2 | 5035 | 3228 | 35.9 | |
| | 0.4 | 5035 | 8139 | | 61.6 |
| | 0.08 | 5035 | 10965 | | 117.8 |
| Cordyseps Cs-4 + CBD | 2 | 2232 | 6962 | | 211.9 |
| | 0.4 | 2232 | 5964 | | 167.2 |
| | 0.08 | 2232 | 7221 | | 223.5 |
| Cordyseps Cs-4 + THC | 2 | 3802 | 8074 | | 112.4 |
| | 0.4 | 3802 | 3878 | | 7.0 |
| | 0.08 | 3802 | 2264 | 40.5 | |

From data provided hereinabove, it can be seen that anti-inflammatory properties of combinations of mushroom extracts with THC or CBD significantly differ from those of each component alone, thus showing synergistic anti-inflammatory effect of mushroom extracts with THC or CBD.

Table 8 specifically shows that the combinations of mushroom extracts with THC or CBD resulted in decreased secretion of NO, relative to each component alone, indicating increased anti-inflammatory properties of these combinations. The highest inhibition of NO secretion was observed for the combination of Cordyceps M, 0.08 mg/ml with 20 µM THC.

The effect of mushroom extracts combined with THC or CBD on IL-6 secretion showed decreased IL-6 secretion THC+Reishi (0.08 mg/ml), As shown in Table 9, while THC+Cordyceps Cs-4 (2 mg/ml) resulted in increased IL-6 secretion the most.

The effect of mushroom extracts combined with THC or CBD on TNFα secretion, is shown in Table 10: The highest decrease in TNFα secretion was observed for THC+Cordyceps Cs-4 (0.08 mg/ml), indicating anti-inflammatory activity.

Example 2

Viability assay of panc-1 and egl-1 cells following treatment with various combinations of mushrooms extracts and cannabinoids Test System
  a. PANC-1 cells (Human Pancreatic Cancer cells) (American Type Culture Collection, Rockville, MD, USA).
  b. EGL-1 cells (Human extrahepatic cholangio carcinoma)

Cell Growth:

Growth medium for PANC-1/EGL-1 cells: Dulbecco's Modified Eagle Medium (DMEM) high glucose supplemented with 10% Fetal Bovine Serum (FBS), 2 mM L-Glutamine, and 1% Penicillin-Streptomycin solution (PS).

Growth medium for EGL-1 cells: RPMI-1640 medium supplemented with 10% Fetal Bovine Serum (FBS), 2 mM L-Glutamine, and 1% Penicillin-Streptomycin solution (PS).

Assay medium for PANC-1: Assay medium contained only 1% FBS.

Assay medium for EGL-1: Assay medium contained only 1% FBS in DMEM low glucose (1 g/L)

Experimental Design: Cell Incubation with Test Items:

a. Cells were harvest at 80% confluence, counted and re-suspend to final concentration of 75×103/ml (PANC-1) or 50×103 (EGL-1) in growth medium.
b. Panc-1 cell suspension was seeded in 96-well microtiter plate at 7500 cells/100 µl/well and EGL-1 cell suspension was seeded in 96-well microtiter plate at 5000 cells/l100p/well.
c. Cells were incubated (37±10 C, 5% CO2) for 18-24 hrs.
d. Growth medium was removed; 80 µL assay medium and 20 µL Vehicle, Test Item, and Controls were added. Each plate was designed as indicated in Table 11, Table 12 and Table 13.
e. The content of all wells was mixed by pipetting up and down three times.
f. Plates were incubated for 72±2 h (37±1° C., 5% CO2).
g. The medium on all plates was replaced with 100 µl culture medium.

XTT Assay a. XTT reaction solution was prepared.
b. 50 µl of the XTT reaction solution was added into each well.
c. Plates were incubated in a humidified atmosphere (e.g. 37° C., 5% CO2).
d. The plates were shaken gently to evenly distribute the dye in the wells.
e. The absorbance of the samples was measure against a background control as a blank with a spectrophotometer (ELISA reader) at a wavelength of 450 nm.
f. In order to measure reference absorbance (to measure non-specific readings), a wavelength of 620 nm was used to subtract from the 450 nm measurement.
g. The idle absorbance of the cells was 0.5-1.5 in all wells.

TABLE 11

*Suggested Assay Design

| Group No. | Test Item/control | Concentrations | Samples |
|---|---|---|---|
| 1 | Assay background Assay medium only (no cells) | NA | 6 |
| 2 | Assay negative control Cells with assay medium | NA | 5 |
| **3 | Assay negative control 2 Cells with assay medium + DMSO Vehicle | 1% DMSO in 20% WFI | 5 |
| 4 | Assay negative control 3 Cells with assay medium + EtOH Vehicle | 1% EtOH in 20% WFI | 5 |
| 6-7 | Cordyseps (from RM and from MS) | 10, 8, 6, 4, 2, and 0.5 mg/ml | 6 × 4 + 6 × 4 |
| 8-9 | Turkey Tail (from RM and from MS) | | 6 × 4 + 6 × 4 |
| 10 | Shiitake | | 6 × 4 |
| 11 | Agaricus Blazei | | 6 × 4 |
| 12 | Reishi | | 6 × 4 |
| 13 | Chaga | | 6 × 4 |
| 14 | Maitake | | 6 × 4 |
| 15 | THC | 375, 100, 20, 5 and 0.5 µM | 5 × 4 |
| 16 | CBD | 100, 75, 40, 5, and 0.5 µM | 5 × 4 |

TABLE 12

Plate set-up of cannabinoid extracts

| | 1 | 2 | 3 | 4 | 5 | 6 | 7 | 8 | 9 | 10 | 11 | 12 |
|---|---|---|---|---|---|---|---|---|---|---|---|---|
| A | | | | | | | | | | | | |
| B | medium | CBD 1 | THC 1 | Vehicle | CBD 2 | CBD 3 | UT | Dex 100 n | MCBD 1 | THC 3 | CBD 3 | |
| C | medium | CBD 4 | CBD 3 | CBD 5 | THC 5 | CBD 1 | CBD 5 | Dex 1 nM | THC 1 | THC 2 | THC 3 | |
| D | medium | Vehicle | THC 2 | THC 3 | Vehicle | CBD 4 | Dex 10 nM | CBD 4 | CBD 2 | THC 5 | CBD 2 | |
| E | medium | CBD 5 | THC 4 | Dex 1 nM | THC 1 | THC 2 | Vehicle | Dex 10 nM | THC 3 | THC 4 | CBD 5 | |
| F | medium | Vehicle | UT | THC 5 | UT | CBD 1 | UT | Vehicle | UT | CBD 3 | THC 1 | |
| G | medium | THC 2 | Dex 10 nM | CBD 2 | Dex 1 nM | CBD 4 | THC 4 | Dex 100 n | MVehicle | THC 4 | THC 5 | |
| H | | | | | | | | | | | | |

*Rows marked in red were every plate set up
**Only in CBD/THC plates

TABLE 13

Plate set-up of cannabinoid extracts
EXAMPLE 3
Results of cancer Study:: Mushrooms extract

Figure 7A:
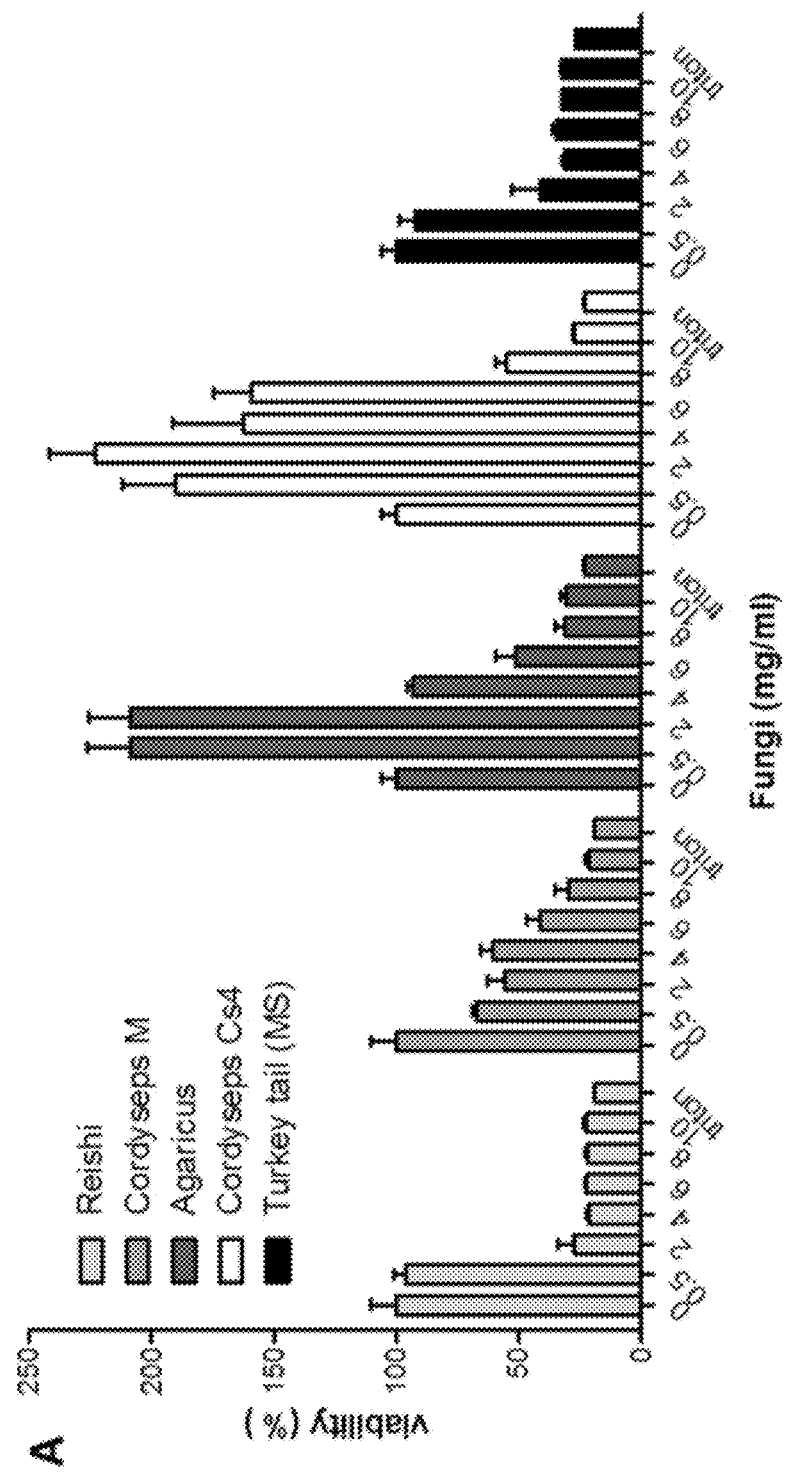
FIG. 7: Reishi, *Cordyceps* M, *Agaricus blazei*, *Cordyceps* Cs-4, Turkey Tail (MS) (A), Chaga, Maitake, Turkey Tail (RM) and Shiitake (B) were incubated with 7500 PANC-1 cells for 72 h. Viability was measured using XTT reagent kit.
Figure 7B:
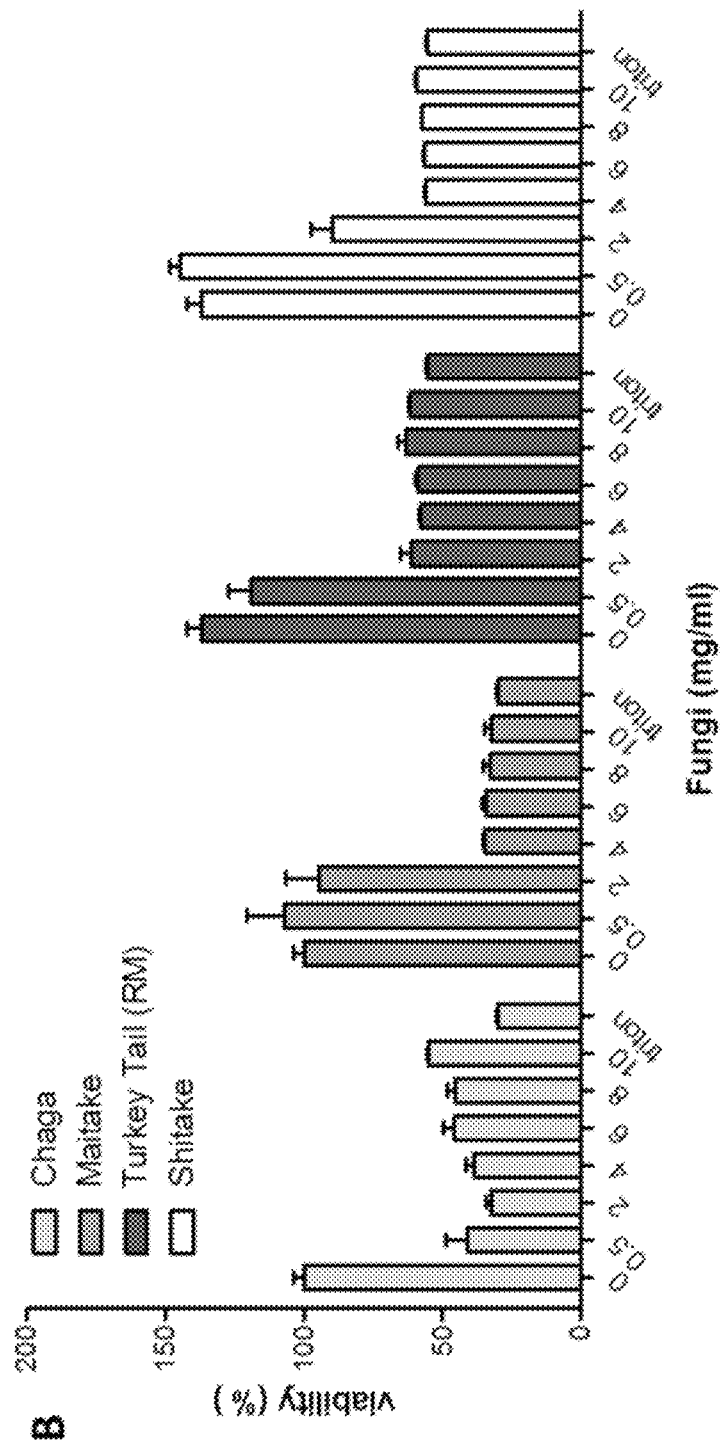
Figure 8A:
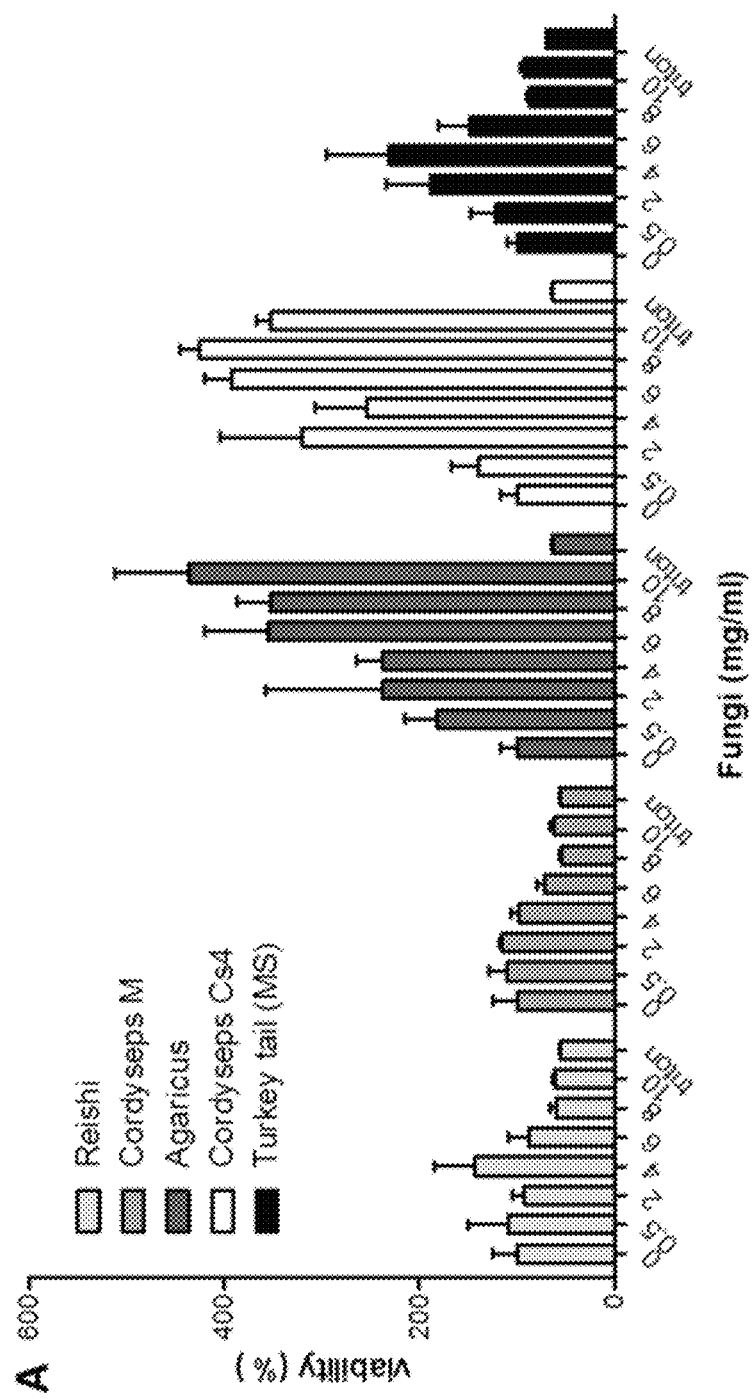
FIG. 8: Reishi, *Cordyceps* M, *Agaricus blazei*, *Cordyceps* Cs-4, Turkey Tail (MS) (A), Chaga, Maitake, Turkey Tail (RM) and Shiitake (B) were incubated with 5000 EGL-1 cells for 72 h. Viability was measured using XTT reagent kit.
Figure 8B:
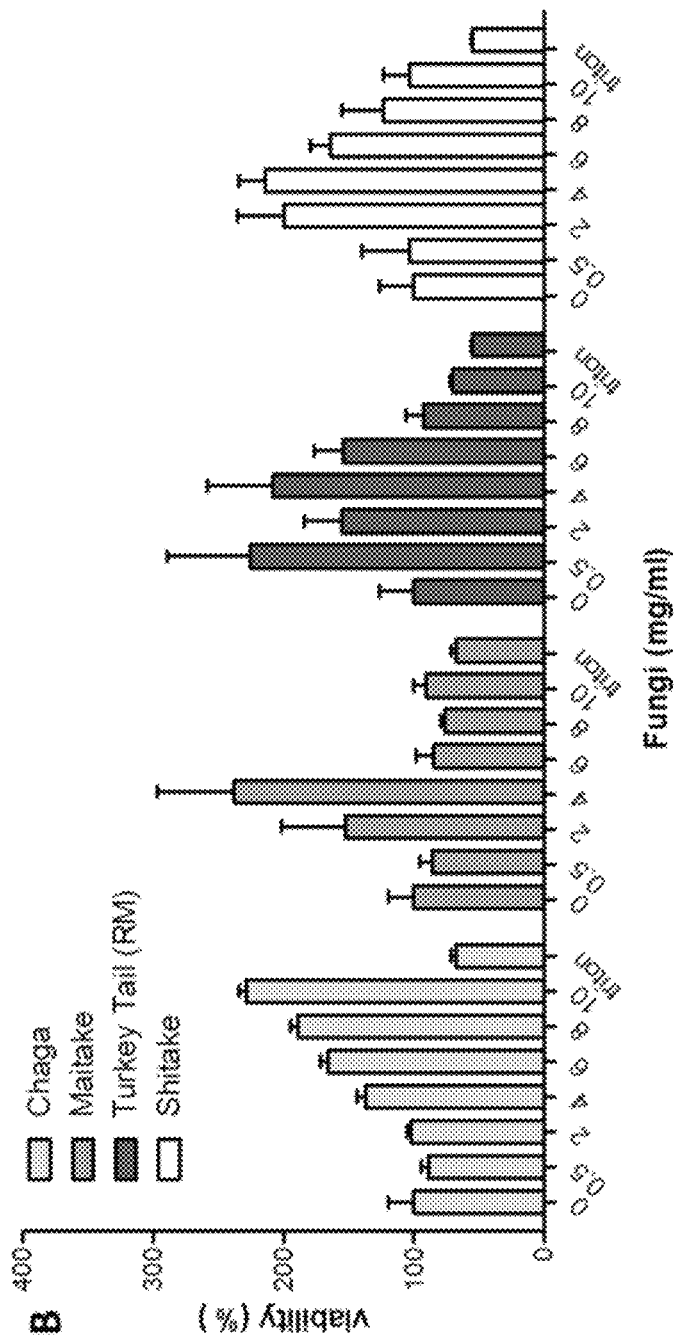

| | 1 | 2 | 3 | 4 | 5 | 6 | 7 | 8 | 9 | 10 | 11 | 12 |
|---|---|---|---|---|---|---|---|---|---|---|---|---|
| A | | | | | | | | | | | | |
| B | | medium | TI2 6 mg/ml | TI1 10 mg/ml | UT | TI2 6 mg/ml | TI1 8 mg/ml | TI2 4 mg/ml | TI2 10 mg/ml | TI1 0.5 mg/ml | TI1 6 mg/ml | TI2 10 mg/ml |
| C | | medium | TI1 4 mg/ml | Vehicle | TI2 0.5 mg/ml | TI1 6 mg/ml | TI1 0.5 mg/ml | TI2 2 mg/ml | TI1 10 mg/ml | Vehicle | TI2 8 mg/ml | TI2 2 mg/ml |
| D | | medium | TI2 8 mg/ml | TI2 4 mg/ml | TI1 2 mg/ml | TI2 4 mg/ml | TI2 10 mg/ml | TI1 2 mg/ml | TI2 0.5 mg/ml | TI1 2 mg/ml | UT | TI1 4 mg/ml |
| E | | medium | TI1 8 mg/ml | TI1 6 mg/ml | triton | TI1 4 mg/ml | TI1 10 mg/ml | Vehicle | TI1 4 mg/ml | UT | TI2 6 mg/ml | TI2 0.5 mg/ml |
| F | | medium | UT | TI2 2 mg/ml | TI2 10 mg/ml | TI1 8 mg/ml | TI2 0.5 mg/ml | TI2 8 mg/ml | TI2 6 mg/ml | TI1 8 mg/ml | TI2 4 mg/ml | TI1 10 mg/ml |
| G | | medium | TI1 2 mg/ml | TI1 0.5 mg/ml | Vehicle | UT | TI2 8 mg/ml | TI1 6 mg/ml | triton | TI2 2 mg/ml | Vehicle | TI1 0.5 mg/ml |
| H | | | | | | | | | | | | | a. Seven mushrooms extracts were incubated with PANC-1 or EGL-1 at 0.5-10 mg/ml for 72 hours.
b. Table 12 and Table 13 describe the dose of mushrooms which led to maximal killing (lowest viability).
c. Cells' viability was tested (XTT assay).
d. EGL-1 cells were much more resistant to cell death than PANC-1 cells. Cordyseps M (RM) was the most potent mushroom, followed by Reishi.
e. PANC-1 cells: Chaga was the most potent mushroom, followed by Reishi and Turkey Tail (MS).
f. Results are shown in FIG. 7 and FIG 8.

TABLE 12

Summary of viability in PANC-1 cells*

| Mushroom | Mushroom (mg/ml) | % viability |
|---|---|---|
| Reishi | 0.5 | 96.1 |
| | 2 | 27.2 |
| | 4 | 21.6 |
| | 6 | 27.3 |
| | 8 | 22.0 |
| | 10 | 22.3 |
| Cordyseps M (RM) | 0.5 | 67.3 |
| | 2 | 55.7 |
| | 4 | 60.5 |
| | 6 | 41.1 |
| | 8 | 29.8 |
| | 10 | 21.5 |
| Agaricus Blazei | 0.5 | 208.7 |
| | 2 | 208.9 |
| | 4 | 93.3 |
| | 6 | 51.4 |
| | 8 | 31.3 |
| | 10 | 30.8 |
| Cordyseps Cs-4 (RM) | 0.5 | 190.3 |
| | 2 | 223.1 |
| | 4 | 162.5 |
| | 6 | 172.8 |
| | 8 | 96.0 |
| | 10 | 27.7 |
| Turkey Tail (MS) | 0.5 | 92.3 |
| | 2 | 41.1 |
| | 4 | 31.5 |
| | 6 | 34.7 |
| | 8 | 32.3 |
| | 10 | 32.5 |
| Chaga | 0.5 | 41.0 |
| | 2 | 32.4 |
| | 4 | 38.6 |
| | 6 | 45.8 |
| | 8 | 45.4 |
| | 10 | 55.2 |
| Maitake | 0.5 | 107.1 |
| | 2 | 94.5 |
| | 4 | 34.8 |
| | 6 | 34.2 |
| | 8 | 32.8 |
| | 10 | 32.4 |
| Turkey Tail (RM) | 0.5 | 119.3 |
| | 2 | 61.4 |
| | 4 | 58.0 |
| | 6 | 58.8 |
| | 8 | 63.1 |
| | 10 | 61.5 |
| Shiitake | 0.5 | 144.7 |
| | 2 | 89.7 |
| | 4 | 55.9 |
| | 6 | 56.2 |
| | 8 | 57.2 |
| | 10 | 59.2 |

TABLE 13

Summary of viability in EGL-1 cells

| Mushroom | Mushroom (mg/ml) | % viability |
|---|---|---|
| Reishi | 0.5 | 108.9 |
| | 2 | 92.5 |
| | 4 | 143.3 |
| | 6 | 87.7 |
| | 8 | 60.4 |
| | 10 | 61.3 |
| Cordyseps M (RM) | 0.5 | 110.6 |
| | 2 | 115.2 |
| | 4 | 98.0 |
| | 6 | 71.7 |
| | 8 | 54.4 |
| | 10 | 62.3 |
| Agaricus Blazei | 0.5 | 181.7 |
| | 2 | 238.3 |
| | 4 | 237.6 |
| | 6 | 355.4 |
| | 8 | 353.1 |
| | 10 | 436.8 |
| Cordyseps Cs-4 (RM) | 0.5 | 139.6 |
| | 2 | 320.8 |
| | 4 | 254.2 |

TABLE 13-continued

Summary of viability in EGL-1 cells

| Mushroom | Mushroom (mg/ml) | % viability |
|---|---|---|
|  | 6 | 392.9 |
|  | 8 | 425.8 |
|  | 10 | 352.1 |
| Turkey Tail (MS) | 0.5 | 122.2 |
|  | 2 | 189.2 |
|  | 4 | 231.8 |
|  | 6 | 148.5 |
|  | 8 | 87.7 |
|  | 10 | 93.5 |
| Chaga | 0.5 | 89.4 |
|  | 2 | 102.0 |
|  | 4 | 137.1 |
|  | 6 | 165.7 |
|  | 8 | 189.2 |
|  | 10 | 228.4 |
| Maitake | 0.5 | 86.4 |
|  | 2 | 152.9 |
|  | 4 | 237.8 |
|  | 6 | 84.6 |
|  | 8 | 76.7 |
|  | 10 | 90.7 |
| Turkey Tail (RM) | 0.5 | 225.8 |
|  | 2 | 155.1 |
|  | 4 | 208.5 |
|  | 6 | 154.4 |
|  | 8 | 92.3 |
|  | 10 | 70.6 |
| Shiitake | 0.5 | 103.6 |
|  | 2 | 199.6 |
|  | 4 | 214.2 |
|  | 6 | 163.8 |
|  | 8 | 123.0 |
|  | 10 | 103.0 |

Results show that Both EGL-1 and PANC-1 cells incubated with *Agaricus* and *Cordyceps* Cs-4 (MS) exhibited % viability higher than 100%.

To examine whether the mushroom effect cell proliferation of metabolism, both mushrooms were added to EGL-1 cells at the same concentrations, for 2 h, 6 h, 24 h, and 72 h. As seen in FIG. 2, in case of *Cordyceps* Cs-4, higher viability was observed only after 72 h which implies on proliferative effect. However, in case of *Agaricus blazei*, higher viability (compared to vehicle) was observed even after 2 h, which implies on a metabolic change.

Cannabinoid Extract
  a. CBD (0.1-100 µM) or THC (0.5-375 µM) were incubated with 7,500 PANC-1 cells/well (pancreatic carcinoma) or EGL-1 cells/well (extrahepatic carcinoma) for 72 hours.
  b. Cells' viability was tested (XTT assay).
  c. EGL-1:
    i. CBD was potent at 40-100 µM (15-30% viability).
    ii. THC was potent at 100-375 µM (15% viability no dose response).
  d. PANC-1:
    i. CBD was potent at 40-100 µM (35% viability, no dose response).
    ii. THC was potent at 100-375 µM (35% viability, no dose response).

Figure 9A:
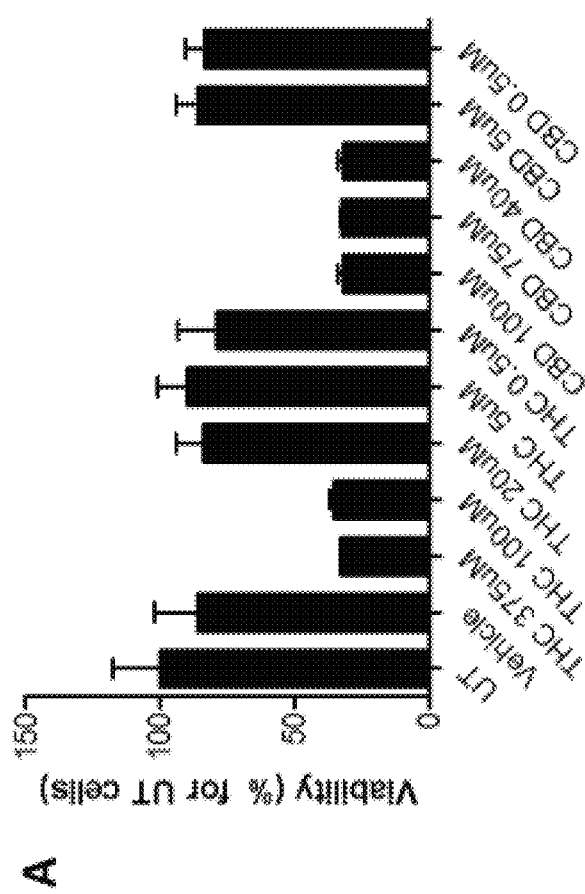
FIG. 9: CBD and THC were incubated with 7500 PANC-1(A) and 5000 EGL-1 (B) cells for 72 h. Viability was measured using XTT reagent kit.
Figure 9B:
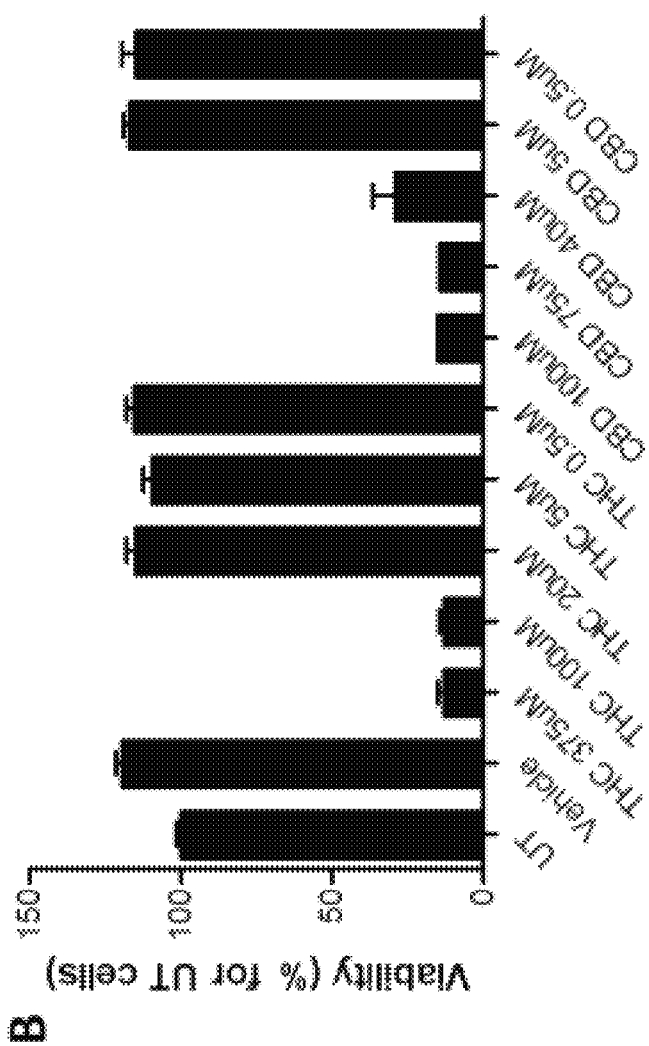
Figure 10A:
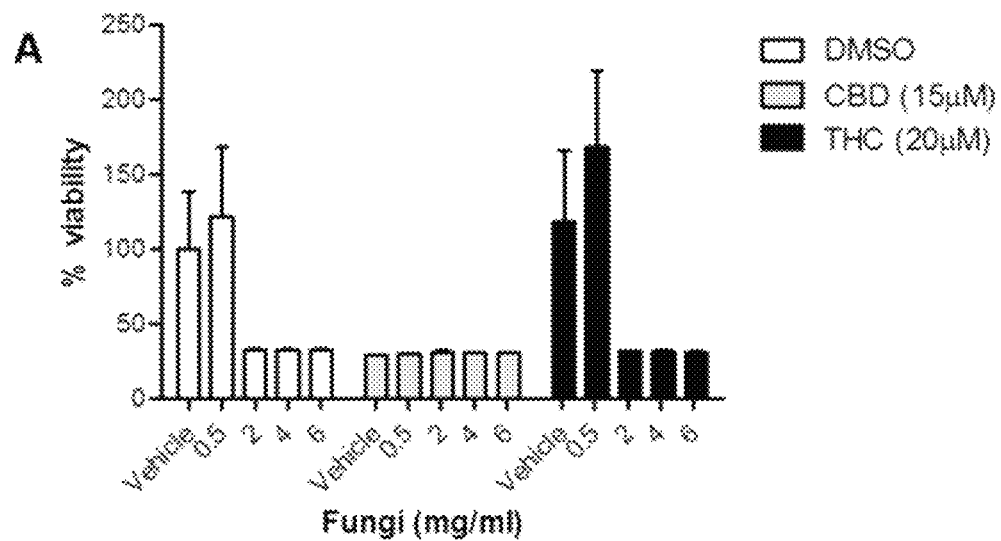
FIG. 10: Reishi (A), *Cordyceps* M (B), *Cordyceps* Cs-4 (C), and Turkey Tail (D) were combined with DMSO, CBD or THC with 5000 PANC-1 cells for 72 h. Viability was measured using XTT reagent kit.
Figure 10B:
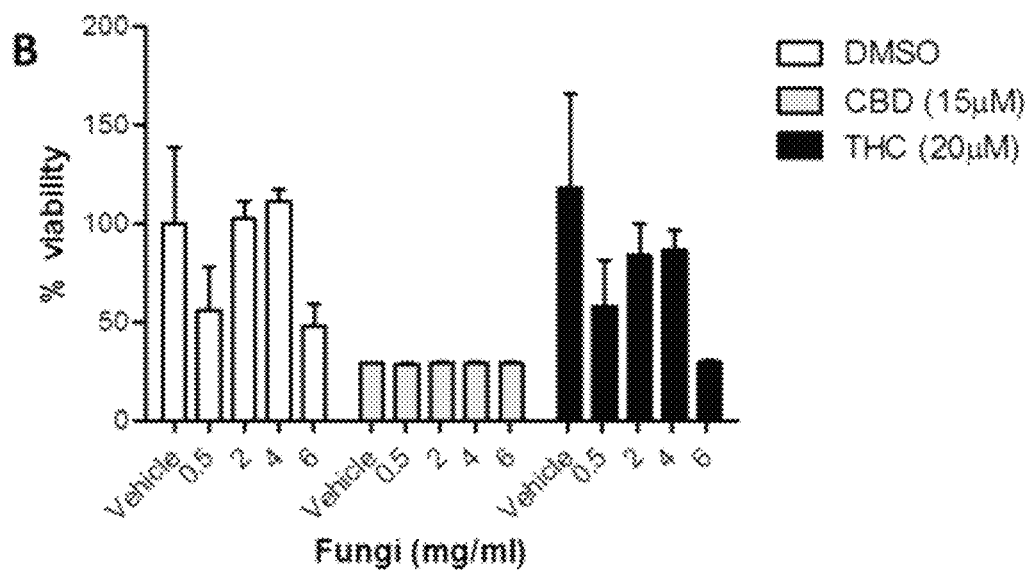
Figure 10C:
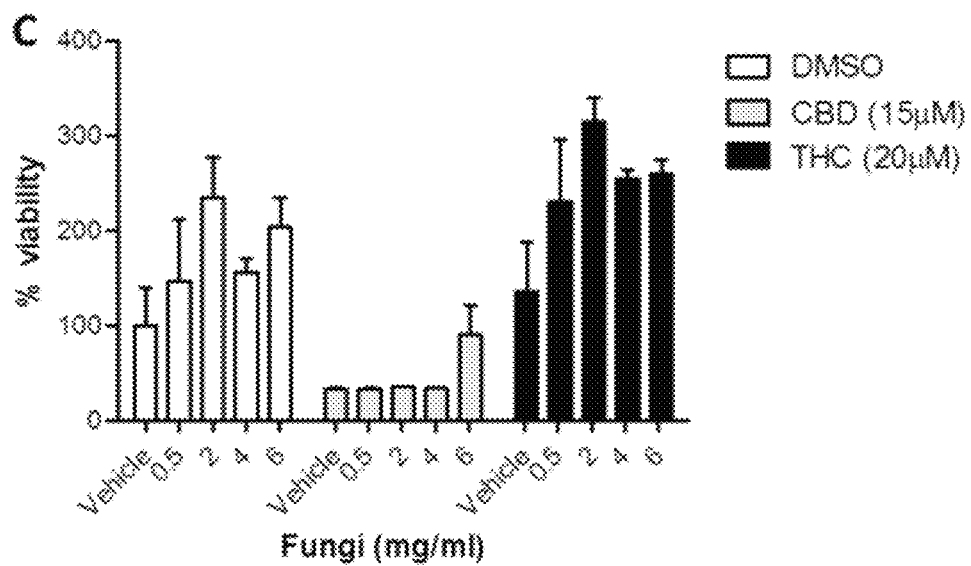
Figure 10D:
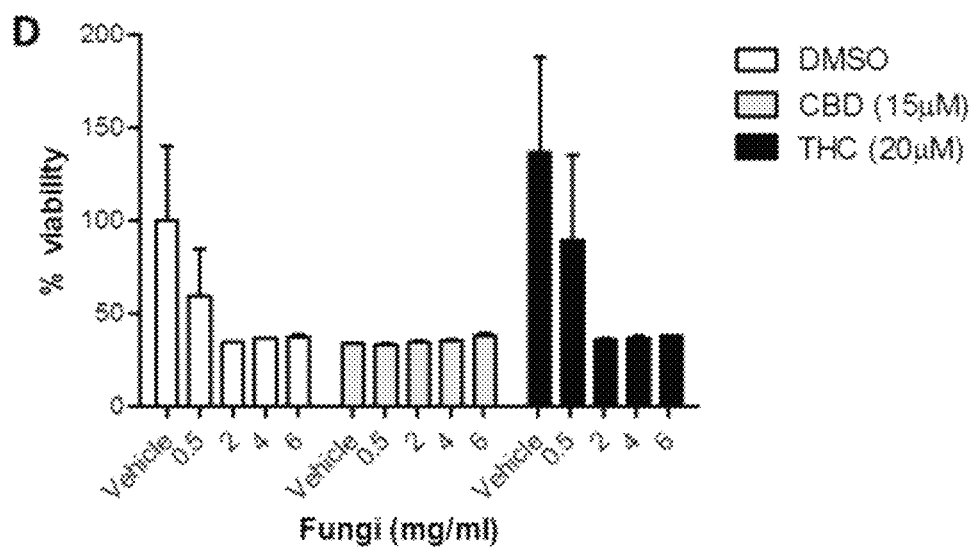

Results are shown in FIG. 9.

Mushrooms extracts in combination with cannabinoid extract
  a. DMSO, CBD (40 µM) or THC (50 µM) were incubated in combination with Reishi, *Cordyceps* M, *Cordyceps* Cs-4, and Turkey Tail (MS) extracts (0.5-6 mg/ml) with 7,500 PANC-1 cells/well.
  b. Combination with THC did not improve mushrooms anti-cancerous effect.
  c. Combination with CBD decreased cell viability as compared to all mushrooms alone. *Cordyceps* M (RM) and Reishi combined with CBD were the most potent combinations in decreasing cells' viability.

The synergistic anti-cancer properties of combinations of mushroom extracts with and without THC or CBD, as shown in FIG. 10, are demonstrated by viability of PANC-1 and EGL-1 cancer cell lines following incubation of cells with mushroom extracts with and without THC or CBD.

Combinations of mushroom extracts with CBD showed increased anti-cancer effects, relative to the mushroom extract alone, with the most pronounced effect observed for *Cordyceps* (RM) and Reishi combined with CBD.

Example 4

Routes of administration: The combination of a cannabinoid and a medicinal mushroom is formulated to either oral administration, intravenous administration or topical administration.

The formulations of the present invention comprise inter alia, in a non-limiting matter, additional ingredients or pharmaceutical excipients to further develop a formula to have a desired concentration, effective doses, dosing regiments and treatment times. These ingredients include, inter alia, solubilizers, stabilizers, buffers, tonicity modifiers, bulking agents, viscosity enhancers/reducers, surfactants, chelating agents, and adjuvants.

*Cannabis* composition of the current invention is administered by smoking a plant-derived cigarette or by oral or intravenous administration. The smoked route is most commonly used rouby a premade cigarette or hand-rolled cigarette. Intravenous route offers precise control of dose and timing. Cannabinoid composition is delivered also by oromucosal route.

Nasal administration (through the nose)—can be used for topically acting substances, as well as for insufflation of e.g. decongestant nasal sprays to be taken up along the respiratory tract. Such substances are also called inhalational, e.g. inhalational anesthetics.

Oral administration Oral drugs are taken as tablets or capsules.

Tablets: The dissolution of the tablet can be affected significantly by particle size and crystal form. The dissolution time can be modified for a rapid effect (fast dissolution) or for sustained release, (slow dissolution rates which prolong the duration of action or avoid initial high plasma levels).

Capsules: A capsule is a gelatinous envelope enclosing the active substance. Capsules can be designed to remain intact for some hours after ingestion in order to delay absorption. They may also contain a mixture of slow- and fast-release particles to produce rapid and sustained absorption in the same dose.

Oral sustained release: Oral sustained release in capsules or tablets is achieved, in a non-limiting matter, by embedding the active ingredient in an insoluble porous matrix, such that the dissolving drug must make its way out of the matrix before it can be absorbed, sustained release formulations in which the matrix swells to form a gel through which the drug exits, or by an osmotic controlled-release oral delivery system, where the active compound is encased in a water-permeable membrane with a laser drilled hole at one end. As water passes through the membrane the drug is pushed out through the hole and into the digestive tract where it can be absorbed.

Solutions: Pharmaceutical solutions are extensively used as dosage forms for the oral administration of therapeutic agents. Pharmaceutical solutions defined as liquid preparations in which the therapeutic agent and the various excipients are dissolved in the chosen solvent system.

Pharmaceutical solutions are homogeneous, i.e. the therapeutic agent(s) and excipients are dissolved in the vehicle Parenteral administration: Parenteral administration is performed using intravenous, subcutaneous, intramuscular, and intra-articular administration. The drug is stored in liquid or if unstable, lyophilized form.

Topical administration: Topical formulations comprise inter alia cream, ointment, paste, lotion or gel.

Transdermal delivery: Transdermal delivery is achieved, for example, by transdermal patches.

Alternative routes of administration are suppository, intraventricular, intramuscular, inhalational, aerosol, and sublingual.

The invention claimed is:

1. A composition useful for treating inflammatory diseases characterized by dysregulation of at least one pro-inflammatory member selected from the group consisting of TNF-α, IL-6, and NO, in a mammalian subject, wherein said composition comprises a combination of a) a *cannabis*-derived compound; b) a medicinal mushroom; and, c) a pharmaceutical acceptable excipient, said *cannabis*-derived compound is THC, and said medicinal mushroom is *Cordyceps* M (*militaris*) or *Cordyceps* Cs-4 (*sinensis*) wherein the w/w or molar ratio between said THC and said medicinal mushroom is between 1:12 and 1:318.

2. The composition according to claim 1, wherein said composition useful for treating immune-mediated inflammatory diseases comprises Reishi mushroom extract and THC.

3. The composition of claim 1, wherein said *cannabis*-derived compound is agonistic to CB1 or CB2 receptors and any combination thereof, and said medicinal mushroom is agonistic to pattern-recognition receptors (PRR).

4. The composition of claim 3, where said pattern-recognition receptors (PRR) are selected from the group consisting of Toll-like receptors (TLR), mannose receptors, dectin1 and any combination thereof.

5. The composition according to claim 1, wherein said inflammatory diseases are selected from a group consisting Asthma, Chronic obstructive pulmonary disease (COPD); Psoriasis, Rheumatoid Arthritis, Inflammatory bowel disease (IBD), ulcerative colitis, Multiple sclerosis, autoimmune haemolytic anaemia, chronic inflammatory demyelinating polyneuropathy; giant cell arteritis; GN, glomerulonephritis; juvenile idiopathic arthritis, polymyalgia rheumatica; SAPHO, synovitis, acne, pustulosis, hyperostosis, osteitis, systemic lupus erythematosus; thrombotic/idiopathic thrombocytopaenic purpura, Sjogren's, Crohn's disease, Polymyositis/dermatomyositis, Wegener's granulomatosis, Wegener's vasculitis, Psoriasis, Behcet's, Polyarteritis nodosa, Takayasu's arteritis, Graft versus host disease, Polyarteritis nodosa, Sarcoidosis, Adult onset Still's disease, Hydradenitis supprativa, Cryoglobulinaemic vasculitis, Pyoderma gangrenosum, Kawasaki disease, Relapsing polychondritis, Anti-phospholipid syndrome, Cryoglobulinaemic vasculitis, Hydradenitis supprativa, Idiopathic membranous, Relapsing polychondritis, Coeliac disease, Chronic hepatitis C, Myasthenia gravis, Myelodysplastic syndrome Pemphigus, Refractory asthma, Grave's disease, Pyoderma gangrenosum, Erythema nodosum, SAPHO syndrome, Multicentric reticulohistiocytosis, Chronic hepatitis B, Amyloidosis, and any combination thereof.

6. The composition according to claim 1, wherein at least one of the following holds true:
   a) said composition is administered in a manner selected from a group consisting of an inhaler, a cigarette, tablet, a capsule, a pill, lyophilized, powder, emulsion, granulated powder, cream, ointment, paste, lotion gel, liquid, a solution, a patch and any combination thereof,
   b) said composition is administered in a manner selected from a group consisting of fast release, slow release, sustained release, controlled release and any combination thereof, or
   c) said pharmaceutical acceptable excipient additionally comprises ingredients selected from a group consisting solubilizers, stabilizers, buffers, tonicity modifiers, bulking agents, viscosity enhancers/reducers, surfactants, chelating agents, adjuvants and any combination thereof.

7. The composition of claim 1, wherein said combination inhibits secretion of said at least one pro-inflammatory member selected from the group consisting of TNF-α, IL-6, and NO, from immune cells, wherein the level of inhibition is greater than that achieved with either the medicinal mushroom alone or THC alone.

* * * * *